United States Patent
Sack

(10) Patent No.: US 10,279,257 B2
(45) Date of Patent: May 7, 2019

(54) DATA MINING, INFLUENCING VIEWER SELECTIONS, AND USER INTERFACES

(71) Applicant: PodOp, Inc., Santa Monica, CA (US)

(72) Inventor: Adrian Sack, Santa Monica, CA (US)

(73) Assignee: PODOP, INC., Santa Monica, CA (US)

( * ) Notice: Subject to any disclaimer, the term of this patent is extended or adjusted under 35 U.S.C. 154(b) by 0 days.

(21) Appl. No.: 15/543,482

(22) PCT Filed: Jan. 12, 2016

(86) PCT No.: PCT/US2016/013074
§ 371 (c)(1),
(2) Date: Jul. 13, 2017

(87) PCT Pub. No.: WO2016/115154
PCT Pub. Date: Jul. 21, 2016

(65) Prior Publication Data
US 2018/0008894 A1    Jan. 11, 2018

Related U.S. Application Data

(60) Provisional application No. 62/199,760, filed on Jul. 31, 2015, provisional application No. 62/103,480, filed on Jan. 14, 2015.

(51) Int. Cl.
*A63F 13/47* (2014.01)
*G06F 17/30* (2006.01)
(Continued)

(52) U.S. Cl.
CPC .............. *A63F 13/47* (2014.09); *G06F 17/30* (2013.01); *G06Q 50/10* (2013.01); *G09B 5/065* (2013.01); *G11B 27/105* (2013.01)

(58) Field of Classification Search
None
See application file for complete search history.

(56) References Cited

U.S. PATENT DOCUMENTS

| 5,358,259 A | 10/1994 | Best |
| 5,568,602 A | 10/1996 | Callahan et al. |
(Continued)

FOREIGN PATENT DOCUMENTS

| EP | 2 557 524 A1 | 2/2013 |
| EP | 2 712 206 A1 | 3/2014 |
(Continued)

OTHER PUBLICATIONS

International Search Report and Written Opinion, dated Aug. 21, 2014, for International Application No. PCT/US2014/026245, 10 pages.

(Continued)

*Primary Examiner* — Ronald Laneau
(74) *Attorney, Agent, or Firm* — Cozen O'Connor

(57) ABSTRACT

A narrative includes a number of serially connected narrative segments combined by a director or editor in a defined sequence to tell a story. A number of different narrative segments are available to the director or editor. A content delivery editor provides editors and directors with the ability to augment a narrative with additional narrative segments that provide alternate perspectives, views, or insights to the consumer. Such allows conveyance of the same narrative to the consumer using a number of plots or perspectives. Branch points in the narrative provide the consumer the opportunity to follow a storyline they find interesting. Each consumer follows a "personalized" path through the narrative. The director or editor may influence selection at branch points by providing priming stimuli prior to presentation of a prompt to select a branch and by optionally providing target stimuli during presentation of the prompt to select a branch.

29 Claims, 38 Drawing Sheets

(51) Int. Cl.
*G06Q 50/10* (2012.01)
*G09B 5/06* (2006.01)
*G11B 27/10* (2006.01)

(56) References Cited

U.S. PATENT DOCUMENTS

| | | | |
|---|---|---|---|
| 5,737,527 | A | 4/1998 | Shiels et al. |
| 5,751,953 | A | 5/1998 | Shiels et al. |
| 5,754,770 | A | 5/1998 | Shiels et al. |
| 5,848,934 | A | 12/1998 | Shiels et al. |
| 5,872,927 | A | 2/1999 | Shiels et al. |
| 5,949,487 | A | 9/1999 | Blanchard |
| 6,222,925 | B1 | 4/2001 | Shiels et al. |
| 6,260,194 | B1 | 7/2001 | Shiels et al. |
| 6,287,196 | B1 | 9/2001 | Kawano |
| 6,296,487 | B1 | 10/2001 | Lotecka |
| 6,519,766 | B1 * | 2/2003 | Barritz ............... G06F 11/3466 714/E11.2 |
| 6,544,040 | B1 | 4/2003 | Brelis et al. |
| 8,036,995 | B2 | 10/2011 | Van Doorn |
| 8,046,691 | B2 | 10/2011 | Sankar et al. |
| 8,177,639 | B2 | 5/2012 | Schell |
| 8,600,220 | B2 | 12/2013 | Bloch et al. |
| 9,792,026 | B2 | 10/2017 | Bloch et al. |
| 9,792,957 | B2 | 10/2017 | Bloch et al. |
| 2004/0091848 | A1 | 5/2004 | Nemitz |
| 2004/0267816 | A1 | 12/2004 | Russek |
| 2005/0120389 | A1 | 6/2005 | Boss et al. |
| 2005/0208929 | A1 * | 9/2005 | Zmrzli ............... G06F 17/30899 455/414.2 |
| 2006/0085182 | A1 | 4/2006 | Eves et al. |
| 2007/0099684 | A1 | 5/2007 | Butterworth |
| 2008/0256005 | A1 | 10/2008 | Van Doorn |
| 2009/0327898 | A1 | 12/2009 | Kim et al. |
| 2010/0100899 | A1 | 4/2010 | Bradbury et al. |
| 2010/0169776 | A1 | 7/2010 | Sankar et al. |
| 2010/0293455 | A1 | 11/2010 | Bloch |
| 2011/0200116 | A1 | 8/2011 | Bloch et al. |
| 2011/0202562 | A1 | 8/2011 | Bloch et al. |
| 2012/0060104 | A1 | 3/2012 | Feng et al. |
| 2012/0089904 | A1 * | 4/2012 | Datha ............... G06F 17/30056 715/236 |
| 2012/0094768 | A1 | 4/2012 | McCaddon et al. |
| 2012/0102418 | A1 | 4/2012 | Joy et al. |
| 2012/0110620 | A1 | 5/2012 | Kilar et al. |
| 2012/0166180 | A1 | 6/2012 | Au |
| 2013/0007223 | A1 | 1/2013 | Luby et al. |
| 2013/0216204 | A1 | 8/2013 | Kulakov |
| 2013/0259442 | A1 | 10/2013 | Bloch et al. |
| 2014/0078397 | A1 | 3/2014 | Bloch et al. |
| 2014/0082666 | A1 | 3/2014 | Bloch et al. |
| 2014/0222977 | A1 * | 8/2014 | Varney ............... H04L 41/0893 709/220 |
| 2014/0281849 | A1 | 9/2014 | Siegel et al. |
| 2017/0245023 | A1 | 8/2017 | Brelis et al. |
| 2017/0289220 | A1 | 10/2017 | Bloch et al. |
| 2017/0295410 | A1 | 10/2017 | Bloch et al. |
| 2017/0374120 | A1 | 12/2017 | Vishnia et al. |
| 2018/0091874 | A1 | 3/2018 | Brelis et al. |

FOREIGN PATENT DOCUMENTS

| | | |
|---|---|---|
| JP | 2012-198916 A | 10/2012 |
| KR | 2003-0044433 A | 6/2003 |
| KR | 10-2013-0053218 A | 5/2013 |
| WO | 97/12350 A1 | 4/1997 |
| WO | 2010/131244 A1 | 11/2010 |
| WO | 2012/051585 A1 | 4/2012 |
| WO | 2012/114329 A1 | 8/2012 |
| WO | 2012/114330 A1 | 8/2012 |
| WO | 2013/150378 A1 | 10/2013 |
| WO | 2013/168068 A1 | 11/2013 |

OTHER PUBLICATIONS

International Search Report, dated Feb. 3, 2016, for International Application No. PCT/US2015/043250, 5 pages.
Fourth Wall Studios, "About," retrieved on Mar. 22, 2013, from http://fourthwallstudios.com/about, 2 pages.
Fourth Wall Studios, "Platform," retrieved on Mar. 22, 2013, from http://fourthwallstudios.com/platform, 1 page.
Laskow, "These Maps Reveal the Hidden Structures of 'Choose Your Own Adventure' Books," Jun. 13, 2017, URL=http://www.atlasobscura.com/articles/cyoa-choose-your-own-adventure-maps, download date Jun. 22, 2017, 8 pages.
Murray et al., "Story-Map: iPad Companion for Long Form TV Narratives," EuroITV'12, Berlin, Germany, Jul. 4-6, 2012, 4 pages.
"Rapt Media Raises $3.1M in Venture Funding, Introduces Video-Powered Marketing Automation With New Eloqua Integration," Aug. 6, 2014, retrieved on Aug. 8, 2014, from http://www.marketwired.com/press-release/rapt-media-raises-31m-venture-funding-inroduc . . . , 3 pages.
Rapt Media, "Site Pairing," retrieved on Aug. 21, 2014, http://www.raptmedia.com/site-pairing, 3 pages.
Rides, "About | Interactive Video Experience," retrieved on Mar. 22, 2013, from http://rides.tv/about-rides/, 4 pages.
Rides, "Dirty Work | Interactive Video Experience," retrieved on Mar. 22, 2013, from http://rides.tv/sync, 4 pages.
Wardle, "Jim Stewartson at the Variety Entertainment and Technology Summit," RIDES, retrieved on Mar. 22, 2013, from http://rides.tv/news/jim-stewartson-at-the-variety-entertainment-and . . . , 7 pages.
"Nightmare Creatures 2," Konami, May 1, 2000, retrieved from the Internet, URL: http://www.psxmanuals.com.
Extended European Search Report, dated Feb. 27, 2018, for European Application No. 15827196.5-1209, 6 pages.

* cited by examiner

* SAME SEGMENTS
** SAME SEGMENTS

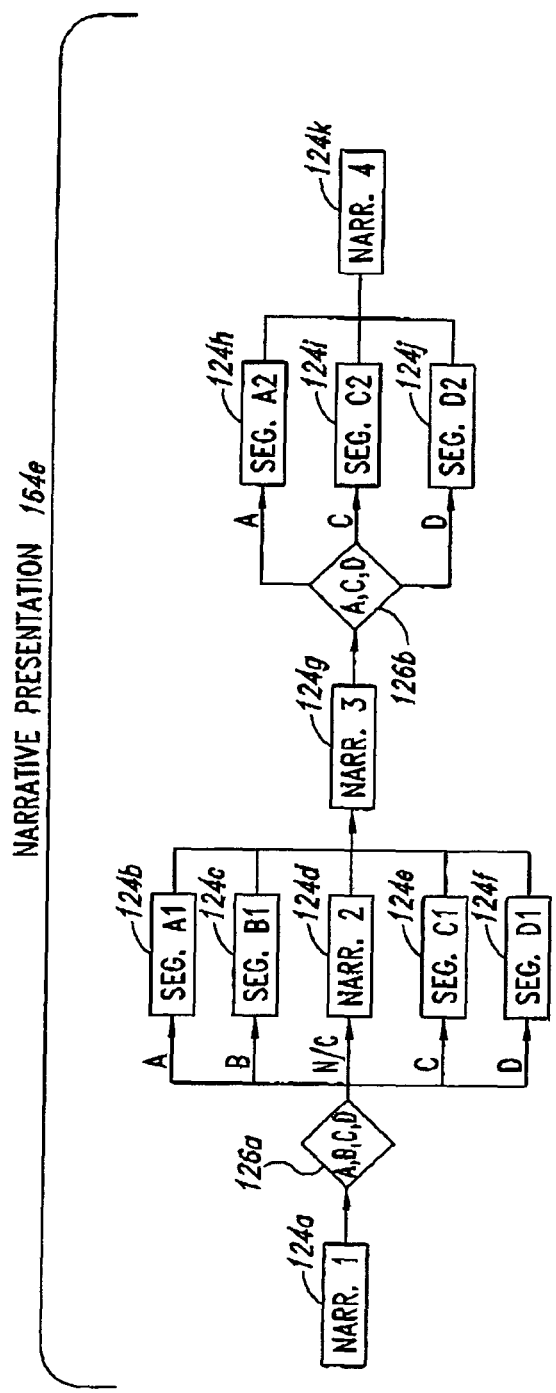

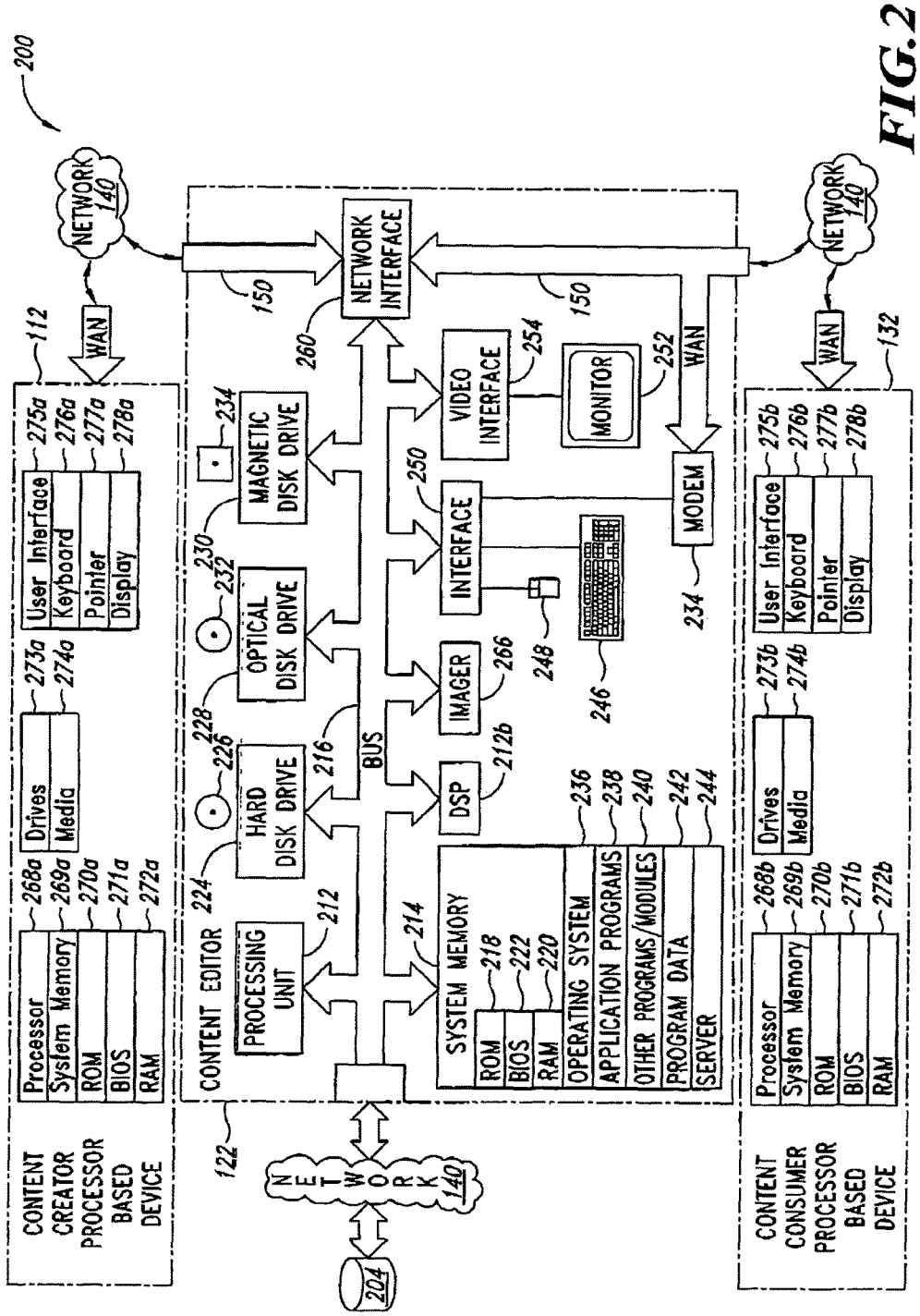

DATA MINING, INFLUENCING VIEWER SELECTIONS, AND USER INTERFACES

TECHNICAL FIELD

This application is generally related to the presentation of narratives in audio, visual, and audio-visual forms.

BACKGROUND

The art of storytelling is a form of communication dating back to ancient times. Storytelling allows humans to pass information on to one another for entertainment and instructional purposes. Oral storytelling has a particularly long history and involves the describing of a series of events using words and other sounds. More recently, storytellers have taken advantage of pictures and other visual presentations to relate the events comprising the story. Particularly effective is a combination of audio and visual representations, most commonly found in motion pictures, television programs, and video presentations.

Until recently, narrative presentations have typically been non-interactive, the series of events forming the story being presented as a sequence of narrative segments is a pre-defined set or chosen by a director or editor. Although "Director's Cuts" and similar presentations may provide a media content consumer with additional media content (e.g., additional scenes) or information related to one or more production aspects of the narrative, such information is often presented as an alternative to the standard narrative presentation (e.g., theatrical release) or simultaneous (e.g., as a secondary audio program) with the standard narrative presentation. At times, such "Director's Cuts" provide the media content consumer with additional scenes (e.g., scenes removed or "cut" during the editing process to create a theatrical release). However, such presentation formats still rely on the presentation of narrative segments in an order completely defined by the director or editor before release.

At other times, supplemental content in the form of voiceovers or similar features involving actors or others involved in the production of the narrative is available to the media content consumer (e.g., BD-LIVE® for BLU-RAY® discs). However, such content is often provided as an alternative to or contemporaneous with the narrative. Thus, such features rely on the presentation of narrative segments in an order predefined by the director or editor.

Some forms of media provide the media content consumer with an ability to affect the plotline offer another alternative. For example, video games may implement a branching structure, where various branches will be followed based on input received from the media content consumer. Also for example, instructional computer programs may present a series of events where media content consumer input selections change the order of presentation of the events, and can cause the computer to present some events, while not presenting other events.

SUMMARY

A variety of techniques are set out herein, which implement new forms of narrative presentation. These techniques address various technical problems in defining narratives in a way that allows media content consumers to explore the narratives in a way that is at least partially under the control of the media content consumer. Thus, while a director or editor may control the content of the narrative, and may even set some limits on an order in which a particular narrative is presented, the content consumer can to at least some extent control that order. In some instances, an editing tool allows specification of the narrative and ordering thereof, which may or may not be conditional. In some instances, a media content player and/or backend system may implement the delivery of the narrative presentation employing some of the described techniques. The described techniques may also foster social engagement between two or more media content consumers, who may for example explore a narrative collaboratively, each media content consumer having access to different parts of the narrative.

A narrative may be considered a defined sequence of narrative events that conveys a story or message to a media content consumer. Narratives are fundamental to storytelling, games, and educational materials. A narrative may be broken into a number of distinct segments or a number of distinct scenes. A narrative may even be presented episodically, episodes released periodically, aperiodically, or even in bulk (e.g., entire season of episodes all released on the same day).

Characters within the narrative will interact with other characters, other elements in the story, and the environment itself as the narrative presentation progresses. Even with the most accomplished storytelling, only a limited number of side storylines and only a limited quantity of character development can occur within the timeframe prescribed for the overall narrative presentation. Often editors and directors will selectively omit a significant portion of the total number of narrative threads or events available for inclusion in the narrative presentation. The omitted narrative threads or events may be associated with the perspective, motivation, mental state, or similar character aspects of one or more characters appearing in the narrative presentation. While omitted narrative threads or events do not necessarily change the overall storyline (i.e., outcome) of the narrative, they can provide the media content consumer with insights on the perspective, motivation, mental state, or similar other physical or mental aspects of one or more characters appearing in the narrative presentation, and hence modify the media content consumer's understanding or perception of the narrative and/or characters. Such omitted narrative threads or events may be in the form of distinct narrative segments, for instance vignettes or additional side storylines related to (e.g., sub-plots of) the main storyline of the larger narrative.

Providing a media content consumer with intermittent cues or prompts, each including a plurality of user selectable icons, each corresponding to a respective narrative segment, at defined points along a narrative provides an alternative to the traditional serial presentation of narrative segments selected solely by the production and/or editing team. For example, rather than viewing the motion picture "Rocky" as a number of serial narrative segments from Rocky Balboa's (Sylvester Stallone's) perspective, at defined points the media content consumer might be presented with the opportunity to view the narrative through Mickey Goldmill's (Burgess Meredith's) perspective as Rocky's trainer; Adrian's (Talia Shire's) perspective as Rocky's girlfriend; and/or Apollo Creed's (Carl Weather's) perspective as Rocky's opponent. Each of the narrative segments provides the media content consumer with additional insight that is complimentary to and does not change or detract from the plot or storyline of the overall narrative (i.e., any sequence of narrative segments selected by the media content consumer would not affect or alter Rocky Balboa defeating Apollo Creed in the final scene of the narrative). Thus, rather than a traditional branching structure (e.g., video game), the essential story and outcome of the narrative is not changed by the media content consumer's selections, although the media content consumer may take away a different understanding of the motivations of the characters and underlying message of the narrative.

Advantageously, the ability for media content consumers to view a narrative based on personally selected narrative segments enables each media content consumer to uniquely experience the narrative. At times, the sequence of narrative segments selected by a media content consumer may preclude the presentation of, or access to, additional narrative segments after the conclusion of the narrative (i.e., the media content consumer is able to view the narrative presentation only in the narrative segment sequence that the specific media content consumer themselves select). Such an arrangement may beneficially promote communication, interaction, or dialog between media content consumers who desire to relate their impression of the narrative based on their respective narrative segment sequence or narrative segment path with the impressions of other media content consumers who experienced the narrative as a different narrative segment sequence. At times, social media may facilitate such communication between media content consumers, thereby increasing public interest about the narrative in both mainstream or conventional media as well as social media forms. Other information may be gathered and analyzed based on the narrative segment sequences of different media content consumers. For example, media content consumer demographic information may be analyzed to determine the preferred narrative sequence segment for a defined demographic group of media content consumers.

At times, prompts, cues, or similar identifiers may be presented to the media content consumer either during the presentation of a narrative segment or at the conclusion of the narrative segment to indicate the availability of additional content in the form of additional narrative segments and/or additional or bonus content, or the availability of additional materials, for example additional materials that explore a mental or psychological state of a character. Receipt of an input by the media content consumer indicative of a desire to view the additional or bonus content may cause the presentation of the selected additional or bonus content while the presentation of the original or current narrative segment is placed on "HOLD." At the conclusion of the additional or bonus content, the original narrative segment resumes. Such implementations are useful for providing media content consumers with insight into the emotional or mental state of a character appearing in or related to the narrative segment.

At other times, the media content consumer may be presented with a plurality of icons, prompts, or cues, each representing a particular narrative segment to transition to at the conclusion of a narrative segment. Such an arrangement advantageously permits the serial presentation of narrative segments selected, at least in part, by the media content consumer. Such implementations are useful for providing each media content consumer the capability to view the narrative presentation as a personally unique series of narrative segments capable of presenting the narrative from a number of perspectives.

Advantageously, artistic control remains with the artist, director or editor who selects required narrative segments (e.g., beginning and ending segments of the narrative presentation); the points in the narrative presentation at which narrative segments become available to the media content consumer; which narrative segments are available to the media content consumer, and/or any conditions which must be satisfied (e.g., viewing of a given narrative segment) and results or actions which follow a meeting or failure to meet the specified condition(s).

A media content consumer's specific sequence or "path" through a narrative may be monitored and employed for a variety of purposes. Such may, for example, allow comparisons between media content consumers, identifying those with similar paths, dissimilar paths, or complementary paths. This may foster social networking between media content consumers, and even cooperative sharing of narrative segments not otherwise available to a media content consumer. Such may, for example, allow the deriving of metrics for the media content consumer, assessment of other narrative content to propose to a media content consumer and/or advertisements which may be of particular interest to the media content consumer. At times, the media content consumer may be presented with a summary of the viewed narrative segments or narrative segment "path," and optionally, the unconsumed narrative segments. This viewing summary may be presented in graphical form, for example as a directed graph of nodes and edges, with each node representing a narrative segment and each edge indicating the viewing order of the narrative segments by the respective media content consumer. The information contained in the summary may provide the media content consumer with the ability to readily identify other media content consumers who viewed the same or a different sequence of narrative segments.

A potential difficulty with providing the content consumers with such content selection freedom is the loss of predictability on the part of the content creator or editor as to precisely how the narrative and its dramatic beats may unfold. In other words, the content consumer's exploratory freedom may be at odds with the creator or editor's precise control of the narrative arc and dramatic experience.

To address this potential issue, in some implementations of the present disclosure, a content creator or editor of an interactive narrative is able to influence the content consumer's selections in a desired direction without eliciting the content consumer's explicit awareness of any such influence. That is, the content consumer experiences an apparent full freedom of choice, thus maintaining full participatory investment in their own decisions, whilst in reality having been influenced to navigate to certain narrative segments of a narrative as intended by a content creator or editor.

A method of operation in a content delivery platform including at least one processor-based component having at least one nontransitory processor-readable medium communicatively coupled to the processor and which stores at least one of processor-executable instructions or data may be summarized as including: for each presentation of each of a plurality of narratives, each narrative comprised of a set of a plurality of narrative segments, at least two of the narrative segments of each of the narratives having a distinct temporal order within a time sequence of events of the respective narrative: causing, by the at least one processor-based component, a presentation of one of the narrative segments of the respective narrative, the causing of the presentation of the one of the narrative segments includes causing a providing of a priming stimulus; and causing, by the at least one processor-based component, a providing of a prompt to select between a number of narrative segments in a subset of the narrative segments of the respective narrative, the causing a providing of the prompt includes causing a providing of a target stimulus, the target stimulus associated with at least one selection-influenced narrative segment in the subset of the narrative segments, wherein user exposure to the priming stimulus influences selection of the at least one selection-influenced narrative segment.

Causing the providing of the priming stimulus may include causing a providing of at least one of an audible stimulus, a tactile stimulus, or a visual stimulus. Causing a providing of a priming stimulus may include causing a providing of a device vibration stimulus. Causing a providing of a priming stimulus may include causing a providing of a priming stimulus a plurality of times during the presentation of the one of the narrative segments of the respective narrative. Causing a providing of a target stimulus may include causing a providing of a target stimulus that is of the same sensory modality as the provided priming stimulus. Causing a providing of a target stimulus may include causing a providing of a target stimulus that decreases a probability of selection of the at least one narrative segment associated with the target stimulus. Causing a providing of a priming stimulus may include causing a providing of a stimulus that is below a human user's threshold for conscious perception. Causing a providing of a priming stimulus may include causing a providing of a priming stimulus to be presented for a duration of less than 500 milliseconds. Causing a providing of a target stimulus may include causing a providing of a target stimulus that is of a different sensory modality than the provided priming stimulus. Causing a providing of a priming stimulus may include first causing a providing of a first priming stimulus and second causing a providing of a second priming stimulus, the second priming stimulus of a different sensory modality than the first priming stimulus. Causing a providing of a target stimulus may include causing a providing of a target stimulus that is of a different sensory modality than at least one of the first priming stimulus or the second priming stimulus. Causing a providing of a prompt to select between a number of narrative segments in a subset of the narrative segments of the respective narrative may include causing a sequential providing of at least two prompts to select between a number of narrative segments in a subset of the narrative segments of the respective narrative, and causing a providing of a target stimulus may include causing a providing of a target stimulus associated with the at least one selection-influenced narrative segment during the providing of at least one of the at least two prompts. Causing a providing of a priming stimulus may include causing a providing of an audible signal to be presented on a number of audio channels of a media content playback device less than a total number of available audio channels of the media content playback device. Causing a providing of a target stimulus may include causing a providing of an audible signal to be presented on the number of audio channels of the media content playback device less than the total number of available audio channels of the media content playback device.

The method of operation in a content delivery platform including at least one processor-based component having at least one nontransitory processor-readable medium communicatively coupled to the processor and which stores at least one of processor-executable instructions or data may further include: causing, by the at least one processor-based component, a determination or a prediction of a gaze location on a display of a media content playback device whereat a view of a user is focused; wherein causing a providing of a priming stimulus may include causing a providing of a priming stimulus to be presented at the determined or predicted gaze location on the display of the media content playback device.

The method of operation in a content delivery platform including at least one processor-based component having at least one nontransitory processor-readable medium communicatively coupled to the processor and which stores at least one of processor-executable instructions or data may further include: receiving, by the at least one processor-based component, a selection that identifies one of the narrative segments of the subset of the narrative segments of the respective narrative; and causing, by the at least one processor-based component, a presentation of the narrative segment of the subset of narrative segments of the respective narrative that corresponds to the received selection.

The method of operation in a content delivery platform including at least one processor-based component having at least one nontransitory processor-readable medium communicatively coupled to the processor and which stores at least one of processor-executable instructions or data may further include: collecting, by the at least one processor-based component, priming stimulus data and selection data for at least one user; and analyzing, by the at least one processor-based component, the collected priming stimulus data and the selection data; wherein causing a providing of a priming stimulus may include causing a providing of a priming stimulus based at least in part on the analyzed priming stimulus data and the selection data.

Analyzing the collected priming stimulus data and the selection data may include analyzing the collected priming stimulus data and the selection data for a single user to determine to which priming stimuli the single user is most responsive. Analyzing the collected priming stimulus data and the selection data may include analyzing the collected priming stimulus data and the selection data for a group of users to determine to which priming stimuli the group of users are most responsive. Analyzing the collected priming stimulus data and the selection data for a group of users to determine to which priming stimuli the group of users is most responsive may include analyzing the collected priming stimulus data and the selection data for a group of users in an identified demographic.

The method of operation in a content delivery platform including at least one processor-based component having at least one nontransitory processor-readable medium communicatively coupled to the processor and which stores at least one of processor-executable instructions or data may further include: collecting, by the at least one processor-based component, selection data for at least one user; wherein causing a providing of a target stimulus may include causing a providing of a target stimulus based at least in part on the collected selection data for the at least one user.

A content delivery system may be summarized as including: at least one processor-based component; and at least one nontransitory processor-readable medium communicatively coupled to the at least one processor-based component and which stores a plurality of narratives, each narrative comprised of a set of a plurality of narrative segments, at least two of the narrative segments of each of the narratives having a distinct temporal order within a time sequence of events of the respective narrative, the at least one nontransitory processor-readable medium further stores at least one of data or processor-executable instructions, that when executed by the at least one processor-based component of the content delivery system, cause the at least one processor-based component to: cause a presentation of one of the narrative segments of the respective narrative which includes a priming stimulus; and cause a providing of a prompt to select between a number of narrative segments in a subset of the narrative segments of the respective narrative, the prompt includes a target stimulus associated with at least one selection-influenced narrative segment in the subset of the narrative segments, wherein user exposure to the priming stimulus influences selection of the at least one selection-influenced narrative segment.

At least one of the priming stimulus or the target stimulus may include at least one of an audible stimulus, a tactile stimulus, or a visual stimulus. At least one of the priming stimulus or the target stimulus may include a device vibration stimulus. The at least one processor-based component may cause a providing of a priming stimulus a plurality of times during the presentation of the one of the narrative segments of the respective narrative. The at least one processor-based component may cause a providing of a target stimulus that is of the same sensory modality as the provided priming stimulus. The at least one processor-based component may cause a providing of a target stimulus during the providing of the prompt that decreases a probability of selection of the at least one selection-influenced narrative segment associated with the target stimulus. The priming stimulus may be below a human user's threshold for conscious perception. The priming stimulus may be presented for a duration of less than 500 milliseconds during the presentation of the one of the narrative segments of the respective narrative. The target stimulus may be of a different sensory modality than the priming stimulus. The priming stimulus may include a first priming stimulus and a second priming stimulus, the second priming stimulus may be of a different sensory modality from the first priming stimulus. The target stimulus may be of a different sensory modality from at least one of the first priming stimulus and the second priming stimulus. The at least one processor-based component may: cause a sequential providing of a prompt to select between a number of narrative segments in a subset of the narrative segments of the respective narrative; and cause a providing of a target stimulus during the providing of the at least one of a number of prompts associated with the target stimulus. The at least one processor-based component may cause a providing of an audible priming stimulus to be presented on a number of audio channels of a media content playback device less than a total number of available audio channels of the media content playback device. The at least one processor-based component may cause a providing of an audible target stimulus to be presented on the number of audio channels of the media content playback device less than the total number of available audio channels of the media content playback device. The at least one processor-based component may: cause a determination or a prediction of a gaze location on a display of a media content playback device whereat a view of a user is focused; and cause a providing of a priming stimulus to be presented at the determined or predicted gaze location on the display of the media content playback device. The at least one processor-based component may: receive a selection that identifies one of the narrative segments of the subset of the narrative segments of the respective narrative; and cause a presentation of the narrative segment of the subset of narrative segments of the respective narrative that corresponds to the received selection. The at least one processor-based component may: collect priming stimulus data and selection data for at least one user; analyze the collected priming stimulus data and the selection data; and cause a providing of a priming stimulus to be presented during the presentation of the one of the narrative segments of the respective narrative based at least in part on the analyzed priming stimulus data and the selection data. The at least one processor-based component may analyze the collected priming stimulus data and the selection data for a single user to determine to which priming stimuli the single user is most responsive. The at least one processor-based component may analyze the collected priming stimulus data and the selection data for a group of users to determine to which priming stimuli the group of users is most responsive. The at least one processor-based component may analyze the collected priming stimulus data and the selection data for a group of users in an identified demographic. The at least one processor-based component may: collect selection data for at least one user; and cause a providing of a target stimulus during the providing of the prompt based at least in part on the collected selection data for the at least one user.

A method of operation in a narrative editing system which includes at least one processor, and at least one nontransitory process-readable medium that stores at least one of processor-executable instructions or data, the narrative editing system operable to edit a narrative comprised of a plurality of narrative segments, may be summarized as including: providing at least one user interface with a plurality of user interface elements, the user interface elements including at least one priming selection user interface element, which in use sets a priming selection for at least one selection-influenced narrative segment, the selection of which is to be influenced by priming, the at least one selection-influenced narrative segment is to be included in a prompt to select between a number of narrative segments during a presentation of the narrative; in response to the priming selection for the at least one selection-influenced narrative segment, logically associating the priming selection with the at least one selection-influenced narrative segment in the at least one nontransitory process-readable medium; logically associating a priming stimulus with at least one of the narrative segments of the narrative that is to be presented prior to the presentation of the at least one selection-influenced narrative segment in the at least one nontransitory process-readable medium, the priming stimulus provided during a presentation of the at least one of the narrative segments of the narrative that is to be presented prior to the presentation of the at least one selection-influenced narrative segment; and logically associating a target stimulus with the prompt in which the selection-influenced narrative segment is to be included in the at least one nontransitory process-readable medium, the target stimulus provided during a providing of the prompt, wherein user exposure to the priming stimulus influences selection of the at least one selection-influenced narrative segment.

Providing at least one user interface may further include providing a user interface which includes a stimulus selection user interface element that in use sets at least one stimulus characteristic of at least one of the priming stimulus or the target stimulus, the method further including, in response to the setting of the at least one stimulus characteristic for the at least one of the priming stimulus or the target stimulus via the at least one user interface, logically associating the at least one stimulus characteristic with the at least one of the priming stimulus or the target stimulus in the at least one nontransitory process-readable medium. Providing the user interface which includes a stimulus selection user interface element may include providing a user interface which includes a stimulus selection user interface element that in use sets a stimulus sensory modality for at least one of the priming stimulus or the target stimulus. Logically associating a target stimulus with the prompt in which the selection-influenced narrative segment is included in the at least one nontransitory process-readable medium may include logically associating a target stimulus that is of the same sensory modality as the priming stimulus with the prompt in the at least one nontransitory process-readable medium. Logically associating a target stimulus with the prompt in which the selection-influenced narrative segment is included in the at least one nontransitory process-readable medium may include logically associating a target stimulus that decreases a probability of selection of the selection-influenced narrative segment. Logically associating a priming stimulus with at least one of the narrative segments may include logically associating a priming stimulus that is below a human user's conscious perception with at least one of the narrative segments in the at least one nontransitory process-readable medium. Logically associating a priming stimulus with at least one of the narrative segments may include logically associating a priming stimulus having a presentation duration of less than 500 milliseconds with at least one of the narrative segments in the at least one nontransitory process-readable medium. Logically associating a priming stimulus with at least one of the narrative segments may include logically associating a plurality of priming stimuli with at least one of the narrative segments in the at least one nontransitory process-readable medium. Logically associating a priming stimulus with at least one of the narrative segments may include logically associating an audible priming stimulus with at least one of the narrative segments, the audible priming stimulus provided during the presentation of the one of the narrative segments on a number of audio channels of a media content playback device less than a total number of available audio channels of the media content playback device.

The method operation in a narrative editing system which includes at least one processor, and at least one nontransitory process-readable medium that stores at least one of processor-executable instructions or data, the narrative editing system operable to edit a narrative comprised of a plurality of narrative segments may further include: collecting priming stimulus data and selection data for at least one user; and analyzing the collected priming stimulus data and the selection data; wherein logically associating a priming stimulus with at least one of the narrative segments may include logically associating a priming stimulus with at least one of the narrative segments based at least in part on the analyzed priming stimulus data and the selection data.

Analyzing the collected priming stimulus data and the selection data may include analyzing the collected priming stimulus data and the selection data for a single user to determine to which priming stimuli the single user is most responsive. Analyzing the collected priming stimulus data and the selection data may include analyzing the collected priming stimulus data and the selection data for a group of users to determine to which priming stimuli the group of users are most responsive. Analyzing the collected priming stimulus data and the selection data for a group of users to determine to which priming stimuli the group of users is most responsive may include analyzing the collected priming stimulus data and the selection data for a group of users in a determined demographic.

A narrative editing system may be summarized as including: at least one processor; and at least one nontransitory process-readable medium that stores at least one of data or processor-executable instructions, that when executed by the at least one processor, cause the at least one processor to: provide at least one user interface with at least one user interface element, the at least one user interface element including: at least one priming selection user interface element, which in use sets a priming selection for at least one selection-influenced narrative segment, the selection of which is to be influenced by priming, the at least one selection-influenced narrative segment is to be included in a prompt to select between a number of narrative segments during a presentation of the narrative; wherein the at least one processor: in response to the priming selection for the at least one selection-influenced narrative segment, logically associates the priming selection with the at least one selection-influenced narrative segment in the at least one nontransitory process-readable medium; logically associates a priming stimulus with at least one of the narrative segments of the narrative that is to be presented prior to the presentation of the at least one selection-influenced narrative segment in the at least one nontransitory process-readable medium, the priming stimulus provided during a presentation of the at least one of the narrative segments of the narrative that is to be presented prior to the presentation of the at least one selection-influenced narrative segment; and logically associates a target stimulus with the prompt in which the selection-influenced narrative segment is to be included in the at least one nontransitory process-readable medium, the target stimulus provided during a providing of the prompt, wherein user exposure to the priming stimulus influences selection of the at least one selection-influenced narrative segment.

The at least one processor may: provide a user interface which includes a stimulus selection user interface element that in use sets at least one stimulus characteristic of at least one of the priming stimulus or the target stimulus; and in response to the setting of the at least one stimulus characteristic for the at least one of the priming stimulus or the target stimulus via the at least one user interface, may logically associate the at least one stimulus characteristic with the at least one of the priming stimulus or the target stimulus in the at least one nontransitory process-readable medium. The at least one processor may provide a user interface which includes a stimulus selection user interface element that in use sets a stimulus sensory modality for at least one of the priming stimulus or the target stimulus. The at least one processor may logically associate a target stimulus that is of the same sensory modality as the priming stimulus with the prompt in the at least one nontransitory process-readable medium. The at least one processor may logically associate a target stimulus that decreases a probability of selection of the selection-influenced narrative segment. The at least one processor may logically associate a priming stimulus that is below a human user's conscious perception with at least one of the narrative segments in the at least one nontransitory process-readable medium. The at least one processor may logically associate a priming stimulus having a presentation duration of less than 500 milliseconds with at least one of the narrative segments in the at least one nontransitory process-readable medium. The at least one processor may logically associate a plurality of priming stimuli with at least one of the narrative segments in the at least one nontransitory process-readable medium. The at least one processor may logically associate an audible priming stimulus with at least one of the narrative segments, the audible priming stimulus provided during the presentation of the one of the narrative segments on a number of audio channels of a media content playback device less than a total number of available audio channels of the media content playback device. The at least one processor may: collect priming stimulus data and selection data for at least one user; analyze the collected priming stimulus data and the selection data; and logically associate a priming stimulus with at least one of the narrative segments based at least in part on the analyzed priming stimulus data and the selection data. The at least one processor may analyze the collected priming stimulus data and the selection data for a single user to determine to which priming stimuli the single user is most responsive. The at least one processor may analyze the collected priming stimulus data and the selection data for a group of users to determine to which priming stimuli the group of users is most responsive. The at least one processor may analyze the collected priming stimulus data and the selection data for a group of users to determine to which priming stimuli the group of users is most responsive which may include analyzing the collected priming stimulus data and the selection data for a group of users in a determined demographic.

BRIEF DESCRIPTION OF THE DRAWINGS

In the drawings, identical reference numbers identify similar elements or acts. The sizes and relative states of elements in the drawings are not necessarily drawn to scale. For example, the positions of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 1E is a flow diagram depicting another illustrative content delivery system narrative presentation created using a number of user inputs provided to the content delivery system, each input indicative of a selection of serial, narrative segments, according to one illustrated embodiment.

FIG. 2 is a simplified block diagram of an illustrative content editor system, according to one illustrated embodiment.

DETAILED DESCRIPTION

Figure 1A:
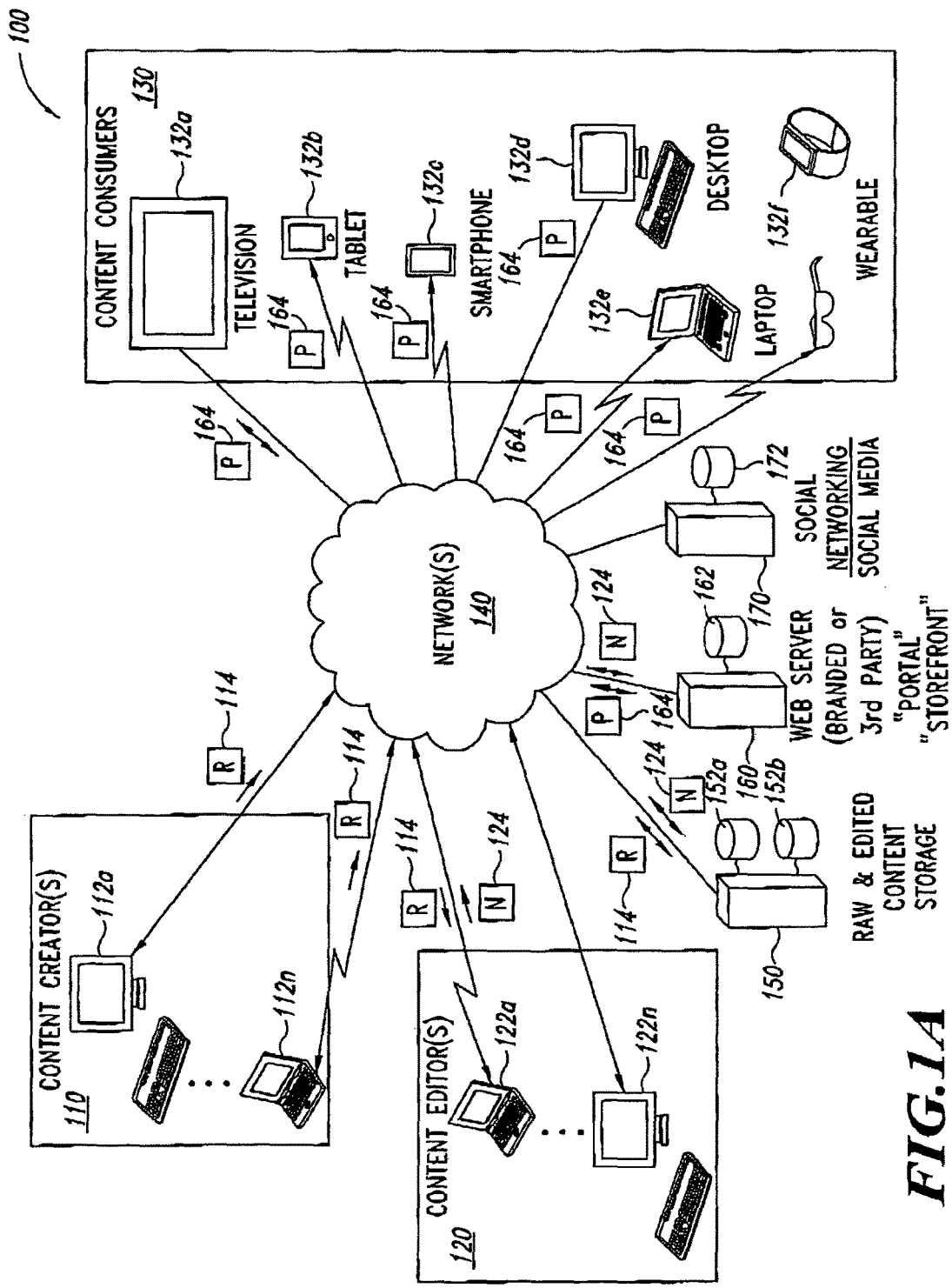
FIG. 1A is a schematic diagram of an illustrative content delivery system network that includes media content creators, media content editors, and media content consumers, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with processors, user interfaces, nontransitory storage media, media production, or media editing techniques have not been shown or described in detail to avoid unnecessarily obscuring descriptions of the embodiments. Additionally, tethered and wireless networking topologies, technologies, and communications protocols are not shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

As used herein the terms "production team" and "production or editing teams" should be understood to refer to a team including one or more persons responsible for any aspect of producing, generating, sourcing, or originating media content that includes any form of human perceptible communication including, without limitation, audio media presentations, visual media presentations, and audio/visual media presentations.

As used herein the terms "editing team" and "production or editing teams" should be understood to refer to a team including one or more persons responsible for any aspect of editing, altering, joining, or compiling media content that includes any form of human perceptible communication including, without limitation, audio media presentations, visual media presentations, and audio/visual media presentations. In at least some instances, one or more persons may be included in both the production team and the editing team.

As used herein the term "aspects of inner awareness" should be understood to refer to inner psychological and physiological processes and reflections on and awareness of inner mental and somatic life. Such awareness can include, but is not limited to the mental impressions of an individual's internal cognitive activities, emotional processes, or bodily sensations. Manifestations of various aspects of inner awareness may include, but are not limited to self-awareness or introspection. Generally, the aspects of inner awareness are intangible and often not directly externally visible but are instead inferred based upon a character's words, actions, and outwardly expressed emotions. Other terms related to aspects of inner awareness may include, but are not limited to, metacognition (the psychological process of thinking about thinking), emotional awareness (the psychological process of reflecting on emotion), and intuition (the psychological process of perceiving somatic sensations or other internal bodily signals that shape thinking). Understanding a character's aspects of inner awareness may provide enlightenment to a media content consumer on the underlying reasons why a character acted in a certain manner within a narrative presentation. Providing media content including aspects of a character's inner awareness enables production or editing teams to include additional material that expands the narrative presentation for media content consumers seeking a better understanding of the characters within the narrative presentation.

As used herein the term "media content consumer" should be understood to refer to one or more persons or individuals who consume or experience media content in whole or in part through the use of one or more of the human senses (i.e., seeing, hearing, touching, tasting, smelling).

As used herein the terms "narrative" and "narrative presentation" should be understood to refer to a human perceptible presentation including audio presentations, video presentations, and audio-visual presentations. A narrative typically presents a story or other information in a format including at least two narrative segments having a distinct temporal order within a time sequence of events of the respective narrative. For example, a narrative may include at least one defined beginning or foundational narrative segment. A narrative also includes one additional narrative segment that falls temporally after the beginning or foundational narrative segment. In some implementations, the one additional narrative segment may include at least one defined ending narrative segment. A narrative may be of any duration.

As used herein the term "narrative segment" should be understood to refer to a human perceptible presentation including an audio presentation, a video presentation, and an audio-visual presentation. A narrative includes a plurality of narrative events that have a sequential order within a timeframe of the narrative, extending from a beginning to an end of the narrative. The narrative may be composed of a plurality of narrative segments, for example a number of distinct scenes. At times, some or all of the narrative segments forming a narrative may be user selectable. At times some of the narrative segments forming a narrative may be fixed or selected by the narrative production or editing team. At times an availability of some of the narrative segments to a media content consumer may be conditional, for example subject to one or more conditions set by the narrative production or editing team. A narrative segment may have any duration, and each of the narrative segments forming a narrative may have the same or different durations. In most instances, a media content consumer will view a given narrative segment of a narrative in its entirety before another narrative segment of the narrative is subsequently presented to the media content consumer.

As used herein the term "additional or bonus content" should be understood to refer to a human perceptible presentation including audio presentation, a video presentation, and an audio-visual presentation, which may or may not be of narrative form, and which may or may not form part of a primary narrative. For example, additional or bonus content may explore the psychological makeup of a character in a narrative without actually forming part of the narrative, or may include comments by an author, director or recognized expert commenting on the same or on the creation of the narrative or meaning underlying the narrative. Within some narrative segments one or more cues may be presented to the media content consumer. Each of these cues is linked to an additional or bonus content that provides the media content consumer with additional information that is not included in the respective narrative segment. For example, such cues may be presented during a narrative segment to provide the media content consumer with access to an additional or bonus content dealing with an aspect of inner awareness of a narrative segment character (i.e., the character's thoughts, emotions, and/or instincts). When a media content consumer input corresponding to a selection of such a cue or prompt is received, the respective narrative segment is paused, suspended, or terminated while the additional or bonus content corresponding to the cue or prompt selected by the media content consumer is presented. At the conclusion or termination of the additional or bonus content, the presentation of the respective narrative segment resumes, returns, or restarts.

The headings and Abstract of the Disclosure provided herein are for convenience only and do not interpret the scope or meaning of the embodiments.

Implementations of the present disclosure are directed to systems, methods and articles for providing content creators or content editors of an interactive narrative the ability to influence a content consumer's selections in a desired direction without eliciting the content consumer's explicit awareness of any such influence. Thus, the content consumer experiences an apparent full freedom of choice. Initially, with reference to FIGS. 1-11C, systems, methods and articles for allowing content creators and content editors to create and edit content to produce narrative segments that can be assembled into narrative presentations are described. Then, with reference to FIGS. 12-20, systems, methods and articles for allowing content creators and content editors to influence content consumers' selections in an interactive narrative presentation are described.

Narrative Presentation System

FIG. 1 shows an example network environment in which content creators 110, content editors 120, and content consumers 130 are able to create and edit raw content 114 to produce narrative segments 124 that can be assembled into narrative presentations 164, according to an illustrative embodiment. A content creator 110, for example a production team, generates raw (i.e., unedited) content 114 that is edited and assembled into at least one narrative 164 by an editing team. This raw content may be generated in analog format (e.g., film images, motion picture film images), digital format (e.g., digital audio recording, digital video recording, digitally rendered audio and/or video recordings, computer generated imagery ["CGI"]). Where at least a portion of the content is in analog format, one or more converter systems or processors convert the analog content to digital format. The production team, using one or more processor-based devices 112a-112n (collectively, "production processor-based devices 112"), communicates the content to one or more raw content storage systems 150 via the network 140.

An editing team, serving as content editors 120, accesses the raw content 114 and edits the raw content 114 via a number of processor-based editing systems 122a-122n (collectively "content editing systems 122") into a number of narrative segments 124. These narrative segments 124 are assembled at the direction of the editing or production teams to form a collection of narrative segments and additional or bonus content that, when combined, provide a narrative 164. The narrative 164 can be delivered to one or more media content consumer processor-based devices 132a-132n (collectively, "media content consumer processor-based devices 132") either as one or more digital files via network 140 or via a nontransitory storage media such as a compact disc (CD); digital versatile disk (DVD); or any other current or future developed nontransitory digital data carrier.

In some implementations, the media content consumers 130 may access the narrative presentations 164 via one or more media content consumer processor-based devices 132. These content consumer processor-based devices 132 can include, but are not limited to: televisions or similar image display units 132a, tablet computing devices 132b, smart-phones and handheld computing devices 132c, desktop computing devices 132d, laptop and portable computing devices 132e, and wearable computing devices 132f. At times, a single media content consumer 130 may access a narrative 164 across multiple devices and/or platforms. For example, a media content consumer may non-contemporaneously access a narrative 164 using a plurality of content consumer processor-based devices 132. For example, a media content consumer 130 may consume a narrative 164 to a first point using a television 132a in their living room and then may access the narrative presentation at the first point using their tablet computer 132b or smartphone 132c as they ride in a carpool to work.

At times, the narrative 164 may be stored in one or more nontransitory storage locations 162, for example coupled to a Web server 160 that provides a network accessible portal via network 140. In such an instance, the Web server 160 may stream the narrative 164 to the media content consumer processor-based device 132. For example, the narrative 164 may be presented to the media content consumer 130 on the device 132 used by the media content consumer 130 to access the portal on the Web server 160 upon the receipt, authentication, and authorization of log-in credentials identifying the respective media content consumer 130. Alternatively, the entire narrative 164, or portions thereof (e.g., narrative segments), may be retrieved on an as needed or as requested basis as discrete units (e.g., individual files), rather than streamed. Alternatively, the entire narrative 164, or portions thereof, may be cached or stored on the device 132, for instance before selection of specific narrative segments by the media content consumer 130. On some implementations, one or more content delivery networks (CDNs) may cache narratives at a variety of geographically distributed locations to increase a speed and/or quality of service in delivering the narrative content.

Note that the narrative segment features and relationships discussed with regard to FIGS. 1B-1E appear in different figures for clarity and ease of discussion. However, some or all of the narrative segment features and relationships included in FIGS. 1B-1E are combinable in any way or in any manner to provide additional embodiments. Such additional embodiments generated by combining narrative segment features and relationships fall within the scope of this disclosure.

Figure 1B:
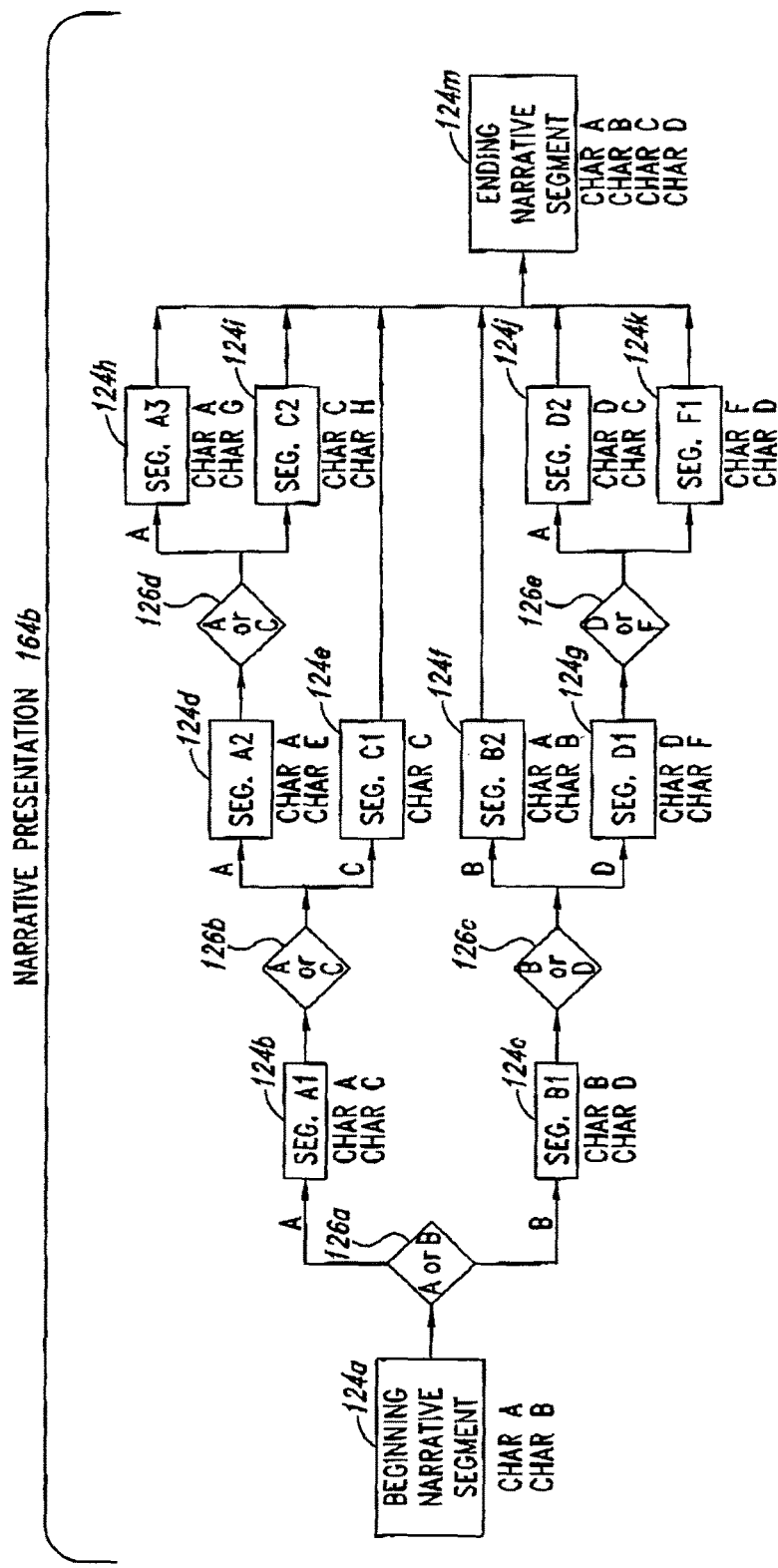
FIG. 1B is a flow diagram depicting an illustrative content delivery system narrative presentation created using a number of user inputs provided to the content delivery system, each input indicative of a selection of serial, narrative segments, according to one illustrated embodiment.

Referring now to FIG. 1B, the media content consumer 130 receives narrative 164B as a series of narrative segments 124a-124m. Narrative segment 124a represents the beginning or foundational narrative segment and narrative segment 124m represents a temporally later narrative segment, and for example each are available to every media content consumer 130 accessing the narrative 164B and presented to every media content consumer 130 who elects to view such. By presenting the same beginning or foundational narrative segment 124a, each media content consumer 130 may for example, be introduced to an overarching common story and plotline. Optionally, the narrative 164 may have a single terminal or ending narrative segment 124m (e.g., finale, season finale, narrative finale). Thus, at least some of the narrative segments 124 subsequent to the beginning or foundational narrative segment 124a represent segments selectable by the media content consumer 130. It is the particular sequence of narrative segments 124 selected by the media content consumer that determines the details and sub-plots (within the context of the overall story and plotline of the narrative 164) experienced or perceived by the particular media content consumer 130.

In FIG. 1B, the beginning or foundational narrative segment 124a includes two characters "CHAR A" and "CHAR B." At the conclusion of narrative segment 124a, the media content consumer 130 is presented with a prompt 126a including icons representative of a subset of available narrative segments. The subset of narrative segments associated with prompt 126a may, for example, include a first narrative segment that is associated with CHAR A and a second narrative segment that is associated with CHAR B. The media content consumer 130 selects an icon to continue the narrative presentation. If the media content consumer selects the icon representative of the first narrative segment that is associated with CHAR A at option 126a, a narrative segment 124b containing characters CHAR A and CHAR C is presented to the media content consumer 130. At the conclusion of narrative segment 124b, the media content consumer is presented with a prompt 126b requiring the selection of an icon representative of either CHAR A or CHAR C to continue the narrative presentation.

If instead, the media content consumer selects the icon representative of the second narrative segment that is associated with CHAR B at option 126a, a narrative segment 124c containing characters CHAR B and CHAR D is presented to the media content consumer 130.

As depicted in FIG. 1B, not every narrative segment 124 need include or conclude with a prompt 126 containing a plurality of icons, each of which corresponds to a respective media content consumer-selectable narrative segment 124. For example, if the media content consumer 130 selects CHAR C at prompt 126b, the media content consumer 130 is presented narrative segment 124e followed by the ending narrative segment 124m. Additionally, each narrative segment 124 need not introduce new characters. For example, if the media content consumer 130 selects CHAR B at prompt 126c, the media content consumer 130 is presented narrative segment 124f which includes CHAR A and CHAR B (introduced in the beginning or foundational narrative segment 124a) followed by terminal or ending narrative segment 124m.

Additionally, recognize that dependent on the narrative segments 124 selected by the media content consumer 130, not every media content consumer 130 is necessarily presented the same number of narrative segments 124 or the same narrative segments. Notably, there is also a distinction between the number of narrative segments 124 presented to the media content consumer 130 and the duration of the narrative segments 124 presented to the media content consumer 130. For example, narrative segment 124e may be 15 minutes in length while narrative segments 124d, 124h, and 124i may each be 7.5 minutes in length. Thus, the selection of either CHAR A or CHAR C at prompt 126b by the media content consumer 130 results in an additional 15 minutes of narrative 164B prior to the presentation of the ending narrative presentation 124m even though a different number of narrative segments 124 are received by the media content consumer 130. Alternatively, the overall duration of the narrative 164B may vary dependent upon the number and/or length of each of the narrative segments 124 selected by the media content consumer 130.

Advantageously, while each media content consumer 130 receives the same overall storyline in the narrative 164, because media content consumers 130 are able to select different respective narrative segment "paths" though the narrative 164B, the media content consumers 130 will have different impressions, feelings, emotions, and experiences, at the conclusion of the narrative 164B.

At times, at the conclusion of the narrative 164B there may be at least some previously non-selected narrative segments 124 which the media content consumers 130 may not be permitted access, either permanently or without meeting some defined condition(s). Promoting an exchange of ideas, feelings, emotions, perceptions, and experiences of media content consumers 130 via social media 170 may beneficially increase interest in the respective narrative 164B, increasing the attendant attention or word-of-mouth promotion of the respective narrative 164B among media content consumers 130. Such attention advantageously fosters the discussion and exchange of ideas between media content consumers 130 since different media content consumers take different narrative segment paths through the narrative 164B, and may otherwise be denied access to one or more narrative segments of a narrative which was not denied to other media content consumers. This may create the perception among media content consumers 130 that interaction and communication with other media content consumers 130 is beneficial in better or more fully understanding the respective narrative 164B. At least some of the approaches described herein provide media content consumers 130 with the ability to selectively view narrative segments 124 in an order either completely self-chosen, or self-chosen within a framework of order or choices and/or conditions defined by the production or editing teams. Allowing the production or editing teams to define a framework of order or choices and/or conditions maintains the artistic integrity of the narrative 164B while promoting discussion related to the narrative presentation (and the different narrative segment paths through the narrative presentation) among media content consumers 130. Social media and social networks such as FACEBOOK®, TWITTER®, SINA WEIBO, FOURSQUARE®, TUMBLR®, SNAPCHAT®, and/or VINE® facilitate such discussion among media content consumers 130.

In some implementations, media content consumers 130 may be rewarded or provided access to previously inaccessible non-selected narrative segments 124 contingent upon the performance of one or more defined activities. In some instances, such activities may include generating or producing one or more social media actions, for instance social media entries related to the narrative presentation (e.g., posting a comment about the narrative 164B to a social media "wall", "liking", or linking to the narrative, narrative segment, narrative character, author or director). Such selective unlocking of non-selected narrative segments may advantageously create additional attention around the respective narrative 164B as media content consumers 130 further exchange communications in order to access some or all of the non-selected narrative segments 124. At times, access to non-selected narrative segments 124 may granted contingent upon meeting one or more defined conditions associated with social media or social networks. For example, access to a non-selected narrative segment 124 may be conditional upon receiving a number of favorable votes (e.g., FACEBOOK® LIKES) for a comment associated with the narrative 164B. Other times, access to non-selected narrative segments 124 may be granted contingent upon a previous viewing by the media content consumer, for instance having viewed a defined number of narrative segments, having viewed one or more particular narrative segments, having followed a particular path through the narrative. Additionally or alternative, access to non-selected narrative segments 124 may granted contingent upon sharing a narrative segment with another media content consumer or receiving a narrative segment or access thereto as shared by another media content consumer with the respective media content consumer.

Figure 1C:
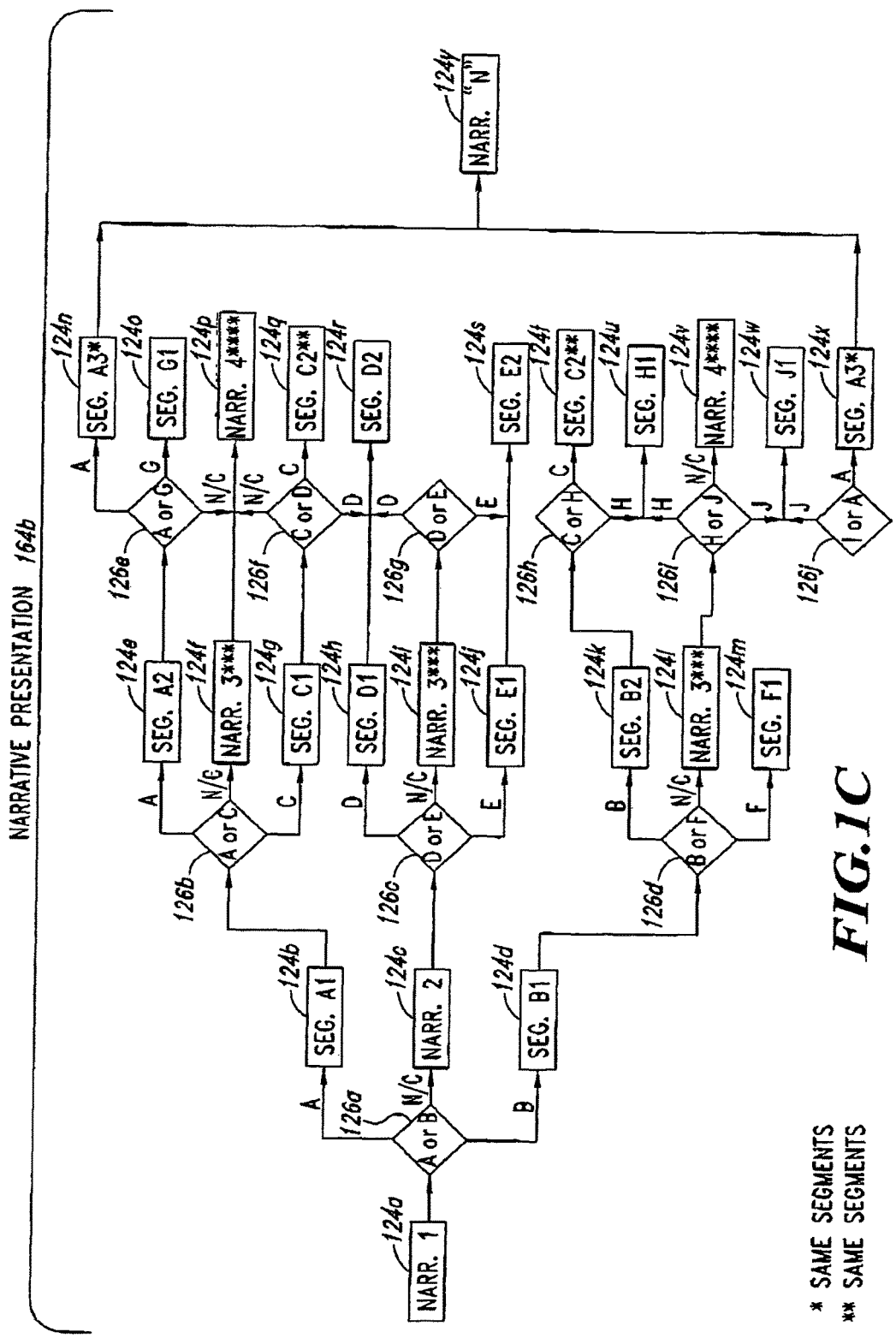
FIG. 1C is a flow diagram depicting an illustrative content delivery system narrative presentation created using a number of default narrative segments and a number of user inputs provided to the content delivery system, each input indicative of a number of serial user-selected narrative segments, according to one illustrated embodiment.

Referring now to FIG. 1C, the media content consumer 130 receives narrative 164C as a series of narrative segments 124a-124x. As an example, the narrative 164C includes a beginning or foundational narrative segment 124a and an ending narrative segment 124x that have a distinct temporal order within a time sequence of the respective narrative. By presenting the same beginning or foundational narrative segment 124a and the same ending narrative segment 124x, each media content consumer 130 experiences an overarching commonality of story and plotline for narrative 164C. However, at least some of the narrative segments 124 between the beginning or foundational narrative segment 124a and the ending narrative segment 124x represent narrative segments selectable by the media content consumer 130. It is the particular series or sequence of narrative segments 124, and the order thereof, as selected by the media content consumer 130 that defines the details and sub-plots (within the context of the overall story and plotline of the narrative 164C) perceived or experienced by each respective media content consumer 130.

At the conclusion of the beginning or foundational narrative segment 124a, the media content consumer is presented with a prompt 126a to select either CHAR A or CHAR B. While a binary decision is illustrated, other implementations may present more than two choices, and the choices may or may not map to specific characters in the narrative. As in FIG. 1B, selection of CHAR A by the media content consumer results in the presentation of narrative segment 124b and selection of CHAR B results in the presentation of narrative segment 124d. However, prompt 126a in FIG. 1C differs from prompt 126a in FIG. 1B in that the failure of the media content consumer 130 to make a selection at prompt 126a results in the presentation of a default narrative segment 124c. Alternatively, in the absence of a selection, no further narrative segments may be presented.

At the conclusion of narrative segments 124b, 124c, and 124d, the media content consumer 130 receives a respective prompt 126b, 126c, and 126d. A failure of the media content consumer 130 to select a narrative segment icon upon receipt of prompts 126b, 126c, and 126d results in the presentation of a default narrative segment 124f. Alternatively, in the absence of a selection, no further narrative segments may be presented.

At times, each of a plurality of narrative segments 124 may conclude with a respective prompt 126 that includes icons for a number of common narrative segments 124. For example, in narrative 164C, narrative segment 124e and 124m conclude with respective prompts 126e and 126j that each includes an icon for narrative segment 124n.

At times, dependent on the prior selections made by the media content consumer 130, one or more icons may not appear in a prompt 126 at the conclusion of a respective narrative segment 124. At times, a prompt 126 may or may not be provided at the conclusion of a respective narrative segment 124 dependent upon prior selections made by the media content consumer 130. Thus, both the presentation of a prompt 126 and the icons included in a particular prompt 126 may be conditionally determined at least in part based upon one or more inputs previously provided by the media content consumer 130.

For example, in narrative 164C a media content consumer 130 who selects CHAR A at prompt 126a receives narrative segment 124b and prompt 126b which includes icons for CHAR A and CHAR C. If no selection is made at prompt 126b, default narrative presentation 124f ("NARR 3") is presented followed by default narrative presentation 124p ("NARR 4") without an intervening prompt. Conversely, should the media content consumer 130 select CHAR B at prompt 126a that media content consumer will be provided narrative segment 124d followed by prompt 126d which includes icons for CHAR B and CHAR F. If no selection is made at prompt 126d, default narrative presentation 124f ("NARR 3") is presented followed by prompt 126i which includes icons for CHAR H and CHAR J. If no selection is made at prompt 126i, default narrative presentation 124p ("NARR 4") is presented to the media content consumer. Thus, the narrative segment path selected by a particular media content consumer 130 can alter the choices or icons included in subsequent prompts 126 and can also result in the elimination of one or more subsequent prompts 126. Furthermore, once a particular narrative segment 124 has been presented to a particular media content consumer 130, the icon associated with the particular narrative segment 124 may be removed from all subsequent prompts 126 provided to the media content consumer.

As such, the each prompt 126 represents a dynamic, changeable, entity, the content of which (i.e., the narrative segment icons) can be situationally altered based at least in part on conditions or logic provided by the production or editing teams as well as the prior selections made by the media content consumer during the instant narrative segment 164. The prompts 126 thus advantageously provide the production or editing teams with full artistic control of the narrative segments 124 made available to the media content consumer 130. For example, the production or editing teams are able to prevent the premature presentation of one or more narrative segments 124 to the media content consumer 130 unless a storyline sufficient to support the content of the respective narrative segments 124 has occurred. The prompts 126 also advantageously provide the media content consumer 130 with the flexibility to navigate through the narrative 164 using a sequence of personally selected narrative segments 124, for example within a framework established by the creative team (e.g., production and/or editing teams).

Figure 1D:
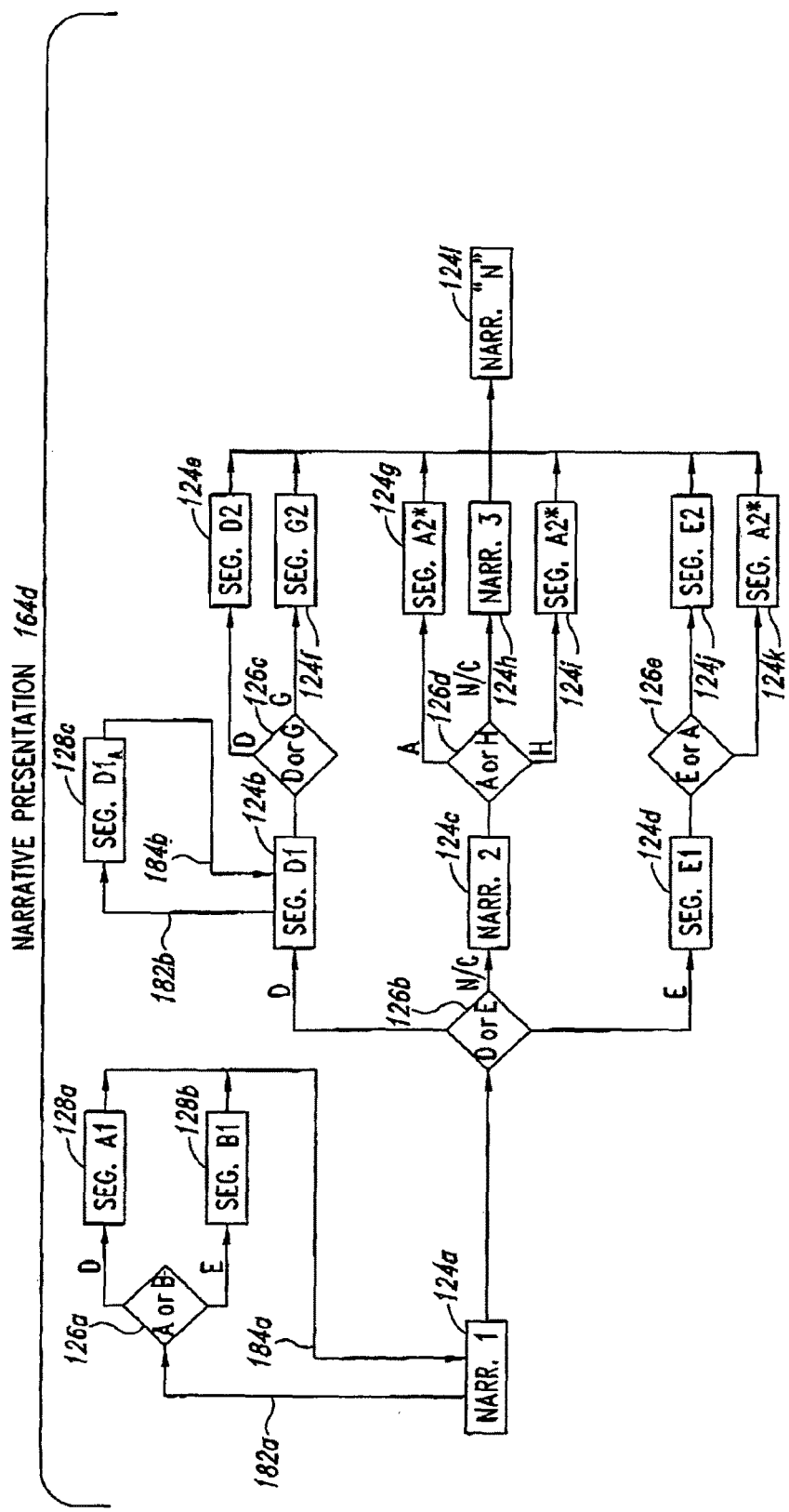
FIG. 1D is a flow diagram depicting an illustrative content delivery system narrative presentation created using a number of default narrative segments and a number of user inputs provided to the content delivery system and additionally including a number of additional or bonus content accessible by the media content consumer, according to one illustrated embodiment.

Referring now to FIG. 1D, the media content consumer 130 receives narrative 164D as a series of narrative segments 124a-124q along with a number of additional or bonus content 128a-128c (collectively, "additional or bonus content 128"). Narrative 164D may, for example, include a beginning or foundational narrative segment 124a and an ending narrative segment 124q that have a distinct temporal order within a time sequence of the respective narrative presentation. By presenting the same beginning or foundational narrative segment 124a and the same ending narrative segment 124q, each media content consumer 130 experiences an overarching commonality of story and plotline for narrative 164D. However, at least some of the narrative segments 124 between the beginning or foundational narrative segment 124a and the ending narrative segment 124q represent narrative segments selectable by the media content consumer 130. Additionally, additional or bonus content 128 may be provided to the media content consumer 130 during the presentation of at least some of the narrative segments 124 in the narrative presentation 128. At times, these additional or bonus content 128 may be provided as optional narrative segments that the media content consumer 130 may discretionarily dismiss without affecting the presentation of the respective narrative segment 124 during which the respective additional or bonus content 128 is available.

At times, these additional or bonus content 128 may be provided as required narrative segments that the media content consumer 130 may not dismiss and which must be viewed by the media content consumer 130 before the respective narrative segment 124 during which the respective additional or bonus content 128 is available is permitted to continue.

At times, such additional or bonus content 128 may provide the media content consumer 130 with additional insight into one or more aspects of inner awareness of a character appearing in the respective narrative segment 124 during which the respective additional or bonus content 128 is available. Such aspects of inner awareness may be useful in communicating one or more intangible aspects of the character to the media content consumer. For example, an icon or cue may appear proximate a character's head in a particular narrative segment 124. By selecting the icon or cue, an additional or bonus content associated with the character's thoughts is provided to the media content consumer 130. In another example, an icon or cue may appear proximate a character's chest in a particular narrative segment 124. By selecting the icon or cue, an additional or bonus content associated with the character's emotions (i.e., the character's heart) is provided to the media content consumer 130. In yet another example, an icon or cue may appear proximate a character's abdomen in a particular narrative segment 124. By selecting the icon or cue, an additional or bonus content associated with the character's intuition (i.e., "gut" feel) is provided to the media content consumer 130. These additional or bonus content 128 thus provide additional information, insight, or perspective that may not be readily communicable, apparent, or discernible to the media content consumer 130 via the respective narrative segment 124.

In some instances, one or more prompts 126 may be provided to permit a media content consumer 130 to select between a number of additional or bonus content 128. As shown in narrative 164D, during the beginning or foundational narrative segment 124a, an icon or cue appears in the narrative segment 124a alerting the media content consumer 130 to the presence of an additional or bonus content 128. In some instances, two or more such icons or cues may appear in the narrative segment 124 and the icon or cue selected by the media content consumer 130 identifies the respective additional or bonus content 128 presented to the media content consumer 130. In other instances, a single icon or cue may appear in the narrative segment 124, selecting the icon or cue presents the media content consumer with a prompt 126a that includes a number of icons, each corresponding to an additional or bonus content 128a, 128b.

At times, the icon or cue corresponding to one or more available additional or bonus content 128 may appear throughout the narrative segment 124. At other times, the icon or cue corresponding to one or more available additional or bonus content 128 may appear for only a portion of the narrative segment 124.

In contrast to the prompt 126 which occurs at the conclusion of a narrative segment 124, the icon or cue associated with an additional or bonus content 128 may appear in the narrative segment 124 at a point or for an interval prior to the conclusion of the respective narrative segment 124. A departure point is the point in the narrative segment 124 at which the media content consumer selects an icon or cue to commence the presentation of an additional or bonus content 128. A return point is the point at which the respective narrative segment 124 resumes at the conclusion of the selected additional or bonus content 128. At times, the narrative segment 124 pauses during the presentation of the supplemental narrative segment, in such instances the return point is the same temporal location in the narrative segment 124 as the departure point (i.e., the narrative segment 124 resumes where it left off to present the additional or bonus content 128). At other times, the return point may be at a different temporal location in the narrative segment 124 as the departure point. For example, the return point may be at a temporal location prior or subsequent to the departure point. In yet other times, the return point may be the start of the respective narrative segment 124.

At the conclusion of the additional or bonus content 128a, 128b, beginning or foundational narrative segment 124a commences at the return point 184a. At the conclusion of the beginning or foundational narrative segment 124a, a prompt 126b presents icons for CHARD which causes the presentation of narrative segment 124b and CHAR E which causes the presentation of narrative segment 124d. If no choice is provided in response to prompt 126b, default narrative segment 124c is presented.

An icon or cue is displayed during the presentation of narrative segment 124b. If the icon or cue is selected by the media content consumer, additional or bonus content 128c is presented. Additional or bonus content 128c may present one or more aspects of inner awareness associated with a character appearing in narrative segment 124b. The additional or bonus content 128c departs narrative segment 124b at departure point 182b. At the conclusion of the subordinate narrative presentation 128c, narrative segment 124c resumes at return point 184b.

Referring now to FIG. 1E, the media content consumer 130 receives narrative 164E as a series of narrative segments 124a-124k. Narrative 164E, for example, includes a beginning or foundational narrative segment 124a and an ending narrative segment 124k that have a distinct temporal order within a time sequence of narrative 164E. By presenting the same beginning or foundational narrative segment 124a and the same ending narrative segment 124k, each media content consumer 130 experiences an overarching commonality of story and plotline for narrative 164E. However, at least some of the narrative segments 124 between the beginning or foundational narrative segment 124a and the ending narrative segment 124k represent narrative segments selectable by the media content consumer 130. It is the particular series or sequence of narrative segments 124 selected by the media content consumer 130 that defines the details and sub-plots (within the context of the overall story and plotline of the narrative 164E) experienced by each respective media content consumer 130.

At the conclusion of the beginning or foundational narrative segment 124a, the media content consumer is presented with a prompt 126a to that includes icons corresponding to CHAR A, CHAR B, CHAR C, and CHAR D. Selection of an icon corresponding to CHAR A at prompt 126a by the media content consumer results in the presentation of narrative segment 124b. Selection of an icon corresponding to CHAR B at prompt 126a results in the presentation of narrative segment 124c. Selection of Selection of an icon corresponding to CHAR C at prompt 126a results in the presentation of narrative segment 124e. Selection of an icon corresponding to CHAR D at prompt 126a results in the presentation of narrative segment 124f Note that prompt 126a can provide icons corresponding to any number of narrative segments 124 increasing the artistic and storytelling capabilities of the production or editing teams. If the media content consumer 130 fails to make a selection at prompt 126a within a defined time limit or before the occurrence of a defined event, a default narrative segment 124d is presented. Alternatively, the narrative may remain stopped until a selection is made.

At the conclusion of any of narrative segments 124b-124f, narrative segment 124g is presented to the media content consumer 130. At the conclusion of narrative segment 124g, the media content consumer 130 is presented with a prompt 126b to select either CHAR A, CHAR C, or CHAR D. Selection of CHAR A by the media content consumer results in the presentation of narrative segment 124h. Selection of an icon corresponding to CHAR C at prompt 126b results in the presentation of narrative segment 124i. Selection of an icon corresponding to CHAR D results in the presentation of narrative segment 124f. Note that an icon corresponding to CHAR B is not provided at prompt 126b. At times, narrative segments corresponding to all characters may or may not be available over the course of the narrative 164E.

Advantageously, the icons appearing on each prompt 126 may be dynamically selected based on rules or conditions provided by the production or editing teams. Such rules or conditions may include providing icons on a particular prompt 126 based at least in part on actions (e.g., previous icon selections) provided by the media content consumer 130. For example, if protagonist ALPHA interacts with a minor character BETA as part of a secondary storyline, the production and editing team may make the inclusion of BETA icons in prompt 126 contingent upon the media content consumer selecting the BETA icon on the prompt 126 on which the icon first appears. In other words, the media content consumer's failure to select the BETA icon when first included on prompt 126a precludes the provision of the BETA icon in all subsequent prompts 126b-126n. One can readily appreciate the flexibility available to the production or editing teams in creating more complex conditional requirements that govern the inclusion of icons on prompts 126.

Each media content consumer 130 will consume a narrative 164 by following at least one of a number of sequences of narrative segments 124a-124n from the beginning or foundational narrative segment 124a to the ending narrative segment 124n. Dependent on the narrative segment selections of the media content consumer and the number of narrative segments, type of narrative segments, and conditional rules on accessing narrative segments made by the production or editing team, tens or even hundreds of possible narrative sequences may exist within a single narrative 164. Once a media content consumer 130 has completed the narrative 164, the production or editing team may elect to make the non-selected narrative segments 124 at least temporarily, if not permanently, inaccessible to the respective media content consumer 130.

Access to some or all of the inaccessible, non-selected, narrative segments 124 may be provided based on the media content consumer completing one or more actions or activities external to the narrative 164. Such external actions may include posting a review, synopsis, or impression of the narrative segment sequence selected by a respective media content consumer on a Website 170 such as a social media Website or a review Website such as ROTTENTOMA-TOES.COM. Such external actions may include interacting with other media content consumers 130 who accessed the respective narrative 164 using the same or different sequences of narrative segments. Such interactions between media content consumers 130 may occur in a forum provided by the producer or distributor of the narrative 164. Such interactions between media content consumers 130 may occur in one or more third party forums operated by an entity other than a producer or distributor of the narrative 164, for example FACEBOOK®. Such interactions between media content consumers 130 may sharing paths through the narrative (e.g., in graphical form) that the media content consumers 130 each took. In some instances, interactions between media content consumers 130 may include sharing of specific narrative segments by at least a first media content consumer with at least a second media content consumer, which shared narrative segment would otherwise be unavailable to the second media content consumer 130 due to the path that the second media content consumer took through the narrative. In some instances, a mutual sharing between the first and the second media content consumers may be required as the condition.

The ability to "personalize" the narrative presentation by the media content consumer 130 and the promise of gaining access to additional narrative segments 124 that were not initially selected by a media content consumer, and/or access to pieces of bonus content, beneficially creates interaction and excitement between media content consumers 130 as they seek to gain a deeper appreciation or understanding of the narrative 164.

FIG. 2 and the following discussion provide a brief, general description of a suitable networked content editing system environment 200 in which the various illustrated embodiments may be implemented. Although not required, the embodiments will be described in the general context of computer-executable instructions, such as program application modules, objects, or macros stored on computer- or processor-readable media and executed by a computer or processor. Those skilled in the relevant arts will appreciate that the illustrated embodiments, as well as other embodiments, can be practiced with other processor-based system configurations and/or other processor-based computing system configurations, including hand-held devices, multiprocessor systems, microprocessor-based or programmable consumer electronics, personal computers ("PCs"), networked PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices or media.

FIG. 2 shows a networked content editing system environment 200 in which one or more content creators 110 provide raw content 114 in the form of unedited narrative segments to one or more content editing systems 120. The content editing system 120 refines the raw content 114 provided by the one or more content creators 110 into a number of finished narrative segments 124 and logically assembles the finished narrative segments 124 into a narrative 164. A production team, an editing team, or a combined production and editing team are responsible for refining and assembling the finished narrative segments 124 into a narrative 164 in a manner that maintains the artistic integrity of the narrative segment sequences included in the narrative 164. The narrative 164 is provided to media content consumer processor-based devices 132 either as a digital stream via network 140, a digital download via network 140, or stored on one or more non-volatile storage devices such as a compact disc, digital versatile disk, thumb drive, or similar.

At times, the narrative 164 may be delivered to the media content consumer processor-based device 132 directly from one or more content editing systems 120. At other times, the one or more content editing systems 120 transfers the narrative 164 to a Web portal that provides media content consumers 130 with access to the narrative 164 and may also include one or more payment systems, one or more accounting systems, one or more security systems, and one or more encryption systems. Such Web portals may be operated by the producer or distributor of the narrative 164 and/or by third parties such as AMAZON® or NETFLIX®.

The content editing system 120 includes one or more processor-based editing devices 122 (only one illustrated) and one or more communicably coupled nontransitory computer- or processor readable storage medium 204 (only one illustrated) for storing and editing raw narrative segments 114 received from the content creators 110 into finished narrative segments 124 that are assembled into the narrative 164. The associated nontransitory computer- or processor readable storage medium 204 is communicatively coupled to the one or more processor-based editing devices 120 via one or more communications channels. The one or more communications channels may include one or more tethers such as parallel cables, serial cables, universal serial bus ("USB") cables, THUNDERBOLT cables, or one or more wireless channels capable of digital data transfer, for instance near field communications ("NFC"), FIREWIRE®, or BLUETOOTH®.

The networked content editing system environment 200 also comprises one or more content creator processor-based device(s) 112 (only one illustrated) and one or more media content consumer processor-based device(s) 132 (only one illustrated). The one or more content creator processor-based device(s) 112 and the one or more media content consumer processor-based device(s) 132 are communicatively coupled to the content editing system processor-based device 122 by one or more communications channels, for example one or more wide area networks (WANs) 140. In some implementations, the one or more WANs may include one or more worldwide networks, for example the Internet, and communications between devices may be performed using standard communication protocols, such as one or more Internet protocols. In operation, the one or more content creator processor-based device(s) 112 and the one or more media content consumer processor-based device(s) 132 function as either a server for other computer systems or processor-based devices associated with a respective entity or themselves function as computer systems. In operation, the content editing system processor-based device 122 may function as a server with respect to the one or more content creator processor-based device(s) 112 and/or the one or more media content consumer processor-based device(s) 132.

The networked content editing system environment 200 may employ other computer systems and network equipment, for example additional servers, proxy servers, firewalls, routers and/or bridges. The content editing system processor-based device 122 will at times be referred to in the singular herein, but this is not intended to limit the embodiments to a single device since in typical embodiments there may be more than one content editing system processor-based device 122 involved. Unless described otherwise, the construction and operation of the various blocks shown in FIG. 2 are of conventional design. As a result, such blocks need not be described in further detail herein, as they will be understood by those skilled in the relevant art.

The content editing system processor-based device 122 may include one or more processing units 212 capable of executing processor-readable instruction sets to provide a dedicated content editing system, a system memory 214 and a system bus 216 that couples various system components including the system memory 214 to the processing units 212. The processing units 212 include any logic processing unit capable of executing processor- or machine-readable instruction sets or logic. The processing units 212 maybe in the form of one or more central processing units (CPUs), digital signal processors (DSPs), application-specific integrated circuits (ASICs), reduced instruction set computers (RISCs), field programmable gate arrays (FPGAs), logic circuits, systems on a chip (SoCs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the content editing system processor-based device 122, such as during start-up.

The content editing system processor-based device 122 may include one or more nontransitory data storage devices. Such nontransitory data storage devices may include one or more hard disk drives 224 for reading from and writing to a hard disk 226, one or more optical disk drives 228 for reading from and writing to removable optical disks 232, and/or one or more magnetic disk drives 230 for reading from and writing to magnetic disks 234. Such nontransitory data storage devices may additionally or alternatively include one or more electrostatic (e.g., solid-state drive or SSD), electroresistive (e.g., memristor), or molecular (e.g., atomic spin) storage devices.

The optical disk drive 228 may include a compact disc drive and/or a digital versatile disk (DVD) configured to read data from a compact disc 232 or DVD 232. The magnetic disk 234 can be a magnetic floppy disk or diskette. The hard disk drive 224, optical disk drive 228 and magnetic disk drive 230 may communicate with the processing units 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the content editing system processor-based device 122. Although the depicted content editing system processor-based device 122 is illustrated employing a hard disk 224, optical disk 228, and magnetic disk 230, other types of computer-readable media that can store data accessible by a computer may be employed, such as WORM drives, RAID drives, flash memory cards, RAMs, ROMs, smart cards, etc.

Program modules used in editing and assembling the raw narrative segments 114 provided by content creators 110 are stored in the system memory 214. These program modules include modules such as an operating system 236, one or more application programs 238, other programs or modules 240 and program data 242.

Application programs 238 may include logic, processor-executable, or machine executable instruction sets that cause the processor(s) 212 to automatically receive raw narrative segments 114 and communicate finished narrative presentations 164 to a Webserver functioning as a portal or storefront where media content consumers 130 are able to digitally access and acquire the narrative presentations 164. Any current (e.g., CSS, HTML, XML) or future developed communications protocol may be used to communicate either or both the raw narrative segments 114, finished narrative segments 124, and narrative presentations 164 to and from local and/or remote nontransitory storage 152 as well as to communicate narrative presentations 164 to the Web server.

Application programs 238 may include any current or future logic, processor-executable instruction sets, or machine-executable instruction sets that facilitate the editing, alteration, or adjustment of one or more human-sensible aspects (sound, appearance, feel, taste, smell, etc.) of the raw narrative segments 114 into finished narrative segments 124 by the editing team or the production and editing teams.

Application programs 238 may include any current or future logic, processor-executable instruction sets, or machine-executable instruction sets that facilitate the assembly of finished narrative segments 124 into a narrative 164. Such may include, for example, a narrative assembly editor (e.g., a "Movie Creator") that permits the assembly of finished narrative segments 124 into a narrative 164 at the direction of the editing team or the production and editing teams. Such may include instructions that facilitate the creation of prompts 126 that appear either during the pendency of or at the conclusion of narrative segments 124. Such may include instructions that facilitate the selection of presentation formats (e.g., split screen, tiles, or lists, among others) for the prompts 126 that appear either during the pendency of or at the conclusion of narrative segments 124. Such may include instructions that facilitate the creation of logical or Boolean expressions or conditions that autonomously and/or dynamically create or select icons for inclusion in the prompts 126 that appear either during the pendency of or at the conclusion of narrative segments 124. At times, such logical or Boolean expressions or conditions may be based in whole or in part on inputs representative of actions or selections taken by media content consumers 130 prior to or during the presentation of the narrative 164.

Such application programs may include any current or future logic, processor-executable instruction sets, or machine-executable instruction sets that provide for the establishment of departure and return points within a narrative segment 124 when a prompt 126 is provided to the media content consumer during rather than at the conclusion of the respective narrative segment 124. Such application programs may include instructions that facilitate the creation of logical or Boolean expressions or conditions that autonomously and/or dynamically select icons and create prompts 126 that appear during a particular narrative segment 124.

Such application programs may include any current or future logic, processor-executable instruction sets, or machine-executable instruction sets that facilitate providing media content consumers 130 with access to non-selected narrative segments 124. Such may include logic or Boolean expressions or conditions that include data representative of the interaction of the respective media content consumer 130 with one or more third parties, one or more narrative-related Websites, and/or one or more third party Websites. Such instructions may, for example, collect data indicative of posts made by a media content consumer 130 on one or more social networking Websites as a way to encouraging online discourse between media content consumers 130 regarding the narrative 164.

Such application programs may include any current or future logic, processor-executable instruction sets, or machine-executable instruction sets that facilitate the collection and generation of analytics or analytical measures related to the sequences of narrative segments 124 selected by media content consumers 130. Such may be useful for identifying a "most popular" narrative segment sequence, a "least viewed" narrative segment sequence, a "most popular" narrative segment 124, a "least popular" narrative segment, a time spent viewing a narrative segment 124 or the narrative 164, etc.

Such application programs may include any current or future logic, processor-executable instruction sets, or machine-executable instruction sets that facilitate the generation and insertion of cues or icons indicative of the availability of additional or bonus content 128 at defined temporal points or intervals and at defined physical locations within narrative segments 124. Such application programs may include instructions that facilitate the creation of logical or Boolean expressions or conditions that autonomously and/or dynamically create cues or icons indicative of an additional or bonus content 128 that appear during a particular narrative segment 124. At times, such logical or Boolean expressions or conditions may be include inputs representative of actions or selections taken by media content consumers 130 prior to or during the presentation of the respective narrative segment 124 in which the cue or icon appears. At times, such logical or Boolean expressions or conditions may be include inputs representative of actions or selections taken by media content consumers 130 prior to or during the presentation of the narrative 164 and/or the beginning or foundational narrative segment 124*a*.

Other program modules 240 may include instructions for handling security such as password or other access protection and communications encryption. The system memory 214 may also include communications programs, for example a server that causes the content editing system processor-based device 122 to serve electronic or digital documents or files via corporate intranets, extranets, or other networks as described below. Such servers may be markup language based, such as Hypertext Markup Language (HTML), Extensible Markup Language (XML) or Wireless Markup Language (WML), and operate with markup languages that use syntactically delimited characters added to the data of a document to represent the structure of the document. A number of suitable severs may be commercially available such as those from MOZILLA®, GOOGLE®, MICROSOFT®, and APPLE COMPUTER®.

While shown in FIG. 2 as being stored in the system memory 214, the operating system 236, application programs 238, other programs/modules 240, program data 242 and browser 244 may be stored locally, for example on the hard disk 226, optical disk 232 and/or magnetic disk 234. At times, other programs/modules 240, program data 242 and browser 244 may be stored remotely, for example on one or more remote file servers communicably coupled to the content editing system processor-based device 122 via one or more networks such as the Internet.

A production team or editing team member enters commands and data into the content editing system processor-based device 122 using one or more input devices such as a touch screen or keyboard 246 and/or a pointing device such as a mouse 248, and/or via a graphical user interface ("GUI"). Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a Universal Serial Bus ("USB") can be used. A monitor 252 or other display device couples to the system bus 216 via a video interface 254, such as a video adapter.

The content editing system processor-based device 122 can include other output devices, such as speakers, printers, etc.

The content editing system processor-based device 122 can operate in a networked environment using logical connections to one or more remote computers and/or devices. For example, the content editing system processor-based device 122 can operate in a networked environment using logical connections to one or more content creator processor-based device(s) 112 and, at times, one or more media content consumer processor-based device(s) 132. Communications may be via tethered and/or wireless network architecture, for instance combinations of tethered and wireless enterprise-wide computer networks, intranets, extranets, and/or the Internet. Other embodiments may include other types of communications networks including telecommunications networks, cellular networks, paging networks, and other mobile networks. There may be any variety of computers, switching devices, routers, bridges, firewalls and other devices in the communications paths between the content editing system processor-based device 122 and the one or more content creator processor-based device(s) 112 and the one or more media content consumer processor-based device(s) 132.

The one or more content creator processor-based device(s) 112 and the one or more media content consumer processor-based device(s) 132 will typically take the form of processor-based devices, for instance personal computers (e.g., desktop or laptop computers), netbook computers, tablet computers and/or smartphones and the like, executing appropriate instructions. At times, the one or more content creator processor-based device(s) 112 may include still or motion picture cameras or other devices capable of acquiring data representative of human-sensible data (data indicative of sound, sight, smell, taste, or feel) that are capable of directly communicating data to the content editing system processor-based device 122 via network 140. At times, some or all of the one or more content creator processor-based device(s) 112 and the one or more media content consumer processor-based device(s) 132 may communicably couple to one or more server computers. For instance, the one or more content creator processor-based device(s) 112 may communicably couple via one or more remote Webservers that include a data security firewall. The server computers may execute a set of server instructions to function as a server for a number of content creator processor-based device(s) 112 (i.e., clients) communicatively coupled via a LAN at a facility or site. The one or more content creator processor-based device(s) 112 and the one or more media content consumer processor-based device(s) 132 may execute a set of client instructions and consequently function as a client of the server computer(s), which are communicatively coupled via a WAN.

The one or more content creator processor-based device(s) 112 and the one or more media content consumer processor-based device(s) 132 may each include one or more processing units 268*a*, 268*b* (collectively "processing units 268"), system memories 269*a*, 269*b* (collectively, "system memories 269") and a system bus (not shown) that couples various system components including the system memories 269 to the respective processing units 268. The one or more content creator processor-based device(s) 112 and the one or more media content consumer processor-based device(s) 132 will at times each be referred to in the singular herein, but this is not intended to limit the embodiments to a single content creator processor-based device 112 and/or a single media content consumer processor-based device 132. In typical embodiments, there may be more than one content creator processor-based device 112 and there will likely be a large number of media content consumer processor-based devices 132. Additionally, one or more intervening data storage devices, portals, and/or storefronts not shown in FIG. 2 may be present between the content editing system processor-based device 122 and at least some of the media content consumer processor-based devices 132.

The processing units 268 may be any logic processing unit, such as one or more central processing units (CPUs), digital signal processors (DSPs), application-specific integrated circuits (ASICs), logic circuits, reduced instruction set computers (RISCs), field programmable gate arrays (FPGAs), etc. Non-limiting examples of commercially available computer systems include, but are not limited to, an i3, i5, and i7 series microprocessors available from Intel Corporation, U.S.A., a Sparc microprocessor from Sun Microsystems, Inc., a PA-RISC series microprocessor from Hewlett-Packard Company, an A4, A6, or A8 series microprocessor available from Apple Computer, or a Snapdragon processor available from Qualcomm Corporation. Unless described otherwise, the construction and operation of the various blocks of the one or more content creator processor-based device(s) 112 and the one or more media content consumer processor-based device(s) 132 are of conventional design. As a result, such blocks need not be described in further detail herein, as they will be understood by those skilled in the relevant arts.

The system bus can employ any known bus structures or architectures, including a memory bus with memory controller, a peripheral bus, and a local bus. The system memory 269 includes read-only memory ("ROM") 270*a*, 270*b* (collectively 270) and random access memory ("RAM") 272*a*, 272*b* (collectively 272). A basic input/output system ("BIOS") 271*a*, 271*b* (collectively 271), which can form part of the ROM 270, contains basic routines that help transfer information between elements within the one or more content creator processor-based device(s) 112 and the one or more media content consumer processor-based device(s) 132, such as during start-up.

The one or more content creator processor-based device(s) 112 and the one or more media content consumer processor-based device(s) 132 may also include one or more media drives 273*a*, 273*b* (collectively 273), e.g., a hard disk drive, magnetic disk drive, WORM drive, and/or optical disk drive, for reading from and writing to computer-readable storage media 274*a*, 274*b* (collectively 274), e.g., hard disk, optical disks, and/or magnetic disks. The computer-readable storage media 274 may, for example, take the form of removable non-transitory storage media. For example, hard disks may take the form of a Winchester drives, and optical disks can take the form of CD-ROMs, while electrostatic nontransitory storage media may take the form of removable USB thumb drives. The media drive(s) 273 communicate with the processing units 268 via one or more system buses. The media drives 273 may include interfaces or controllers (not shown) coupled between such drives and the system bus, as is known by those skilled in the relevant art. The media drives 273, and their associated computer-readable storage media 274, provide nonvolatile storage of computer readable instructions, data structures, program modules and other data for the one or more content creator processor-based devices 112 and/or the one or more media content consumer processor-based devices 132. Although described as employing computer-readable storage media 274 such as hard disks, optical disks and magnetic disks, those skilled in the relevant art will appreciate that one or more content creator processor-based device(s) 112 and/or one or more media content consumer processor-based device(s) 132 may employ other types of computer-readable storage media that can store data accessible by a computer, such as flash memory cards, digital video disks ("DVD"), RAMs, ROMs, smart cards, etc. Data or information, for example, electronic or digital documents or files or data (e.g., metadata, ownership, authorizations) related to such can be stored in the computer-readable storage media 274.

Program modules, such as an operating system, one or more application programs, other programs or modules and program data, can be stored in the system memory 269. Program modules may include instructions for accessing a Website, extranet site or other site or services (e.g., Web services) and associated Web pages, other pages, screens or services hosted by the content delivery system 120.

Program modules stored in the system memory of the one or more content creator processor-based devices 112 include any current or future logic, processor-executable instruction sets, or machine-executable instruction sets that facilitate the collection and/or communication of data representative of raw narrative segments 114 to the content editing system processor-based device 122. Such application programs may include instructions that facilitate the compression and/or encryption of data representative of raw narrative segments 114 prior to communicating the data representative of the raw narrative segments 114 to the content editing system processor-based device 122.

Program modules stored in the system memory of the one or more content creator processor-based devices 112 include any current or future logic, processor-executable instruction sets, or machine-executable instruction sets that facilitate the editing of data representative of raw narrative segments 114. For example, such application programs may include instructions that facilitate the partitioning of a longer narrative segment 124 into a number of shorter duration narrative segments 124a-124n.

Program modules stored in the one or more media content consumer processor-based device(s) 132 include any current or future logic, processor-executable instruction sets, or machine-executable instruction sets that facilitate the presentation of the narrative 164 to the media content consumer 130.

The system memory 269 may also include other communications programs, for example a Web client or browser that permits the one or more content creator processor-based device(s) 112 and the one or more media content consumer processor-based device(s) 132 to access and exchange data with sources such as Web sites of the Internet, corporate intranets, extranets, or other networks. The browser may, for example be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/modules, program data and/or browser can be stored on the computer-readable storage media 274 of the media drive(s) 273. A content creator 110 and/or media content consumer 130 enters commands and information into the one or more content creator processor-based device(s) 112 and the one or more media content consumer processor-based device(s) 132, respectively, via a user interface 275a, 275b (collectively "user interface 275") through input devices such as a touch screen or keyboard 276a, 276b (collectively "input devices 276") and/or a pointing device 277a, 277b (collectively "pointing devices 277") such as a mouse. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278a, 278b (collectively 278) may be coupled to the system bus via a video interface, such as a video adapter. The one or more content creator processor-based device(s) 112 and the one or more media content consumer processor-based device(s) 132 can include other output devices, such as speakers, printers, etc.

Figure 3A:
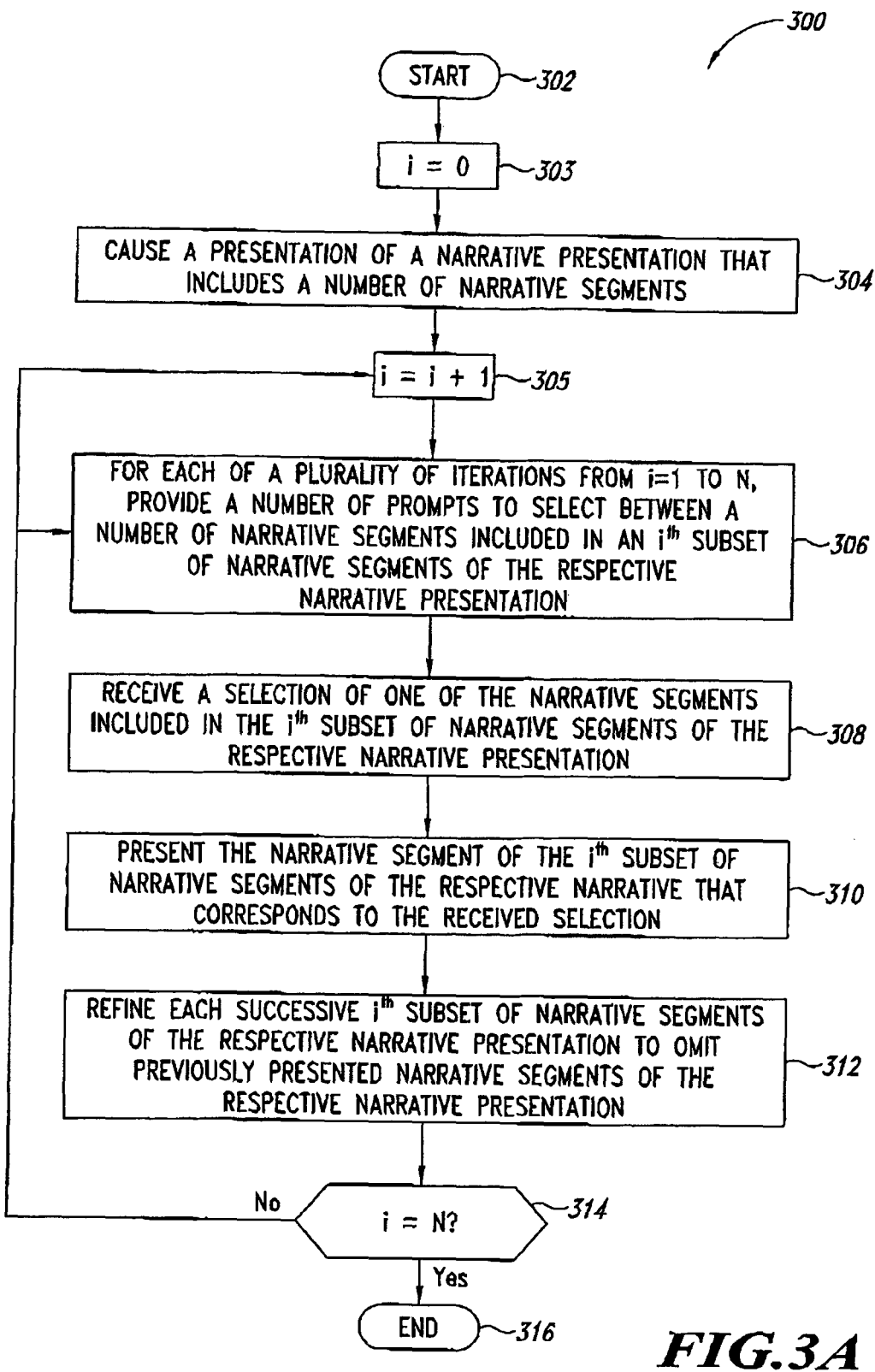
FIG. 3A is a high-level logic flow diagram showing an illustrative method of presenting a narrative presentation to a media content consumer by a content delivery system, the narrative presentation comprising a series of user-selected narrative segments, according to one illustrated embodiment.

FIG. 3A shows a high-level method 300 of presenting, via one or more content delivery platforms, a narrative 164 that includes a number of media content consumer selectable narrative segments 124 to a media content consumer 130, according to one or more embodiments. A narrative 164 may comprise a number of narrative segments 124 presented to the media content consumer 130 in an order that may or may not be predetermined, but is based at least in part on narrative segments 124 previously selected by the respective media content consumer 124.

The content delivery system presents the media content consumer 130 with such prompts 126 at various defined points during the narrative 164 selected by the production and/or editing teams. For example, such prompts 126 may appear during the pendency of, or more typically at the conclusion of, at least some of the narrative segments 124. Such prompts include a number of icons (e.g., two or more) each representative of a respective one of a plurality of narrative segments 124 available or accessible to the particular media content consumer 130 at that particular time or point in the narrative 164. Upon receipt of a selection input representative of one of the icons included in a prompt screen 126 from the media content consumer 130, the selected narrative segment 124 is provided by the content delivery system to the media content consumer 130.

Figure 3B:
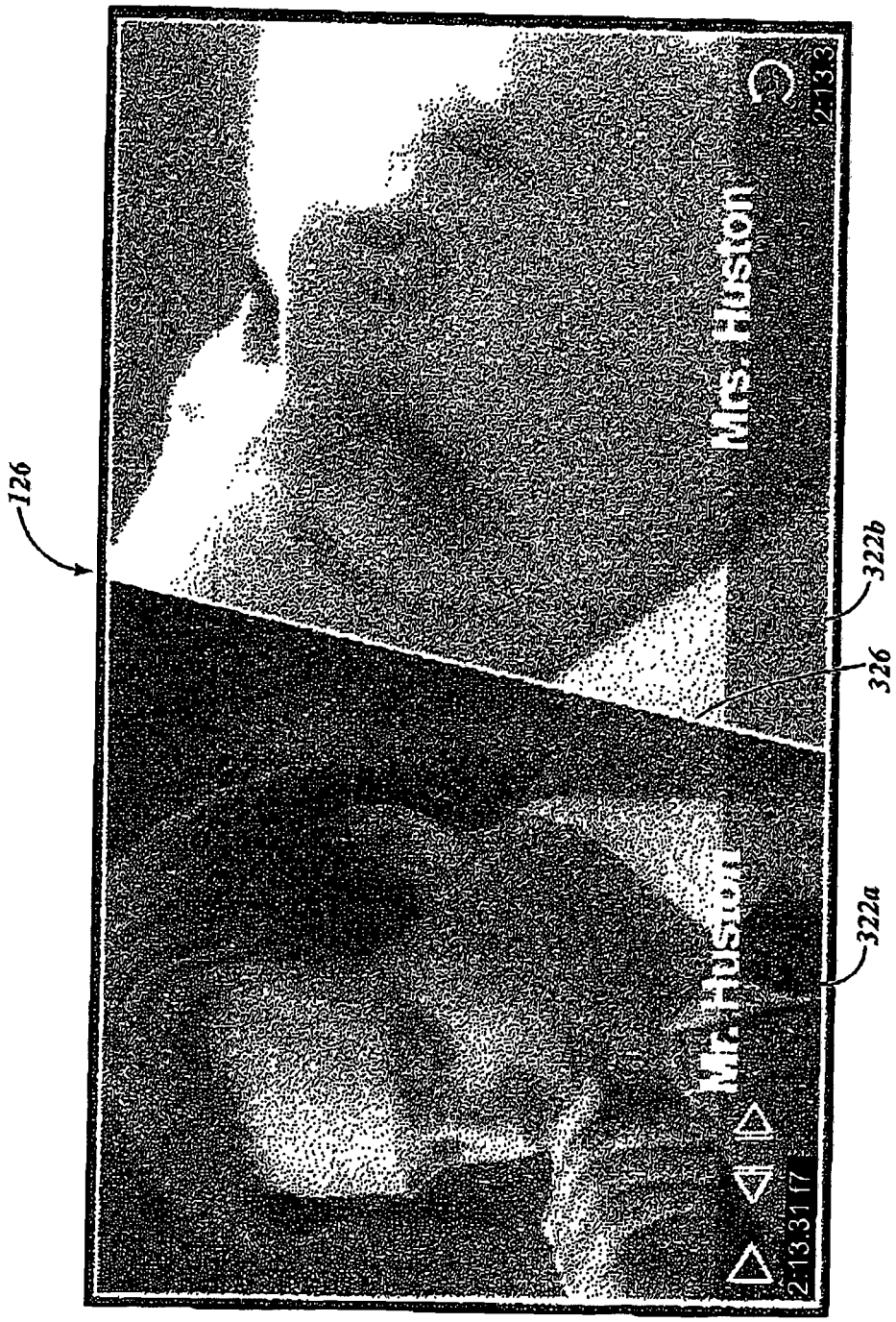
FIG. 3B is a screen capture of an illustrative prompt that includes two media content consumer selectable icons with which a media content consumer can provide an input to the content delivery system indicating a desired narrative segment, according to one illustrated embodiment.

FIG. 3B shows a screen capture of an illustrative prompt 126. The prompt shown in FIG. 3B includes two prompts 322a, 322b (collectively "prompts 322"). The prompts 322 include a first prompt 322a labeled "MR. HUSTON" and a second prompt 324 labeled "MRS. HUSTON." In FIG. 3B, a diagonal separator 326 separates the first prompt 322a from the second prompt 322b. Although FIG. 3B shows only two prompts 322a, 322b, any number of prompts 322a-322n may be included in a single prompt 126. For example, three, four, five or even more prompts 322 may be included in a single prompt 126. The number of prompts 322 and the number, type, and style of separator 326 is selectable by the production team or the editing team via the content editing system processor-based device 122. As described herein, the method 300 of providing a narrative 164 that includes a number of media content consumer selectable narrative segments 124 is provided with references to the illustrative screen capture in FIG. 3B.

The method 300 of providing a narrative 164 that includes a number of media content consumer selectable narrative segments 124 commences at 302. At 303 a counter i is set to an initial value (e.g., 0).

At 304, a portion (e.g., an initial narrative segment) of a narrative 164 is presented to the media content consumer 130. In some instances, the narrative 164 may be provided as streaming data or streaming media originating from one or more remote Webservers 160. In some instances, the narrative 164 may be downloaded to the media content consumer processor-based device 132 for later playback or presentation by the media content consumer 130. In other instances, the narrative 164 may be read from one or more nontransitory storage media devices (e.g., DVD) using an appropriate media reader that is communicably coupled to the media content consumer processor-based device 132. Typically, the narrative 164 will commence with a beginning or foundational narrative segment 124a to provide each media content consumer 130 with a common setting for the ultimate storyline or plotline created by subsequent user-selected narrative segments 124. At times, the narrative 164 may conclude with an ending narrative segment 124n to provide each media content consumer 130 with a common ending regardless of the storyline or plotline followed by the user-selected narrative segments 124. At times, the narrative 164 may conclude with one of a number of ending narrative segments 124n selected at least in part based on the user-selected narrative segments 124.

After presentation of the initial narrative segment 124a, an iterative loop starts, where the counter i is incremented (e.g., i=i+1) at 305.

At 306, a prompt is provided that permits the media content consumer 130 to select one of a number of narrative segments 124. Each of the icons 322 included in the prompt 126 corresponds to a single narrative segment 124 included in an $i^{th}$ subset of narrative segments 124 selected by the production team or the editing team.

At 308, a processor-based component receives an input by the media content consumer 130 that is indicative of a selection of one of the icons 322 included in the prompt 126 (e.g., by selecting the icon 322 using a pointing device such as a mouse or by selecting the icons 322 directly via a touchscreen interface). The received input includes data indicative of the selected icon 322.

At 310, a processor-based component presents the selected narrative segment 124 to the media content consumer 130. Using FIG. 3B as an illustrative example, if a media content consumer input indicative of the icon 322a labeled "MR. HUSTON" is received, the narrative segment logically associated with icon 322a is presented to the media content consumer 130. Similarly, if a media content consumer input indicative of the icon 322b labeled "MRS. HUSTON" is received, the narrative segment logically associated with icon 322b is presented to the media content consumer 130.

At 312, each successive subset of narrative segments is refined to remove the narrative segment provided in 310. Removing the narrative segment 124 presented at 310 prevents the duplicate presentation of the same narrative segment 124 to the media content consumer 130.

At 314, it is determined whether the final iteration has been reached. For example, it may be determined whether all narrative segments for the narrative have been presented to the media content consumer 130, or whether a path followed by the media content consumer 130 has reached a termination condition (e.g., end point, maximum allowed length). If the final iteration has not been reached, control returns to 305 where the counter i is further incremented, and acts 306 to 312 are repeated for each of the "N" identified subsets of narrative segments 124. Otherwise, the method 300 terminates at 316.

Figure 4A:
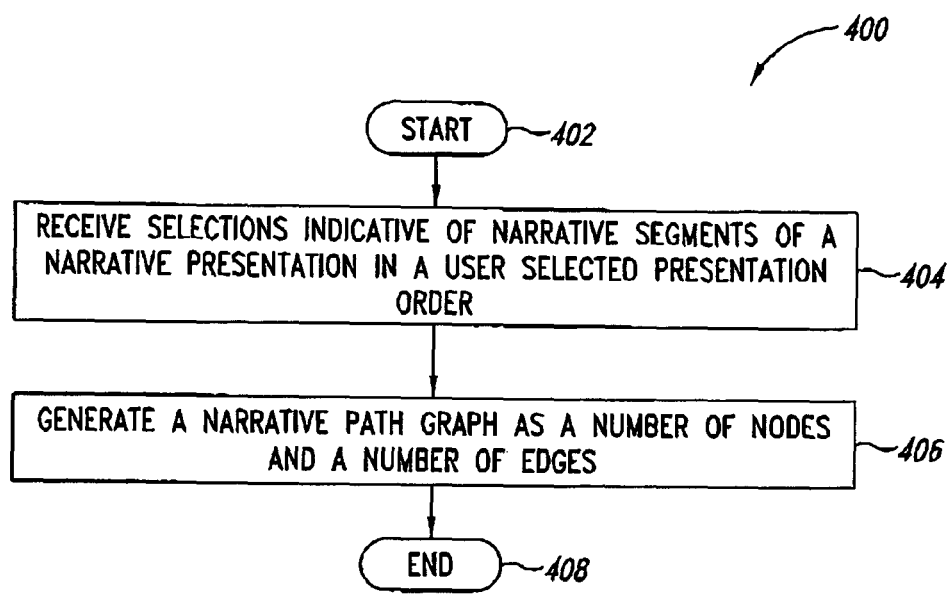
FIG. 4A is a high-level logic flow diagram showing an illustrative method of receiving media content consumer selections indicative of narrative segments, presenting the selected narrative segments as a portion of a narrative presentation, and generating a narrative path graph showing at least the viewed narrative segments, according to one illustrated embodiment.

FIG. 4 shows a high-level method 400 of generating information, in the form of a narrative path graph, that maps a media content consumer's sequence through a plurality of narrative segments 124 of a respective narrative 164, according to one or more embodiments. Recall throughout narrative 164, the media content consumer 130 encounters a number of prompts 126 which include offers of access to one of at least two, and perhaps several more, narrative segments 124 or additional content. Thus, based on the selections, each media content consumer 130 follows a sequence of narrative segments 124 extending from the beginning or foundational narrative segment 124a to, for example an ending narrative segment 124n. The narrative path graph provides a map of progress through the narrative presentation.

The method 400 of generating a narrative path graph that maps a media content consumer's sequence of narrative segments 124 through a respective narrative 164 commences at 402.

At 404, a content delivery platform receives selections indicative of narrative segments 124 of a narrative 164 in an order selected by the media content consumer 130. Typically, the media content consumer 130 provides these selections in the form of an input indicative of an icon 322 logically associated with a particular narrative segment 124 by the content delivery platform. Such icons 322 may appear in a prompt 126 presented to the media content consumer 130 during, at the beginning, or at the conclusion of one or more narrative segments 124.

At 406, the content delivery platform generates a narrative path graph of a particular media content consumer's progression through the narrative 164. The narrative path graph provides in graphical form at least a sequence of narrative segments 124 followed by a particular media content consumer 130. In some implementations, the narrative path graph may be in the form of a number of nodes, each representing a narrative segment 124 included in the narrative 164 and a number of edges that connect the narrative segments 124, the edges representing an ordered path that the media content consumer 130 took through the narrative. The narrative path graph may omit any narrative segments not actually presented to the media content consumer 130 and may likewise omit any available paths not actually take by the media content consumer 130 in traversing the narrative.

The narrative path graph may be presented to the media content consumer 130. Additionally or alternatively, the narrative path graph may be analyzed. For example, various metrics about the media content consumer 130 can be derived from their path through one or more narratives. Also for example, the narrative paths of one media content consumer 130 can be compared to the respective narrative paths of other media content consumers, identifying similarities, differences, and or those who have complementary narrative paths. Such may be performed using the narrative path graphs, or other representations of the narrative paths (e.g., look up table, tree structure, and relational database).

At times, the narrative path graph may be provided to the media content consumer 130 and/or analyzed prior to the conclusion of the presentation of the narrative 164 to the media content consumer 130 (e.g., upon receipt of an input indicative of a request by the media content consumer to examine the narrative path graph). At other times, this narrative path graph may only be provided to the media content consumer 130 and/or analyzed at the conclusion of the presentation of the narrative 164 to the media content consumer 130.

Figure 4B:
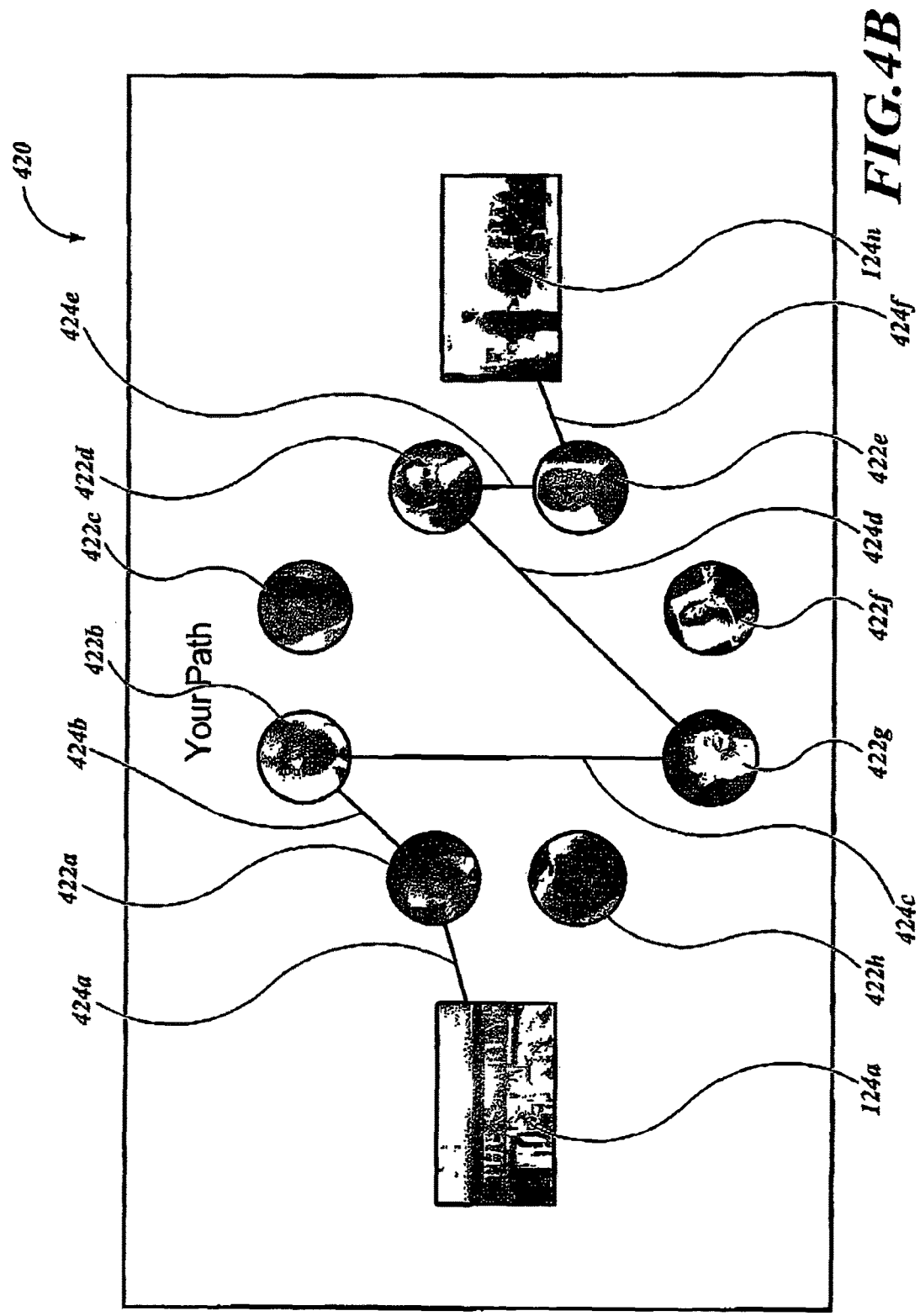
FIG. 4B is a screen capture of an illustrative narrative path graph that includes a directed graph of nodes and edges generated by the content delivery system and provided to a media content consumer with the narrative, according to one illustrated embodiment.

FIG. 4B shows a screen capture of an illustrative narrative path graph 420. The beginning or foundational narrative segment 124a appears on the left side of graph 420 and the ending narrative segment 124n appears on the right side of graph 420. Each of the narrative segments 124 included in the narrative 164 are shown as nodes 422a-422h (collectively "nodes 422"). The narrative segments selected by the media content consumer 130 are shown as edges 424a-424f (collectively, "edges 424").

In FIG. 4B, the media content consumer 130 selected the narrative segment associated with node 422a after the beginning or foundational narrative segment 124a as evidenced by edge 424a. Subsequent narrative segments viewed by the media content consumer include (in order) those narrative segments 124 associated with nodes 422b, 422g, 422d, and 422e as evidenced by edges 424b, 424c, 424d, and 424e, respectively. It can be seen in FIG. 4B that the media content consumer 130 did not select the narrative segments associated with nodes 422c, 422f, and 422h since no edges 424 connect to those nodes.

The method 400 of generating a narrative path graph that maps a media content consumer's sequence of narrative segments 124 through a respective narrative 164 concludes at 408.

Figure 5:
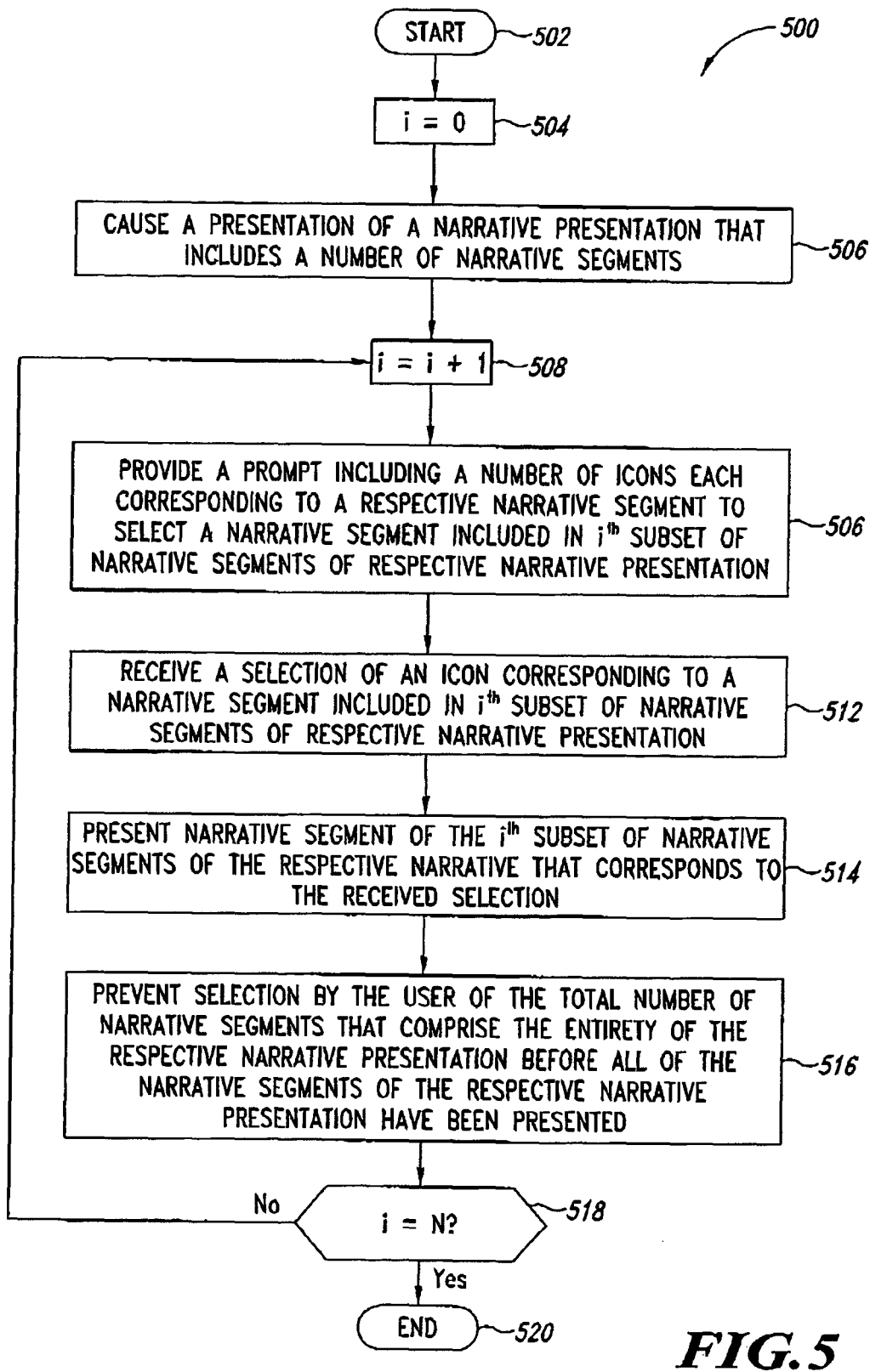
FIG. 5 is a high-level logic flow diagram showing an illustrative method of presenting a narrative presentation to a media content consumer using a content delivery system, the narrative presentation comprising a series of user-selected narrative segments where the presented narrative segments are fewer in number than the total available number of narrative segments, according to one illustrated embodiment.

FIG. 5 shows a high-level method 500 of presenting, via one or more content delivery platforms, a narrative 164 that includes a number of media content consumer selectable narrative segments 124 to a media content consumer 130 while preventing selection and/or presentation of all of the narrative segments 124 of the respective narrative 164 to the media content consumer 130, according to one or more embodiments. A narrative 164 may comprise a number of narrative segments 124 presented to the media content consumer 130 in an order that may or may not be partially predetermined, but is based at least in part on narrative segments 124 previously selected by the respective media content consumer 124. The media content consumer 130 typically accesses the narrative via one or more Webservers 160 by providing authorization information that uniquely identifies the media content consumer 130 (e.g., USERNAME and PASSWORD) and/or one or more media content consumer processor-based devices 132 (e.g., network interface card or NIC address; media access control or MAC address; or similar unique device and/or network identifier). The ability to identify a particular media content consumer 130 provides the ability to track the activities of the media content consumer 130 as well as limit the access of a particular media content consumer to a number of narrative segments 124.

The content delivery platform presents the media content consumer 130 with prompts 126 at various defined points during the narrative 164. Often the points at which prompts 126 are provided are selected by the production and/or editing teams to achieve a desired artistic effect. For example, such prompts 126 may appear during the pendency of, or more typically at the conclusion of, at least some of the narrative segments 124. Such prompts 126 include a number of icons 322 (e.g., two or more) each corresponding of a respective one of a plurality of narrative segments 124 available or accessible to the particular media content consumer 130 at that particular time or point in the narrative 164. Upon receipt of a selection input representative of one of the icons 322 included in a prompt 126, the selected narrative segment 124 is provided by the content delivery system to the media content consumer 130.

The media content consumer 130 progresses through the narrative 164 by selecting one of a number of candidate narrative segments 124 presented as icons 322 at a prompt 126. Since only one icon 322 is selectable at each prompt 126, at least some of the narrative segments 124 (i.e., those corresponding to non-selected icons 322) of the narrative 164 will remain un-selected (and therefore unaccessed/unconsumed) by the media content consumer 130, if not presented for selection again. In some instances, access to these un-selected narrative segments 124 may be provided to the media content consumer 130 at some point, for example after the media content consumer 130 has completed the narrative 164. In other instances, such as that detailed in method 500, at least a portion of these un-selected narrative segments 124 remain at least temporarily, and at times permanently, inaccessible to the media content consumer 130. The method 500 of providing a narrative 164 that includes a number of media content consumer selectable narrative segments 124 to a media content consumer 130 while preventing selection of all of the narrative segments 124 of the respective narrative 164 commences at 502.

At 504, an iterative loop counter (i) is initialized by setting the value equal to a defined initial value (e.g., zero).

At 506, a portion (e.g., a beginning or foundational narrative segment 124a) of a narrative 164 is presented to the media content consumer 130. In some instances, the narrative 164 may be provided as streaming data or streaming media originating from one or more remote Webservers 160. In some instances, the narrative 164 may be downloaded to the media content consumer processor-based device 132 for later playback or presentation by the media content consumer 130. In other instances, the narrative 164 may be read from one or more nontransitory storage media devices (e.g., DVD) using an appropriate media reader that is communicatively coupled to the media content consumer processor-based device 132. Typically, the narrative 164 will commence with a beginning or foundational narrative segment 124a to provide each media content consumer 130 with a common setting for the ultimate storyline or plotline created by subsequent user-selected narrative segments 124. At times, the narrative 164 may conclude with an ending narrative segment 124n to provide each media content consumer 130 with a common ending regardless of the storyline or plotline followed by the user-selected narrative segments 124. At times, the narrative 164 may conclude with one of a number of ending narrative segments 124n selected at least in part based on the user-selected narrative segments 124.

At 508, the iterative loop counter is incremented by a defined value (e.g., i=i+1) subsequent to the presentation of a narrative segment 124.

At 510, for each of "N" prompts 126 that the production team or editing team has identified within the narrative 164, the content delivery platform provides a prompt 126 that includes a number of icons 322 that permit the media content consumer 130 to select one of a number of corresponding narrative segments 124. Each of the number of icons 322 provided at the prompt 126 corresponds to a single narrative segment 124 included in an $i^{th}$ subset of narrative segments 124 selected by the production team or the editing team.

At 512, the content delivery platform receives an input by the media content consumer 130 that is indicative of a selection of one of the icons 322 included in the prompt 126 (e.g., by selecting the icon 322 using a pointing device such as a mouse or by selecting the icon 322 directly via a touchscreen interface). The received input includes data indicative of the selected icon 322.

At 514, the content delivery platform presents the selected narrative segment 124 to the media content consumer 130. For example, if a media content consumer input indicative of the icon 322a is received, the narrative segment 124 corresponding to or logically associated with icon 322a is presented to the media content consumer 130 by the content delivery platform. Similarly, if a media content consumer input indicative of the icon 322b is received, the narrative segment 124 logically associated with icon 322b is presented to the media content consumer 130 by the content delivery platform.

At 516, the content delivery platform prevents the media content consumer 130 from at least temporarily accessing one or more non-selected narrative segments 124. In some instances, the content delivery platform limits the number of narrative segments 124 accessible by a media content consumer 130 to a defined number of narrative segments 124 that is less than the total number of narrative segments 124. In other instances, the content delivery system limits the number of narrative segments 124 accessible by the media content consumer 130 to a percentage of the total number of narrative segments 124. The content delivery platform may track a user identifier, which allows the content delivery platform to prevent a specific user from accessing a particular narrative segment across a variety of devices. Additionally or alternatively, content delivery platform may track a device identifier (e.g., MAC address), which allows the content delivery platform to prevent a specific device from accessing a particular narrative segment. The content delivery platform may permanently prevent access or may prevent access for a defined amount of time.

At 518, the content delivery platform determines whether the final iteration has been reached. For example, it may be determined whether all narrative segments for the narrative have been presented to the media content consumer 130, or whether a path followed by the media content consumer 130 has reached a termination condition (e.g., end point, maximum allowed length). If the final iteration has not been reached, control returns to 508 where the counter i is further incremented, and acts 510 to 516 are repeated for each of the "N" identified subsets of narrative segments 124. Otherwise, the method 500 terminates at 520.

Figure 6:
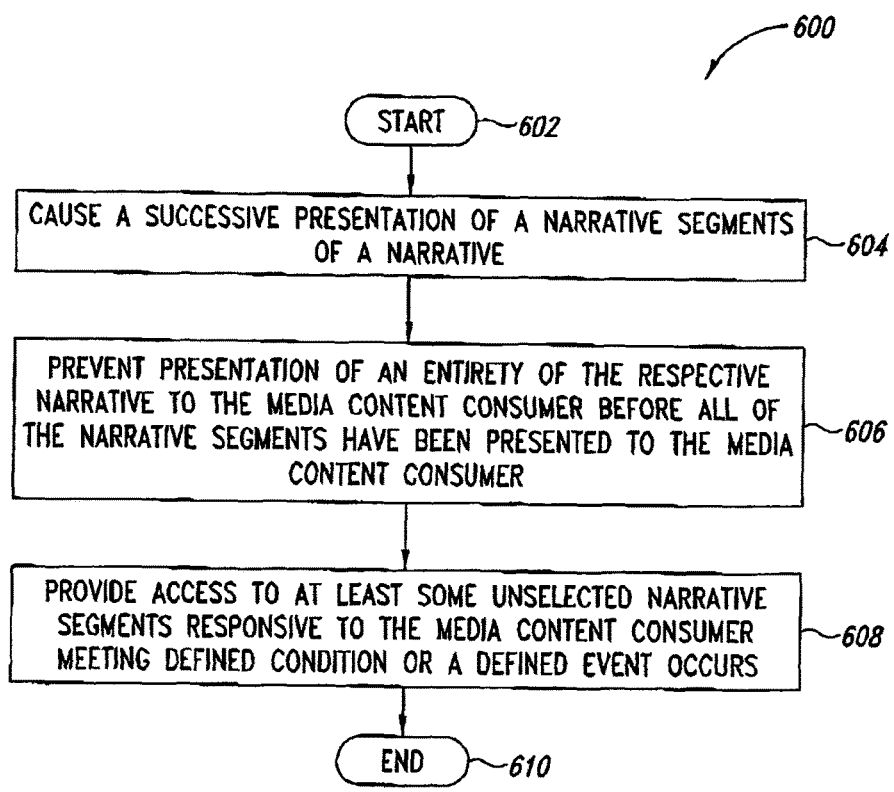
FIG. 6 is a high-level logic flow diagram showing an illustrative method of presenting additional un-selected, unaccessed, or unviewed narrative segments by a content delivery system to a media content consumer based on fulfilling a defined condition or meeting a defined criterion, according to one illustrated embodiment.

FIG. 6 shows a high-level method 600 of providing a narrative 164 that includes a number of media content consumer selectable narrative segments 124 while preventing selection of all of the narrative segments 124 of the respective narrative 164 until an occurrence of at least one specified condition (e.g., one or more defined interactions with another media content consumer, for example by performing a defined social media related activity), according to one or more embodiments.

Based on the selections made by a media content consumer at each of the prompts 126a-126n that occur throughout a narrative 164, at least some media content consumers 130 will experience the narrative 164, for example from different perspectives (e.g., perspectives of different characters). Importantly, at the conclusion of the narrative 164, at least some of the narrative segments 124 will not have been presented (i.e., unconsumed) by each particular media content consumer 130. These unconsumed narrative segments 124, each providing a different perspective, experience, or view of the narrative 164, represent a valuable assert that can be selectively provided to media content consumers 130 based on the media content consumer completing, performing, or accomplishing one or more defined activities or tasks (e.g., sharing, blogging, posting, linking, liking, tweeting, paying, reviewing, viewing, accessing, participating, achieving a sufficient score independently or as a team in a contest). The method of providing unconsumed narrative segments 124 to a media content consumer 130 based on the media content consumer achieving at least one specified condition or fulfilling at least one defined criterion commences at 602.

At 604, the content delivery platform causes a successive presentation of narrative segments of a narrative to the media content consumer 130.

At 606, the content delivery platform prevents the media content consumer 130 from at least temporarily accessing one or more non-selected narrative segments 124. In some instances, the content delivery platform limits the number of narrative segments 124 accessible by a media content consumer 130 to a defined number of narrative segments 124 that is less than the total number of narrative segments 124. In other instances, the content delivery system limits the number of narrative segments 124 accessible by the media content consumer 130 to a percentage of the total number of narrative segments 124.

The content delivery platform provides the narrative 164 in the form of a sequence of narrative segments 124. The media content consumer 130 selects an icon corresponding to one of a number of narrative segments 124 at prompts 126 placed at defined locations throughout the narrative 164. Each prompt 126 includes a plurality of icons 322a-322n, each of which corresponds to a respective, different, narrative segment 124. By selecting one icon 322a at the prompt 126, the narrative segments 124 corresponding to the unselected remain 322b-322n remain unconsumed or unaccessed by the media content consumer 130.

At times, some of the unconsumed or unaccessed (i.e., unselected) narrative segments 124 from prompts 126 earlier in the narrative 164 may be made available by the content delivery platform at later prompts 126, however, the narrative 164 is structured such that the media content consumer 130 is unable to consume all of the narrative segments 124. Thus, at the conclusion of the narrative 164, a number of unselected narrative segments 124 will remain unconsumed or unaccessed by the media content consumer 130.

The unconsumed or unaccessed narrative segments 124 provide the media content consumer 130 with additional information in the form of secondary storylines, insight into an aspect of a character's inner awareness, life experiences through the perspective of different narrative presentation characters, and similar. The media content consumer 130 may thus consider these unconsumed narrative segments as quite desirable. This desire to either consume the unconsumed narrative segments or learn the contents of the unconsumed narrative segments may be used to promote the performance of defined activities or actions by the media content consumer 130.

At 608, the content delivery system provides access to at least a portion of the unaccessed and/or unconsumed narrative segments 124 to the media content consumer 130 upon an occurrence of at least one defined event or activity, upon fulfilling one or more specified conditions, or upon meeting a specified criterion. Upon the fulfillment of the specified condition or meeting the at least one defined criterion, the content delivery platform provides the media content consumer 130a with access to at least some of the narrative segments that remained unselected by the respective media content consumer 130a at the conclusion of the narrative 164. At times, such unselected narrative segments 124 may be provided to the respective media content consumer 130a in the form of "bonus" segments or similar promotional content.

In some instances, the at least one defined event or activity may include at least one defined social media activity associated with the narrative 164. For example, the at least one defined event may include at least one social media sharing action. An example social media sharing action may include sharing via social media with other media content consumers a narrative path graph depicting the narrative segment sequence taken by the media content consumer.

In some instances, the at least one defined event or activity may include interacting with other media content consumers 130 of the respective narrative 164. Such defined interactions may include relatively simple activities such as posting or collecting comments posted on a FACEBOOK wall. Such defined interactions may include posting or interacting with other media content consumers 130 of the respective narrative 164 for example via web-to-web communications, text messages, etc.

In some instances, such specified conditions or defined criterion may include sharing the narrative segment path taken by the respective media content consumer 130a with other media content consumers 130b-130n. For example, the narrative segment path taken by a first media content consumer 130a may be compared with the narrative segment path taken by a second media content consumer 130b with whom the first content consumer had a prior relationship.

In some instances, the at least one defined event may include a first media content consumer 130a meeting a specified condition or defined criterion by interacting with additional media content consumer(s) 130b-130n that are identified by the content delivery platform based upon accessing a particular narrative segment 124 or plurality of narrative segments 124. For example, the content delivery system may select the a second media content consumer 130b based on a similarity or difference condition based at least in part on the narrative segment path taken by the a first media content consumer 130a.

In some instances, the at least one defined event or activity may include sharing one or more aspects of the media content consumer's impressions, experiences, or narrative segment sequence through the narrative 164 with one or more other media content consumers 130 and/or one or more defined analytical engines. Such analytical engines may be used, for example, to analyze and establish trends based on the narrative segment sequence of the narrative 164. For example, analytics may determine that media content consumers 130 following at least a portion of a particular narrative segment sequence have an overall more favorable impression of the narrative 164. Such data may be useful for pre-screening different candidate narrative presentations 164 prior to selecting a single narrative presentation for theatrical release. Such data may be useful for establishing statistical relationships between narrative segment sequence and one or more demographic factors associated with media content consumers 130 (e.g., male consumers 35-49 prefer a first narrative segment sequence while female consumers 20-29 prefer a second narrative segment sequence). The method of providing unconsumed narrative segments 124 to a media content consumer 130 based on the media content consumer completing, performing, or accomplishing one or more defined activities or tasks concludes at 610.

Figure 7A:
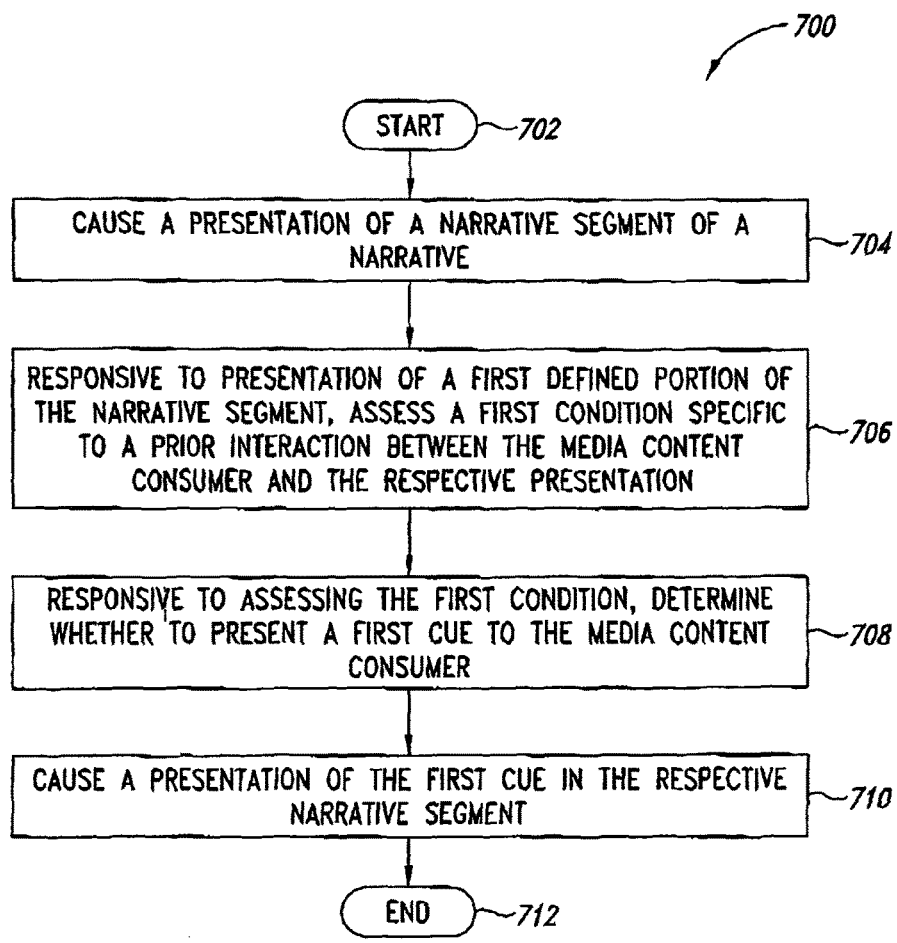
FIG. 7A is a high-level logic flow diagram showing a method of presenting by a content delivery system selected narrative segments and cues to a media content consumer based at least in part on one or more prior interactions between the media content consumer and the narrative presentation, according to one illustrated embodiment.
Figure 7B:
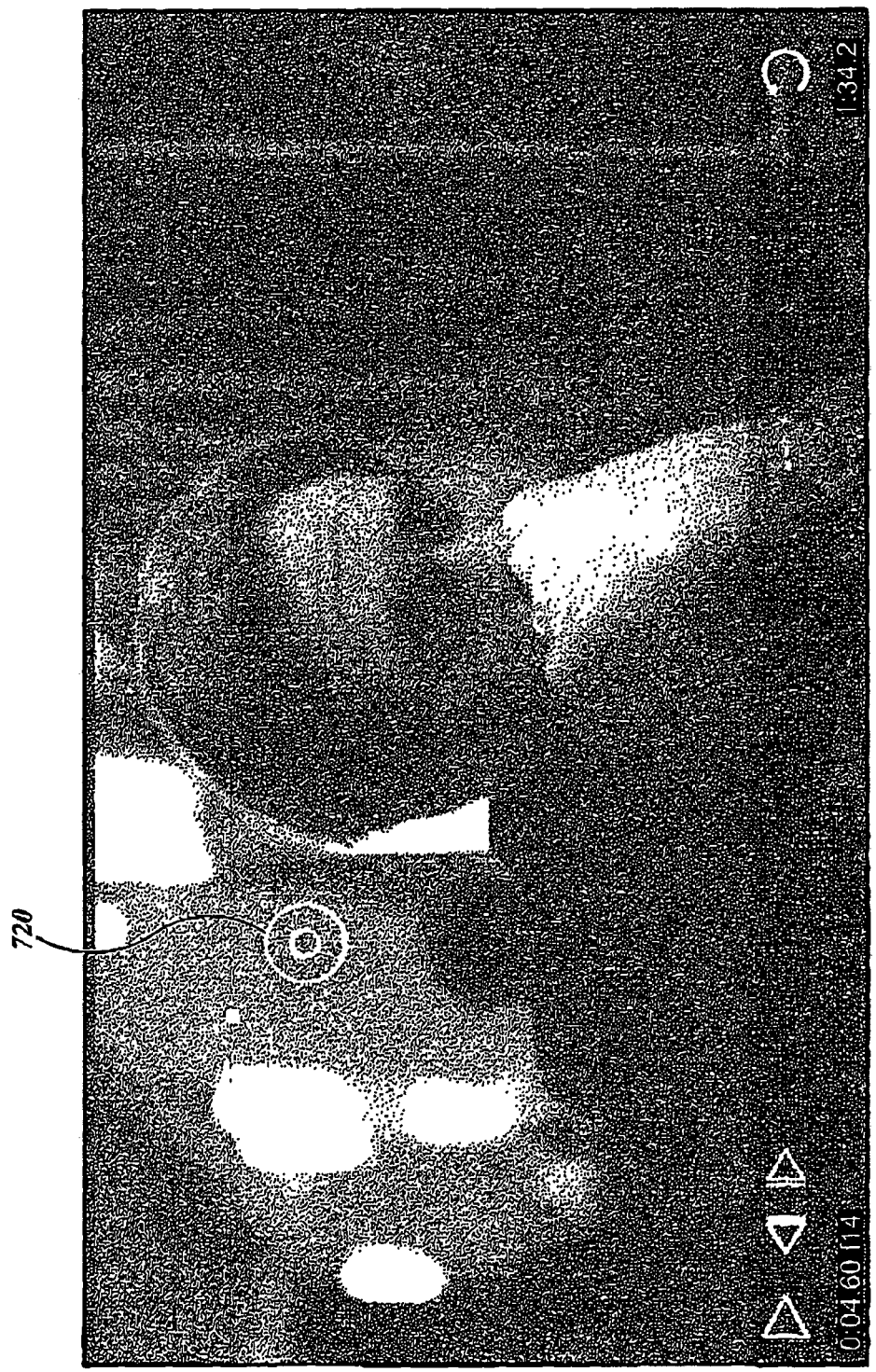
FIG. 7B is a screen capture of an illustrative narrative segment that includes a media content consumer selectable icon or prompt indicative of an available narrative segment or additional or bonus content accessible to the media content consumer, according to one illustrated embodiment.

FIG. 7A shows a high-level method 700 of assessing whether to provide a cue or icon after a first defined portion of a narrative segment 124 based at least in part on media content consumer interaction with a narrative 164, according to one or more embodiments. Such cues or icons may be useful for providing the media content consumer 130 access to either an additional or bonus content 128 or to a prompt 126 providing access to a plurality of additional narrative segments 124. In such a manner, additional or bonus content 128 and/or narrative segments 124 may be "nested" at one or more levels within other narrative segments 124 or within the narrative 164. Similarly, additional or bonus content 128 may be "nested" to one or more levels within a particular narrative segment 124. At times, upon completion of the nested narrative segment(s) 124 and/or the subordinate narrative presentation 128, the content delivery platform provides the remaining portion of the narrative segment 124 in which the cue or prompt 720 appeared to the media content consumer 130. FIG. 7B is a screen capture showing an illustrative icon or cue or prompt 720 inserted by the content delivery system into a narrative segment 124. The method of assessing based at least in part on media content consumer interaction with a narrative 164 whether to provide a cue or prompt 720 after a first defined portion of a narrative segment 124 commences at 702.

At 704, a portion (e.g., an beginning or foundational narrative segment 124a) of a narrative 164 is presented to the media content consumer 130. In some instances, the narrative 164 may be provided as streaming data or streaming media originating from one or more remote Webservers 160. In some instances, the narrative 164 may be downloaded to the media content consumer processor-based device 132 for later playback or presentation by the media content consumer 130. In other instances, the narrative 164 may be read from one or more nontransitory storage media devices (e.g., DVD) using an appropriate media reader that is communicably coupled to the media content consumer processor-based device 132. Typically, the narrative 164 will commence with a beginning or foundational narrative segment 124a to provide each media content consumer 130 with a common setting for the ultimate storyline or plotline created by subsequent user-selected narrative segments 124. At times, the narrative 164 may conclude with an ending narrative segment 124n to provide each media content consumer 130 with a common ending regardless of the storyline or plotline followed by the user-selected narrative segments 124. At times, the narrative 164 may conclude with one of a number of ending narrative segments 124n selected at least in part based on the user-selected narrative segments 124.

At 706, responsive to the presentation of a first defined portion of a narrative segment 124, the content delivery platform assesses one or more conditions specific to a prior interaction between the media content consumer 130 and the respective narrative 164. Such interactions may include any inputs provided by the media content consumer 130 to the content delivery platform. In one instance, the interactions may include the narrative segment path the media content consumer 130 has followed to the point at which the assessment occurs (e.g., has the media content consumer 130 consumed a defined narrative segment 124 and/or a defined number and/or sequence of narrative segments?). In another instance, the interactions may include demographic information that is directly supplied by the media content consumer 130 (e.g., age, gender, marital status) and/or indirectly supplied by the media content consumer processor-based device 132 (e.g., cookies, browsing history, prior purchase history, prior narrative presentation consumption history). The interactions may include one or more conditional expressions and/or Boolean conditions.

At 708, responsive to assessing the first condition, the content delivery system determines whether a cue or prompt 720 should be inserted into the instant narrative segment 124 for presentation to the media content consumer. Generally, the cue or prompt 720 is associated with one or more additional or bonus content 128 and/or a prompt 126 that provides the media content consumer with prompts for a number of additional narrative segments 124 and/or additional or bonus content. Such content is accessed when the media content consumer provides an input to the content delivery system that is indicative of a selection of the cue 720.

At 710, responsive to determining that a cue or prompt 720 should appear within the instant narrative segment 124, the content delivery platform inserts the respective cue or prompt 720. At times, the production team or editing team places the cue or prompt 720 at a defined physical and/or logical location in the narrative segment 124. For example, an additional or bonus content 128 that includes content directed to a character's mental state or thoughts may be presented as a cue or prompt 720 proximate the character's head in the narrative segment 124. Such a cue or prompt 720 may be visible while the respective character is engaged in an observable activity related to the mental state (e.g., memories of working on a farm as a teenager as the 30-something character shovels dirt as a member of a 1930s Louisiana chain gang). In another example, a prompt 126 providing a number of narrative segments associated with a character's background may be presented as a cue or prompt 720 proximate the character's feet. FIG. 7B depicts a cue or prompt 720 proximate a character's head that, when selected by the media content consumer 130, commences the presentation of an additional or bonus content 128 describing the character's thoughts. The method of assessing based at least in part on media content consumer interaction with a narrative 164 whether to provide a cue or prompt 720 after a first defined portion of a narrative segment 124 concludes at 712.

Figure 8:
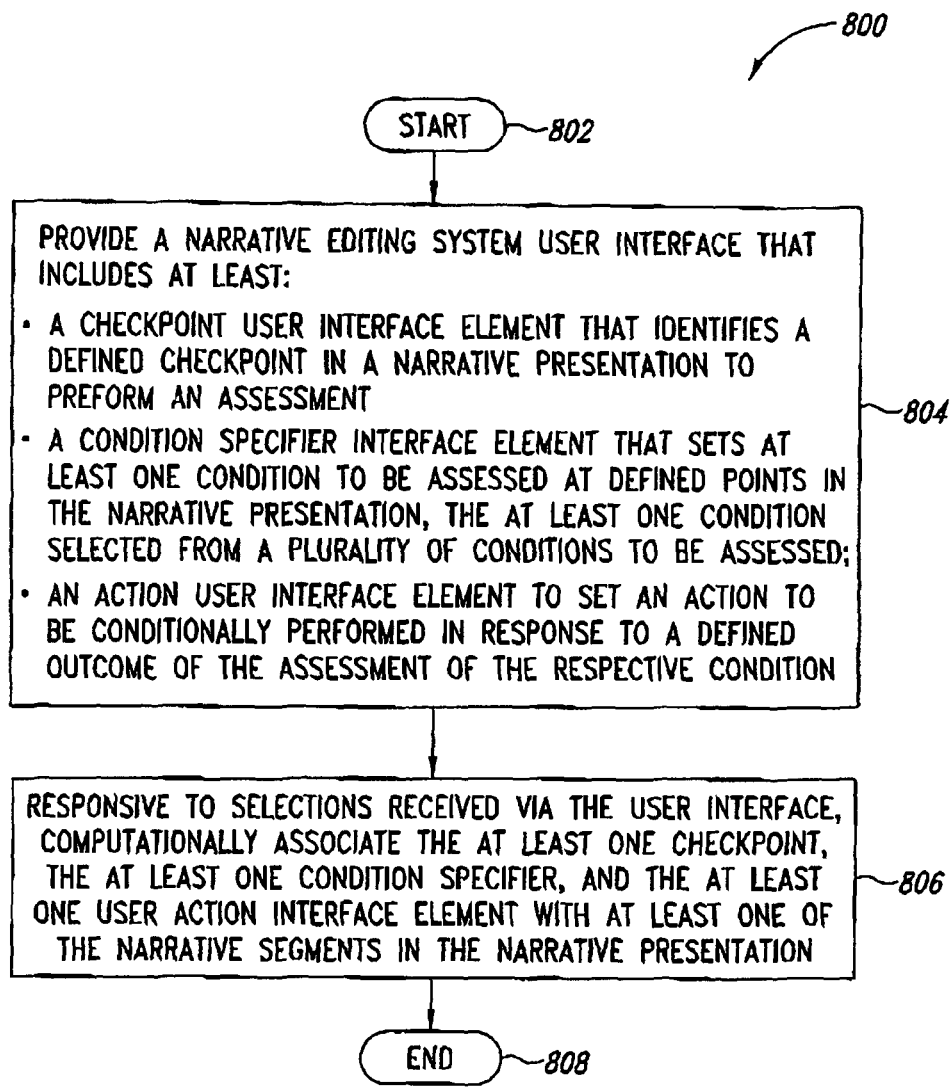
FIG. 8 is a high-level logic flow diagram showing a method of assessing by a content delivery system, one or more media content consumer conditions by identifying a defined point within the narrative presentation to perform an assessment, setting at least one condition to be assessed, and setting an action to be conditionally performed in response to the outcome of the assessment, according to one illustrated embodiment.

FIG. 8 shows a high-level method 800 of operating a content editing system 120 to create a narrative 164 that includes a number of narrative segments 124 and a number of prompts 126 at which the media content consumer can select an icon 322 corresponding to a particular narrative segment 124 to continue the narrative 164, according to one or more embodiments. Raw content 114 generated by content creators 110 is provided to the content editing system 120 where the production team and/or the editing team edit and assemble the raw content into a number of narrative segments 124 for inclusion in a narrative 164. The production team and/or editing team assembles the narrative segments 124 into a narrative 164 that includes a number of prompts 126, each located, placed, or positioned at a defined location in the narrative 164. Each prompt includes at least two icons 322. Each icon 322 included in a prompt 126 corresponds to a particular narrative segment 124 included in the narrative 164.

At times, the editing team defines at least some of the icons 322 included in some or all of the number of prompts 126. At other times, the content delivery system providing the narrative 164 to the media content consumer 130 pseudo-randomly selects at least some of the icons 322 included in some or all of the number of prompts 126. In some implementations, one or more algorithms, conditional expressions, or Boolean conditions may be used to select or deselect at least a portion of the icons 322 included in one or more prompts 126. At times, the content provider system pseudo-randomly selects the narrative segments 124 included in the prompt 126 from a larger sub-set of narrative segments 124 that is smaller than the total set of narrative segments 124 of the narrative 164.

At times, it may be undesirable to include at least some icons 322 in one or more prompts 126. For example, it is undesirable to include an icon 322 corresponding to a narrative segment 124 previously viewed by the media content consumer 130. In another example, it may be undesirable to include icons 322 that correspond to narrative segments 124 blocked from presentation to the media content consumer (e.g., parentally blocked to prevent consumption by minor media content consumers 130). In yet another example, it may be undesirable to include icons 322 that correspond to narrative segments 124 designated as representing "premium," "bonus," "promotional," or similar content and for which the media content consumer 130 has not obtained authorization (e.g., via purchase or by satisfying one or more defined conditions).

The method 800 of operating a content editing system 120 to create a narrative that includes a number of narrative segments 124 and a number of prompts 126 commences at 802.

At 804, the content editing system generates a user interface that includes a user interface element with which the production team or editing team can identify any number of defined checkpoints in a narrative 164. The content delivery system performs an assessment at each of the defined checkpoints. Such assessments determine whether the content delivery system presents a prompt 126 to the media content consumer 130 and/or determines the number and/or type of icons 322 presented to the media content consumer 130 via the prompt 126. Such assessments may include one or more algorithms, conditional expressions, or Boolean conditions.

The content editing system also generates a condition specifier interface element that permits the production team or the editing team to determine, set, or otherwise select at least one condition to be assessed at each of the respective checkpoints. At times, the at least one condition may be selected from a defined plurality of conditions to be assessed.

The content editing system also generates an action user interface element to set an action performed in response to a defined outcome of the assessment of the respective condition. For example, an assessed condition may include whether a particular narrative segment 124a has been presented to the respective media content consumer 130. If narrative segment 124a was previously presented to the media content consumer 130, an icon 322 corresponding to narrative segment 124a is omitted from subsequent prompts 126. In another example, a condition may be based on a demographic or similar personal indicia of the media content consumer (e.g., gender, age, location, profession) 130. In such situations, narrative segments 124 may be selected based at least in part f narrative segment 124a was previously presented to the media content consumer 130, an icon 322 corresponding to narrative segment 124a is not included in subsequent prompts 126.

At 806, responsive to the selection received via the user interface at 804, the content editing system computationally associates the at least one checkpoint in the narrative segment 124, the at least one condition specifier, and the at least one action interface element with the respective narrative segment 124. The method 800 of operating a content editing system 120 to create a narrative that includes a number of narrative segments 124 and a number of prompts 126 concludes at 808.

Figure 9A:
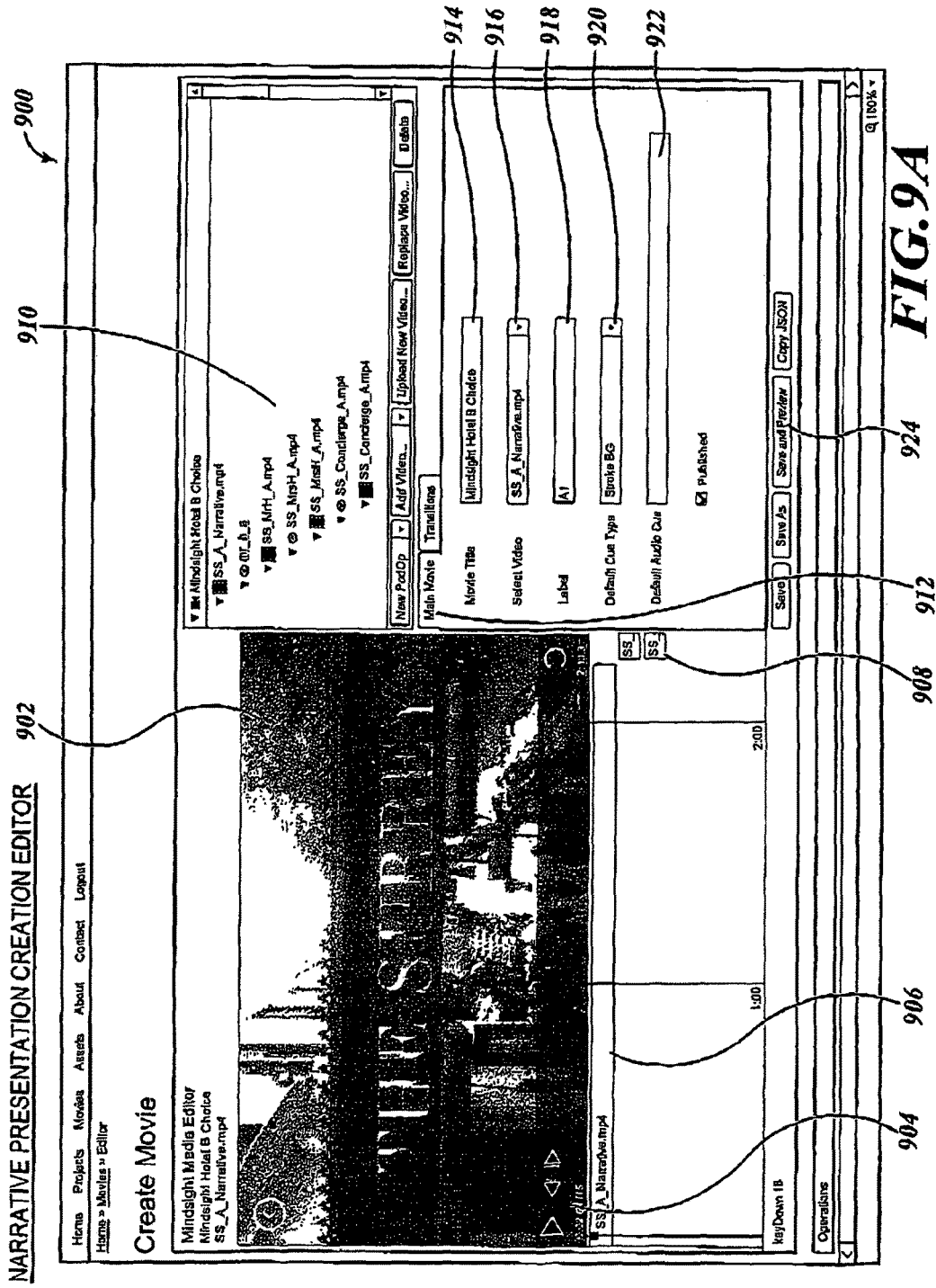
FIG. 9A is a screen capture of an illustrative content editing system CREATE MOVIE editing screen and open MAIN MOVIE tab that provides a production or editing team with the ability to select and sequentially link narrative segments to form a narrative presentation, according to one illustrated embodiment.
Figure 9B:
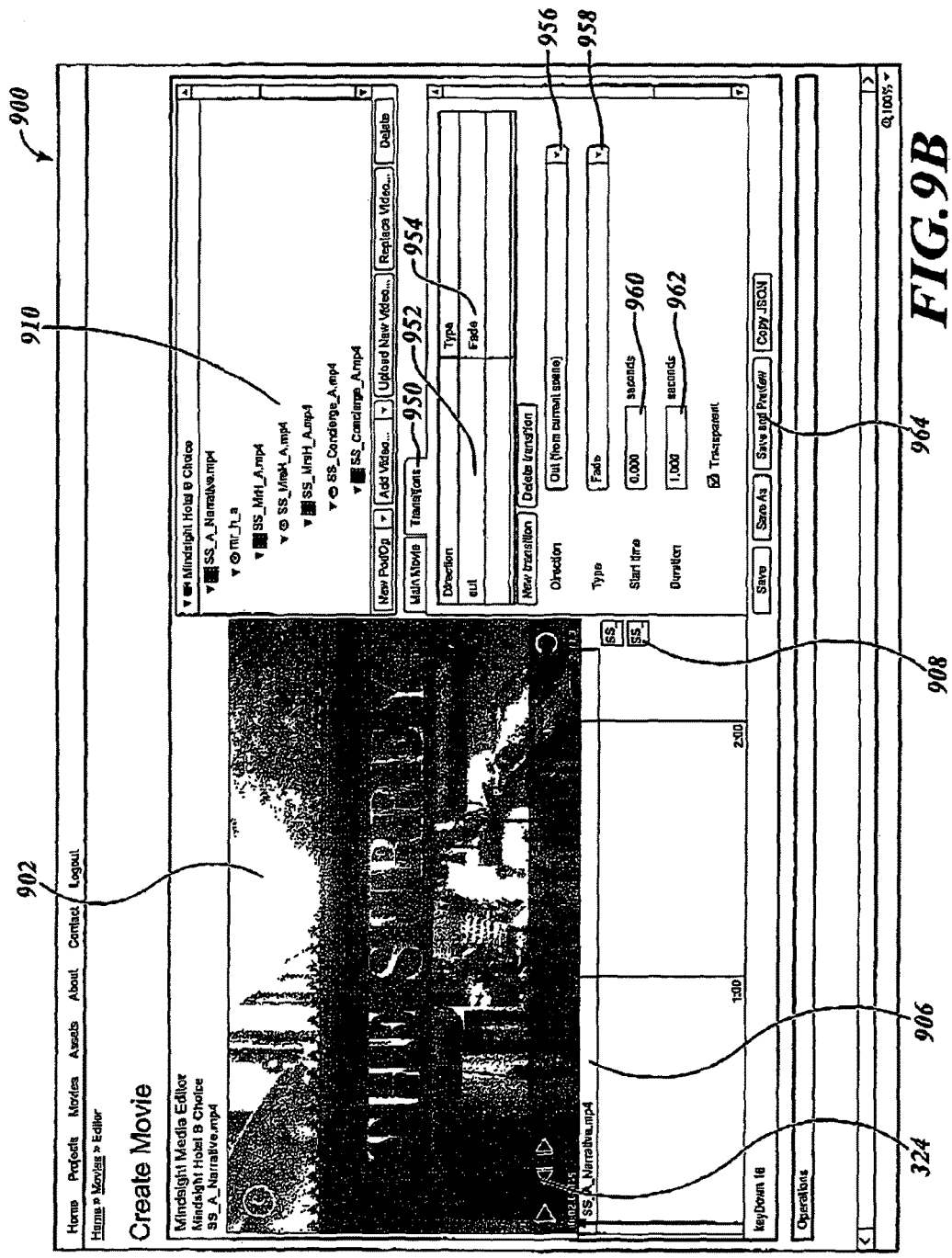
FIG. 9B is a screen capture of an illustrative content editing system CREATE MOVIE editing screen and open TRANSITIONS tab that provides a production or editing team with the ability to select a default transition style that will be used to transition between narrative segments in a narrative, according to one illustrated embodiment.

FIGS. 9A and 9B are an illustrative narrative creation editor user interfaces 900. Visible in the user interfaces 900 are a first panel 902 in which the narrative segments 124 appear, a second panel 904 in which the structure of the narrative 164 is graphically displayed via a tree-like structure 920, and a third panel 906 in which various narrative (i.e., "movie") options are displayed under the "MAIN MOVIE" tab 930 (FIG. 9A) and various transition options are displayed under the "TRANSITIONS" tab 950 (FIG. 9B). The user interface 900 represents an interface used by the production team or editing team to create a narrative 164 by selecting and assembling narrative segments 124. The first panel 902 includes a content player 910, control buttons 912 (e.g., play, pause, step forward, step reverse, stop), a timeline 914 for the content provided in the content player 910. The first panel 902 also includes icons representing the narrative segments 124 appearing as icons 322 in a prompt 126 upon termination or at the conclusion of the narrative segment 124.

The second panel 904 includes a graphical narrative structure 920, identifying logical relationships between the narrative segments 124 included in the narrative 164. Visible within the graphical narrative structure 920 is narrative information 922 (denoted using a camera icon), narrative segment information 924 (denoted using the film icon), and prompt information 926 (denoted using an eye icon).

The third panel 906 includes two tabs, a first tab labeled MAIN MOVIE 930 and a second tab labeled TRANSITIONS 950. FIG. 9A shows the contents under the MAIN MOVIE tab 930 of the third panel 906. Under the MAIN MOVIE tab 930, the third panel 906 includes buttons 932 that enable the system user to SAVE, SAVE AND PREVIEW, or COPY one or more settings. Under the MAIN MOVIE tab 930, the third panel 906 includes a MOVIE TITLE text field 934 to accept the entry of a movie title; a LABEL text field 938 to accept the entry of a label; and a DEFAULT AUDIO CUE text field 942 to accept the entry of an audio cue. Under the MAIN MOVIE tab 930, the third panel 906 additionally includes a SELECT VIDEO selection pull down menu 936 to select stored narrative segments 124 for the narrative 164 and a DEFAULT CUE TYPE pull down menu 940.

FIG. 9B shows the contents under the "TRANSITIONS" tab 950 of the third panel 906. Under the TRANSITIONS tab 950, the third panel 906 includes buttons 932 that enable the system user to SAVE, SAVE AND PREVIEW, or COPY one or more settings. Under the TRANSITIONS tab 950, the third panel 906 includes a DIRECTION selection pull down menu 956 to select the default direction of transitions within the narrative 164 and a TYPE selection pull down menu 958 to select the default type of transition within the narrative 164. Under the TRANSITIONS tab 950, the third panel 906 additionally includes a START TIME text field 960 and a DURATION text field 962. Under the TRANSITIONS tab 950, the transition direction is shown in a DIRECTION field 964 and the transition type is shown in a TYPE field 966. Under the TRANSITIONS tab 950, buttons permitting the addition of a new transition type 968a or the deletion of an existing transition type 968b.

Figure 10A:
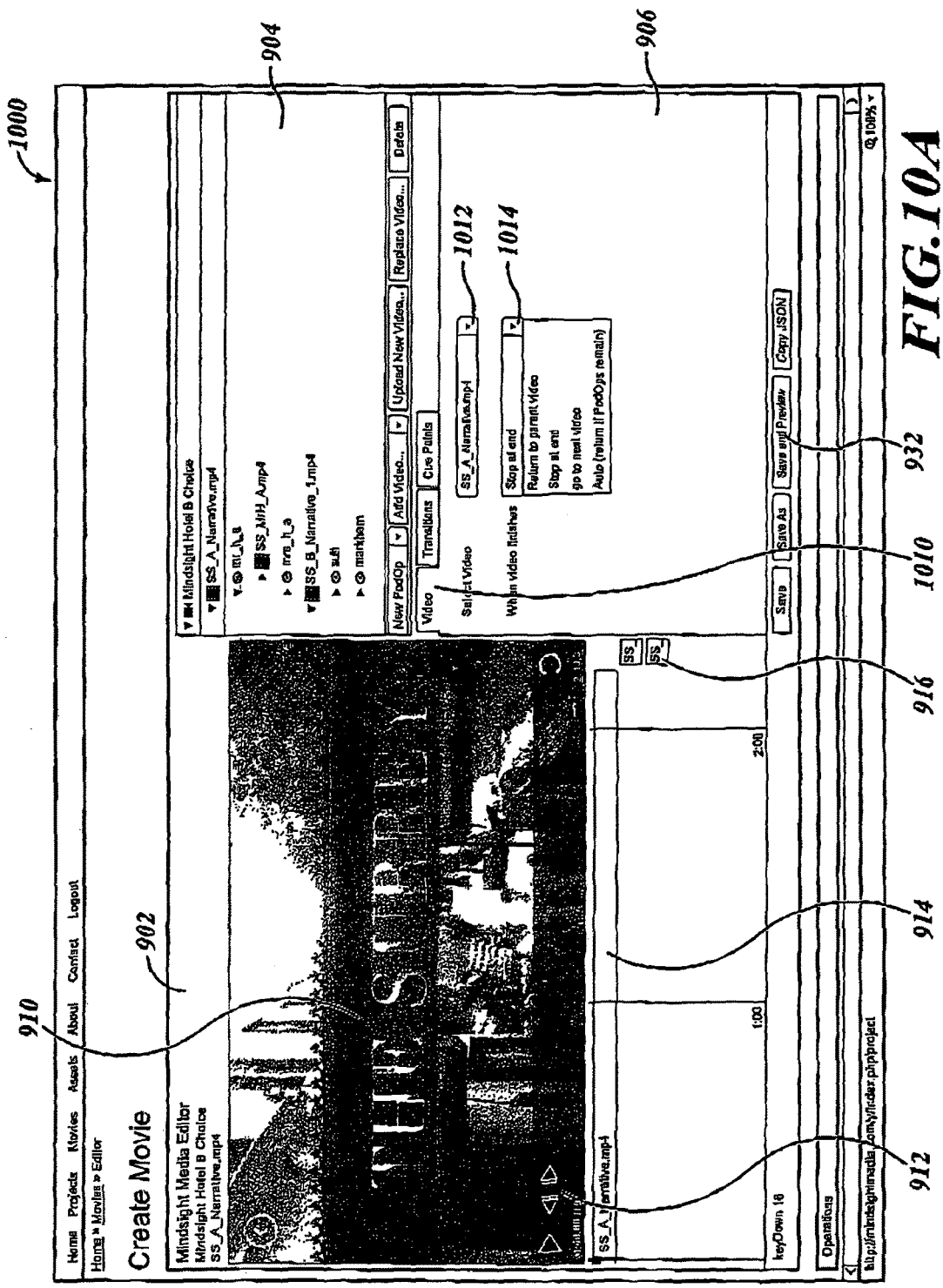
FIG. 10A is a screen capture of an illustrative content editing system editing screen and open VIDEO tab that provides a production or editing team with the ability to select narrative presentations for inclusion in the narrative, according to one illustrated embodiment.
Figure 10B:
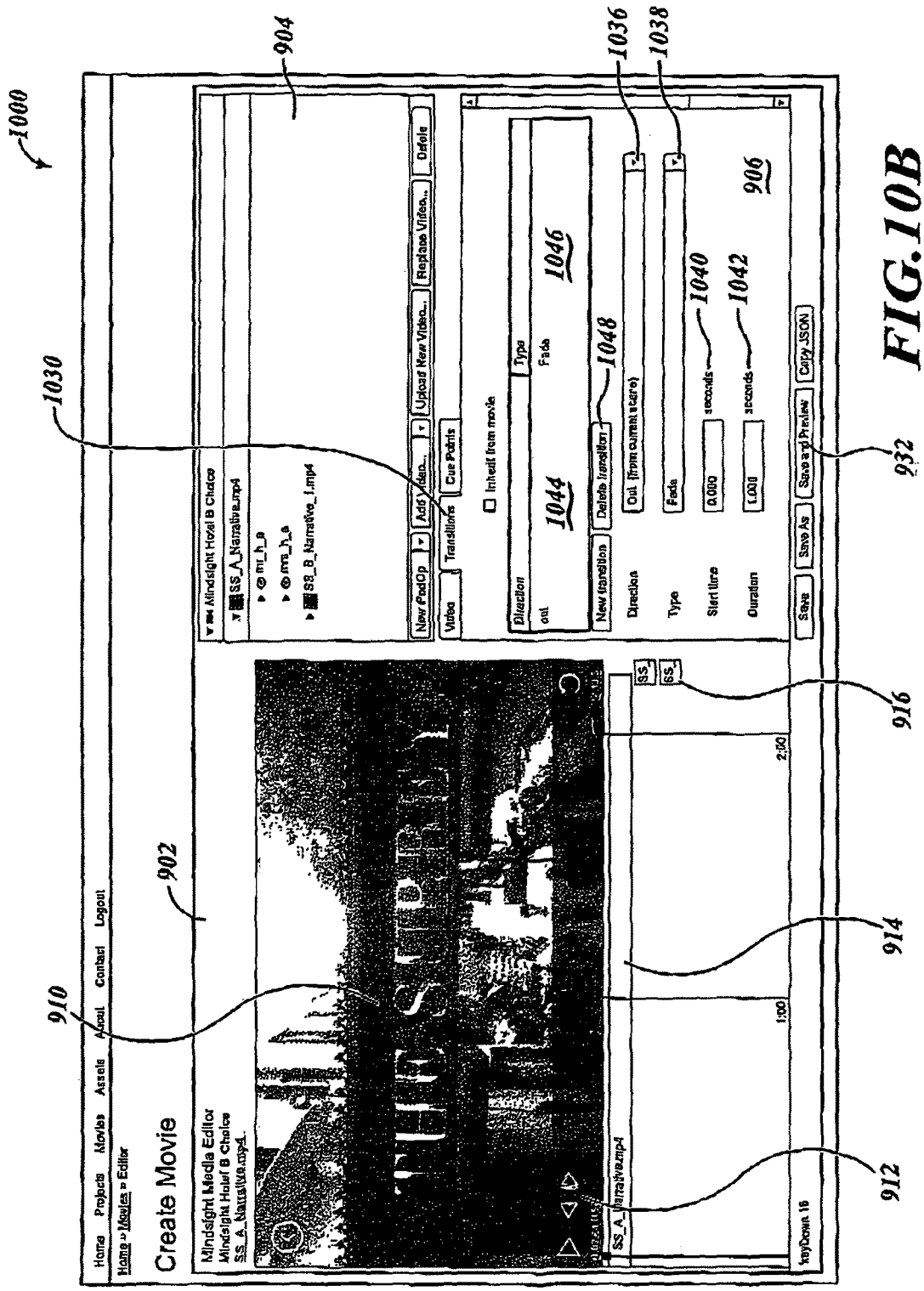
FIG. 10B is a screen capture of an illustrative content editing system editing screen and open TRANSITIONS tab that provides a production or editing team with the ability to select and specify the parameters of individual transitions that will be used to transition between narrative segments in a narrative, according to one illustrated embodiment.
Figure 10C:
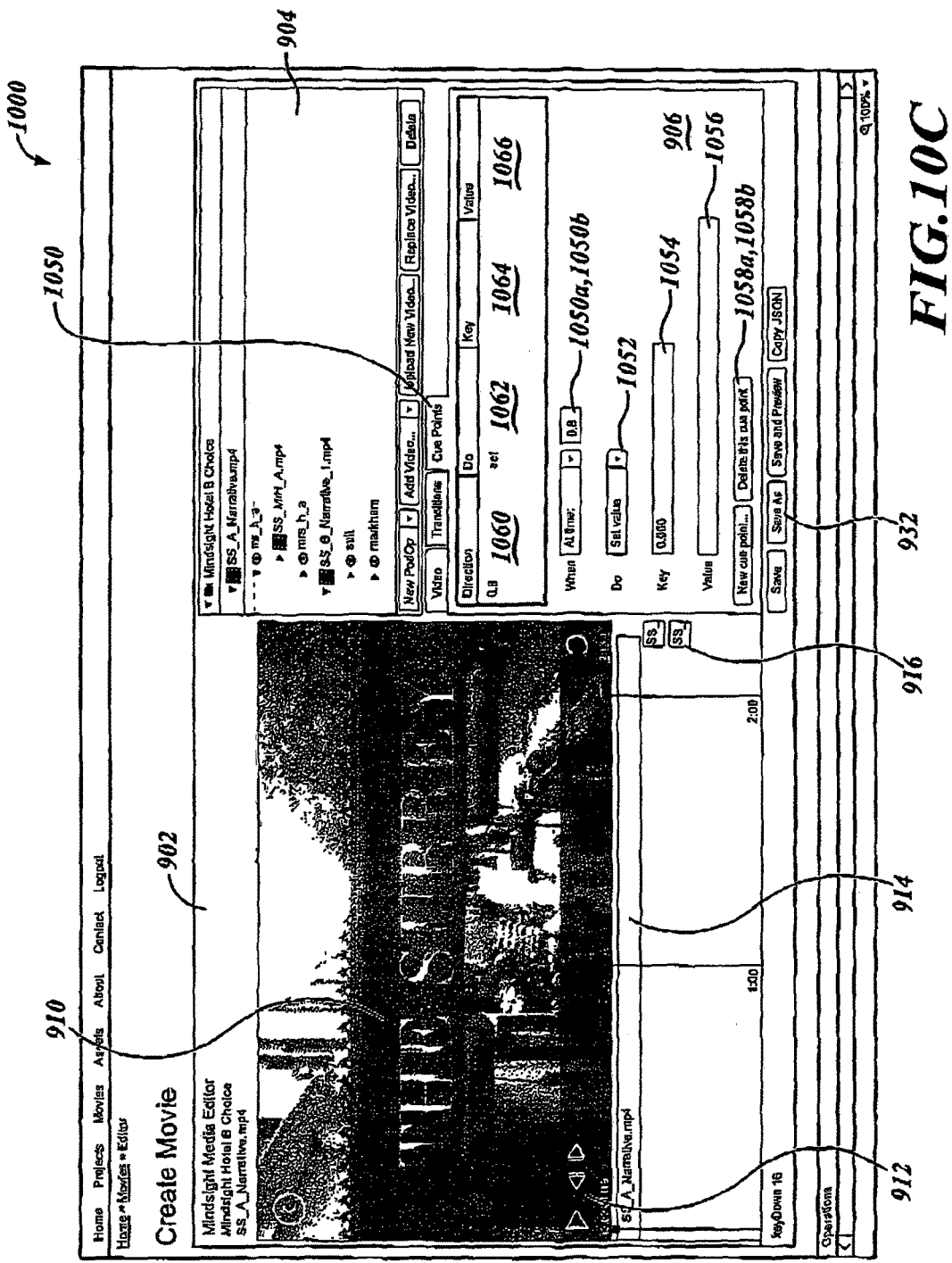
FIG. 10C is a screen capture of an illustrative content editing system editing screen and open CUE POINTS tab that provides a production or editing team with the ability to select and specify cue points and logical expressions that govern the appearance of prompts in narrative, according to one illustrated embodiment.

FIGS. 10A, 10B, and 10C are examples of illustrative narrative creation editor user interfaces 1000 depicting a variety of narrative segment 124 editing options. Visible in the user interface 1000 is a first panel 902 in which the narrative segments 124 are presented to the editing user, a second panel 904 in which the structure of the narrative 164 is graphically displayed to the editing user via a tree-like structure 920, and a third panel 906 in which various narrative segment (i.e., "video") editing options are displayed under the "VIDEO" tab 910 (FIG. 10A), various narrative transition editing options are displayed under the "TRANSITIONS" tab 930 (FIG. 10B), and various narrative segment cue point editing options are displayed under the "CUE POINT" tab 950 (FIG. 10C).

The user interfaces 1000 are used by the production team or editing team to create a narrative 164 by selecting and assembling narrative segments 124. The first panel 902 includes a content player 910, control buttons 912 (e.g., play, pause, step forward, step reverse, stop), a timeline 914 for the content provided in the content player 910. The first panel 902 also includes icons 916 representing the narrative segments 124 that appear as icons 322 in a prompt 126 upon termination or at the conclusion of the narrative segment 124.

The second panel 904 includes a graphical narrative structure 920 in a format analogous to a directory tree, identifying logical relationships between the narrative segments 124 included in the narrative 164. Alternative graphical narrative structures 920 in the form of icons and/or text are also possible, although not depicted in FIG. 10A. Visible within the graphical narrative structure 920 is narrative information 922 (denoted using a camera icon), narrative segment information 924 (denoted using the film icon), and prompt information 926 (denoted using an eye icon).

The third panel 906 includes three tabs, a first tab labeled VIDEO 1010, a second tab labeled TRANSITIONS 1030, and a third tab labeled CUE POINTS 1050. FIG. 10A shows the contents under the VIDEO tab 1010 of the third panel 906. Under the VIDEO tab 1010, the third panel 906 includes a SELECT VIDEO selection pull down menu 1012 to select stored narrative segments 124 for the narrative 164 and a WHEN VIDEO FINISHES pull down menu 940 to select the action performed by the content player system at the conclusion of the selected narrative segment 124.

FIG. 10B shows the contents under the "TRANSITIONS" tab 1030 of the third panel 906 in an example illustrative narrative creation editor user interface 1000. Under the TRANSITIONS tab 1030, the third panel 906 includes buttons 932 that enable the system user to SAVE, SAVE AND PREVIEW, or COPY one or more settings. Under the TRANSITIONS tab 1030, the third panel 906 includes a DIRECTION selection pull down menu 1036 to select the default direction of transitions within the narrative 164 and a TYPE selection pull down menu 1038 to select the default type of transition within the narrative 164. Under the TRANSITIONS tab 1030, the third panel 906 additionally includes a START TIME text field 1040 and a DURATION text field 1042. Under the TRANSITIONS tab 1030, the transition direction is shown in a DIRECTION field 1044 and the transition type is shown in a TYPE field 1046. Under the TRANSITIONS tab 1030, buttons permitting the addition of a new transition type 1048a or the deletion of an existing transition type 1048b.

FIG. 10C shows the contents under the "CUE POINTS" tab 1050 of the third panel 906 in an example illustrative narrative creation editor user interface 1000. The editing team may use the CUE POINTS tab to insert cue points within a narrative segment 124. At times, these cue points identify locations within a narrative presentation 124 at which information in the form of additional narrative segments 124 may be made available to the media content consumer 130. At times, cues may be presented conditional upon the media content consumer 130 meeting one or more defined criterion.

Under the CUE POINTS tab 1050, the third panel 906 includes buttons 932 that enable the system user to SAVE, SAVE AND PREVIEW, or COPY one or more settings. Under the CUE POINTS tab 1050, the third panel 906 includes a WHEN selection pull down menu 1052a and a duration display 1052b to indicate the temporal location within the narrative segment 124 at which the cue may be made available to the media content consumer 130 and a DO selection pull down menu 1054 to indicate the action to be taken at the selected time. Under the CUE POINTS tab 1050, the third panel 906 additionally includes a KEY text field 1056 and a VALUE text field 1058. Under the CUE POINTS tab 1050, the WHEN value is shown in a WHEN field 1062, the action type is shown in a DO field 1064, the key value is shown in a KEY field 1066, and the key value is shown in a VALUE field 1068. The CUE POINTS tab 1050 also includes buttons permitting the addition of a new cue point 1060*a* or the deletion of an existing cue points 1060*b*.

Figure 11A:
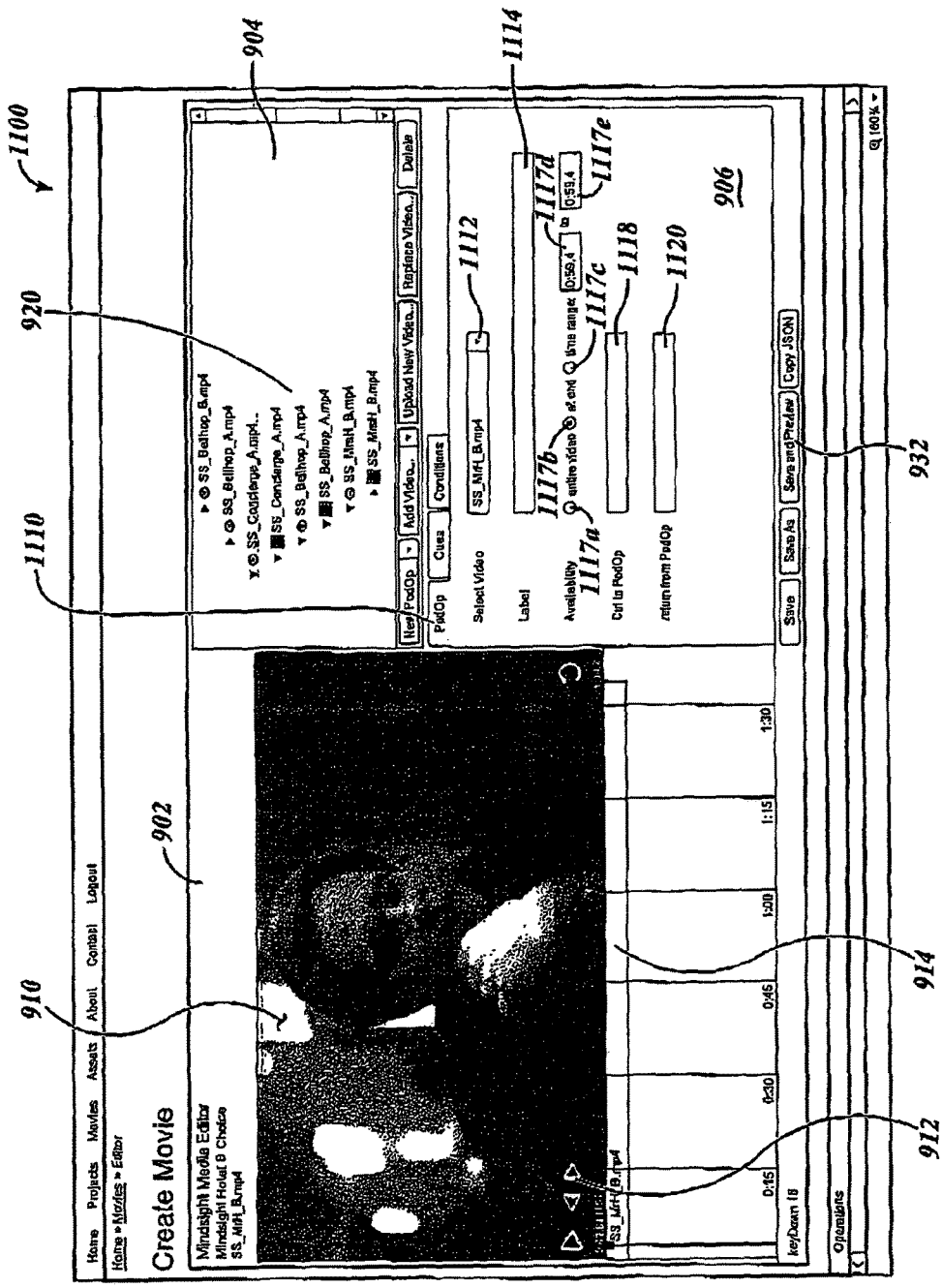
FIG. 11A is a screen capture of an illustrative content editing system editing screen and open PODOP tab that provides a production or editing team with the ability to select narrative presentations and/or subordinate narrative presentations for inclusion in the narrative, according to one illustrated embodiment.
Figure 11B:
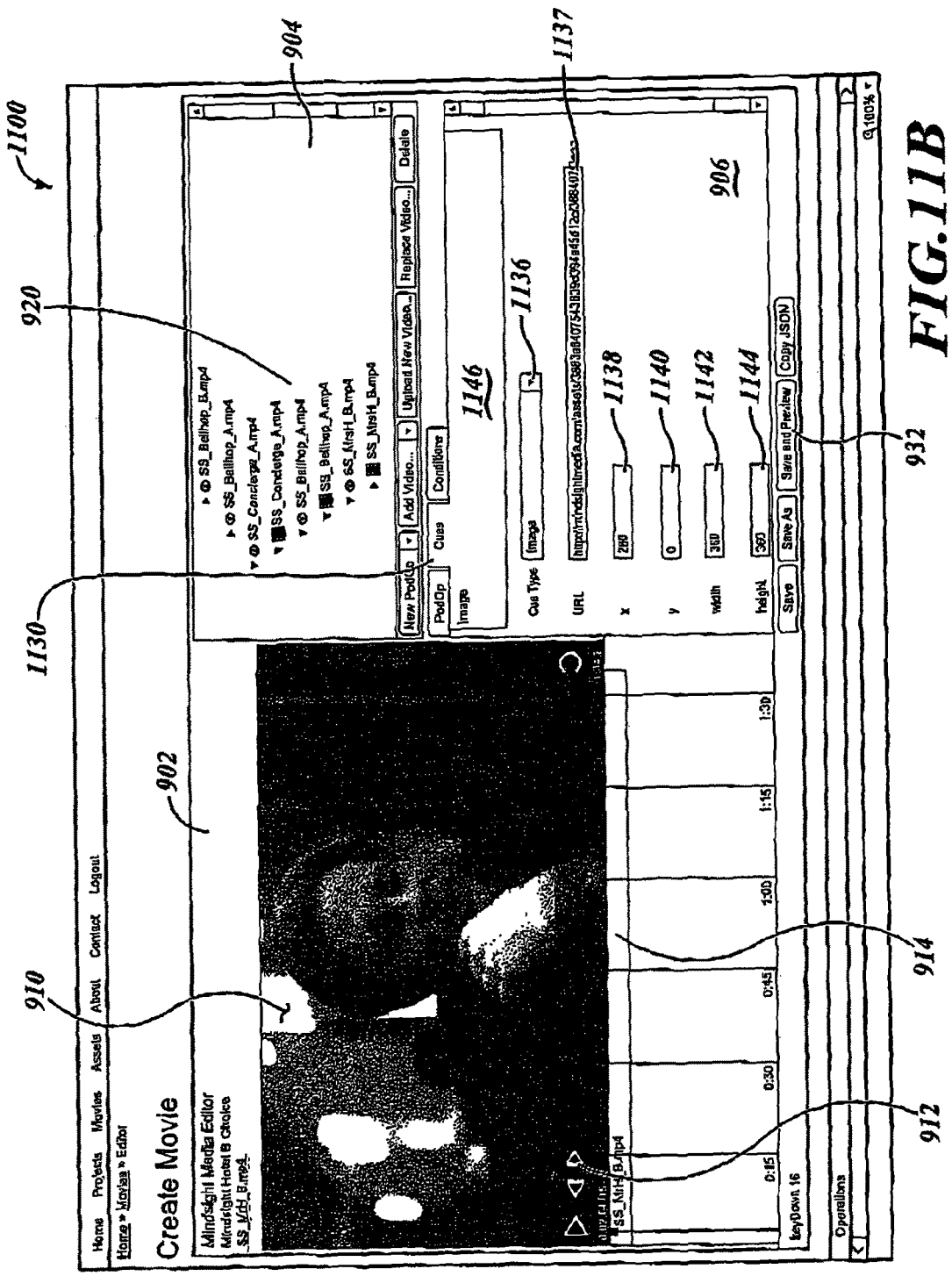
FIG. 11B is a screen capture of an illustrative content editing system editing screen and open CUES tab that provides a production or editing team with the ability to select and specify the parameters of cues or prompts appearing in the narrative to indicate to the media content consumer the existence of an available narrative segment and/or additional or bonus content, according to one illustrated embodiment.
Figure 11C:
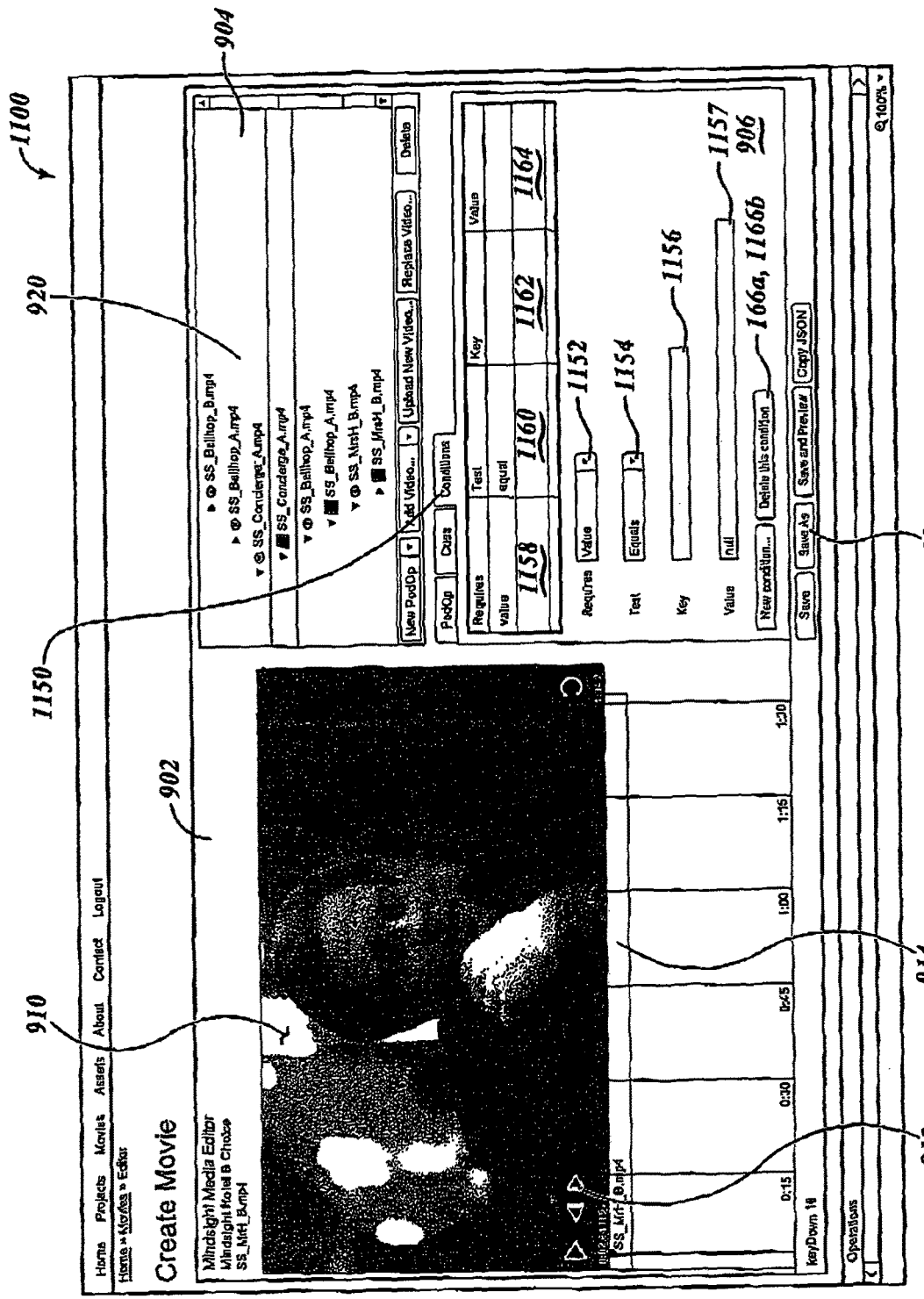
FIG. 11C is a screen capture of an illustrative content editing system editing screen and open CONDITIONS tab that provides a production or editing team with the ability to select and specify logical conditions and/or Boolean expressions governing the appearance in the narrative of cues or prompts indicating to the media content consumer the existence of an available narrative segment and/or additional or bonus content, according to one illustrated embodiment.

FIGS. 11A, 11B, and 11C are examples of illustrative narrative creation editor user interfaces 1100 depicting a variety of editing options useful with narrative segments 124 such as additional or bonus content 128, according to one illustrated embodiment. Visible in the user interface 1100 is a first panel 902 in which the narrative segments 124 are presented to the editing user, a second panel 904 in which the structure of the narrative 164 is graphically displayed to the editing user via a tree-like structure 920, and a third panel 906 in which various narrative segment (i.e., "video") editing options are displayed under the "PODOP" (i.e., additional or bonus content 128) tab 1110 (FIG. 11A), various narrative transition editing options are displayed under the "CUES" tab 1130 (FIG. 11B), and various narrative segment cue point editing options are displayed under the "CONDITIONS" tab 1150 (FIG. 11C).

The user interfaces 1100 are used by the production team or editing team to insert a narrative segment 124 or additional or bonus content 128 into a narrative 164 by selecting and assembling the respective narrative segments 124 and/or additional or bonus content 128. The first panel 902 includes a content player 910, control buttons 912 (e.g., play, pause, step forward, step reverse, stop), a timeline 914 for the content provided in the content player 910. The first panel 902 also includes icons 916 representing the narrative segments 124 that appear as icons 322 in a prompt 126 upon termination or at the conclusion of the narrative segment 124.

The second panel 904 includes a graphical narrative structure 920 in a format analogous to a directory tree, identifying logical relationships between the narrative segments 124 included in the narrative 164. Alternative graphical narrative structures 920 in the form of icons and/or text are also possible, although not depicted in FIG. 11A. Visible within the graphical narrative structure 920 is narrative information 922 (denoted using a camera icon), narrative segment information 924 (denoted using the film icon), and prompt information 926 (denoted using an eye icon).

The third panel 906 includes three tabs, a first tab labeled PODOP 1110, a second tab labeled CUES 1130, and a third tab labeled CONDITIONS 1150. FIG. 11A shows the contents under the PODOP tab 1110 of the third panel 906. Under the PODOP tab 1110, the third panel 906 includes a SELECT VIDEO selection pull down menu 1112 to select stored narrative segments 124 and/or additional or bonus content 128 for the narrative 164. The PODOP tab 1110 also includes a LABEL text field 1114, a CUT TO PODOP text field 1118, and a RETURN FROM PODOP text field 1120. The PODOP tab 1110 also includes an AVAILABILITY field that includes a number of radio buttons and two text fields. Radio button 1117*a* places a selectable icon (for initiating the presentation of another narrative segment 124 or an additional or bonus content 128) in the narrative 164 for the duration of the instant narrative segment 124. Radio button 1117*b* places a selectable icon (for initiating the presentation of another narrative segment 124 or an additional or bonus content 128) in the narrative 164 at the conclusion of the instant narrative segment 124. Radio button 1117*c* places a selectable icon (for initiating the presentation of another narrative segment 124 or an additional or bonus content 128) in the narrative 164 for a portion of the duration of the instant narrative segment 124. The text boxes 1117*d* and 1117*e* provide the "FROM" and "TO" times that the icon is displayed in the instant narrative segment 124.

FIG. 11B shows the contents under the "CUES" tab 1130 of the third panel 906 in an example illustrative additional or bonus content 128 creation editor user interface 1100. Under the CUES tab 1130, the third panel 906 includes buttons 932 that enable the system user to SAVE, SAVE AND PREVIEW, or COPY one or more settings. Under the CUES tab 1130, the third panel 906 includes a CUE TYPE selection pull down menu 1136 to select the type of cue placed within the narrative 164 to indicate the availability of a narrative segment 124 or an additional or bonus content 128 to the media content consumer 130. Under the CUES tab 1130, the third panel 906 additionally includes a Universal Resource Locator (URL) address field 1137 in which an address for the narrative segment 124 or additional or bonus content 126 may be provided by the production team or editing team. Under the CUES tab 1130, the third panel 906 additionally includes an "X" text field 1138, a "Y" text field 1140, a WIDTH text field 1142, and a HEIGHT text field 1144. The X and Y text fields 1138 and 1140 indicate the location within the narrative 164 at which the cue is placed. The HEIGHT and WIDTH text fields 1142 and 1144 indicate the size of the cue in the narrative 164. Under the CUES tab 1130, the cue type is shown in a CUE TYPE field 1146.

FIG. 11C shows the contents under the "CONDITIONS" tab 1150 of the third panel 906 in an example illustrative subordinate narrative creation editor user interface 1100. The editing team may use the CONDITIONS tab 1150 to establish conditions (e.g., logical conditions expressed as an algorithm or Boolean expression) to establish cue points within the narrative 164.

Under the CONDITIONS tab 1150, the third panel 906 includes buttons 932 that enable the system user to SAVE, SAVE AND PREVIEW, or COPY one or more settings. Under the CONDITIONS tab 1150, the third panel 906 includes a REQUIRES selection pull down menu 1152 to establish requirements for displaying a cue or icon in the narrative presentation 164 and a TEST selection pull down menu 1154 to establish the conditional tests for displaying the cue or icon in the narrative presentation 164. Under the CONDITIONS tab 1150, the third panel 906 additionally includes a KEY text field 1156 and a VALUE text field 1157. Under the CONDITIONS tab 1150, the conditional requirements are shown in a REQUIRES field 1158, the test is shown in a TEST field 1160, the key value is shown in a KEY field 1162, and the key value is shown in a VALUE field 1164. The CONDITIONS tab 1150 also includes buttons permitting the addition of a new condition 1166*a* or the deletion of an existing condition 1166*b*.

Some specific examples of implementations will now be provided as support to the understanding of the teachings herein.

In a hybrid model, episodes can be released all at once for binge-watching and then at specific times in between episodes or seasons to invoke more sustained social chatter. The storyteller/network has the control. For example, networks could strategically release one or more exclusive narrative segments and/or additional or bonus content that reveal something telling about a character between episodes or seasons.

In the first Pod Op episode, viewers will get a choice of paths to take. Once a choice has been made, the viewer will continue along a particular path for a set amount of Pod Ops and/or episodes until they get the opportunity to select the other choice or a new set of choices. This will stimulate social chatter, since the viewing community will be sharing and comparing their different experiences. For example, a viewer selects a particular character's point-of-view (POV) and stays with that character for the next episode, until the viewer is given the option to choose the POV of another character.

The system may allow viewers to share out their path to through various social channels. The viewer can see how their path compares to the paths of the viewer's friends, family and/or coworkers. Viewers can also share out individual narrative segments and/or additional or bonus content as discussion pieces.

The system may enable viewers to unlock narrative segments and/or additional or bonus content once a certain threshold of viewing is reached. For example, the system may allow the first 1,000 viewers who reach certain narrative segment or episode, to unlock an exclusive narrative segment and/or exclusive additional or bonus content. For instance, those users may be permitted to access a giant shocker or plot twist in the narrative, weeks before it is scheduled for general release to other viewers. The only way other viewers will be able to see this particular exclusive narrative segment and/or exclusive additional or bonus content, is if one of the first viewers shares the exclusive narrative segment and/or exclusive additional or bonus content with them. The system may limit the number of additional viewers which each of the first viewers are allowed to share or unlock the exclusive narrative segment and/or exclusive additional or bonus content.

Viewers that are logged into the application or otherwise using the system, for instance via the viewer's Facebook® account, may be able to see a "heat map" of where their friends are in the narrative, and/or be alerted when their friends have made similar choices, and/or are on a different path from the viewer.

The system may provide viewers with a choice for which episode of narrative segment they will view first, which will set the viewer out on a particular path. During subsequent periods (e.g., weeks), viewers will discover that their friends may be on similar or different paths. Such may occur both through outside social chatter or media, and through a graphical representation or Story Map provided by the system or a component thereof. Viewers will have the opportunity to share their particular path or a particular narrative segment with their friends or other viewers in order to learn more about the narrative and characters. The system may, for example allow viewers to swap particular narrative segments and/or additional or bonus content, and "collect" narrative segments via viewing and/or sharing with others in order to populate the user's own Story Map. This may allow viewers to gain the most insights into the narrative at large. Once viewers have "collected" a certain number of narrative segments, for example with the help of the community, the viewer will have the opportunity to unlock other narrative segments and/or additional or bonus content (e.g., the season's finale). This will be the first truly socially-driven, collaborative TV watching experience, in that the viewer will have to be social in order to get the full experience. Viewers will get the satisfaction of intimate binge-viewing, along with the social communal experience.

In some implementations, a content delivery platform may allow a content media consumer to select two or more narrative segments for presentation, allowing the content media consumer to establish a queue of narrative segments, and optionally other content, to be presented.

Data Mining and Influencing Media Content Consumer Selections

In some instances, it may be advantageous for the content creator or content editor to influence the content consumer's selection of one or more narrative segments during presentation of a narrative. To achieve this functionality, one or more priming stimuli may be provided at least once during a narrative segment. Once the narrative segment that includes the one or more priming stimuli has been presented to the content consumer, one or more target stimuli may be provided in association with a target narrative segment during a prompt for selection of a narrative segment in a subset of narrative segments that includes the target narrative segment. Exposure to the one or more priming stimuli influences selection of the target narrative segment, thereby biasing the content consumer to select, or to ignore, the target narrative segment.

Priming stimuli or target stimuli may include, for example, a sound, a musical segment, a shape, image, video, color, spoken or written words, device vibrations, or subliminal images or sequences. Priming stimuli may be presented a single time during a narrative segment, or may be presented multiple times during one or more narrative segments.

In general, priming is an implicit memory effect in which exposure to one stimulus, referred to as a priming stimulus, influences a response to another stimulus, referred to as a target stimulus. For example, a user may recognize the word MOTORCYCLE more quickly following presentation of the word AUTOMOBILE than following presentation of the word APPLE. Priming may occur following perceptual, semantic, associative or conceptual stimulus repetition, for example. The effects of priming can be quite salient and long lasting. For example, unconscious priming effects can affect word choice long after the words have been consciously forgotten.

In many instances, priming may work best when the priming stimulus and the target stimulus are in the same sensory modality. For example, verbal priming may work best with verbal cues and visual priming may work best with visual cues. Different stimuli (e.g., two different but similar words) of the same sensory modality (e.g., verbal) may be used to prime a target stimulus. The target stimulus may be the same stimulus as one of the different stimuli (e.g., one of the two different but similar words), may be different from the priming stimuli but of the same sensory modality, or may be different from the priming stimuli and of a different sensory modality. For example, exposure to a priming stimulus of a first sensory modality (e.g., visual, auditory, tactile, olfactory, gustatory, kinesthetic) may influence responses to exposure to a target stimulus of a second sensory modality different from the first sensory modality. Additionally, priming and target stimuli may be cross-modal or multi-modal, including two or more different sensory modalities (e.g., visual and auditory, auditory and olfactory).

Different stimuli of the same sensory modality may differ in one or more characteristics, including magnitude, duration, shape, content (e.g., words, images, sounds), pattern (e.g., tactile stimulus pattern, audible pattern), color, or other characteristics.

Priming may be in the form of positive priming or negative or inhibitory priming. Generally, positive priming positively influences a response characteristic of a user to a target stimulus. For example, in response to exposure to a positive priming stimulus, a user may be more likely to select an object associated a target stimulus, or may react to the object more quickly. Conversely, negative priming negatively influences a response characteristic of a user to a target stimulus. For example, in response to exposure to a negative priming stimulus, a user may be less likely to select an object associated with a target stimulus, or may react to the object more slowly.

Figure 12:
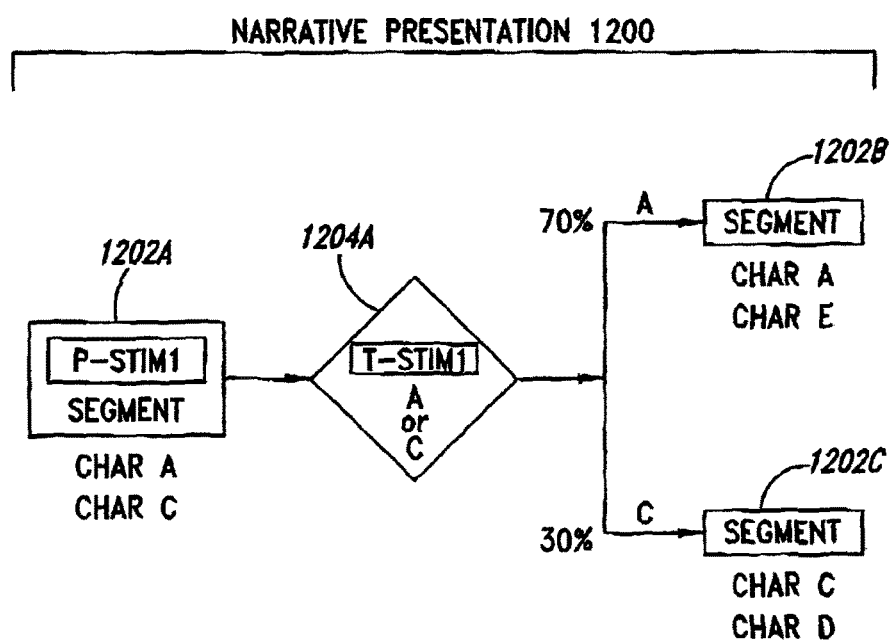
FIG. 12 is a flow diagram depicting an illustrative content delivery system narrative presentation created using a user input provided to the content delivery system, the user input biased by a priming stimulus and a target stimulus and indicative of a selection of a narrative segment, according to one illustrated embodiment.
Figure 13:
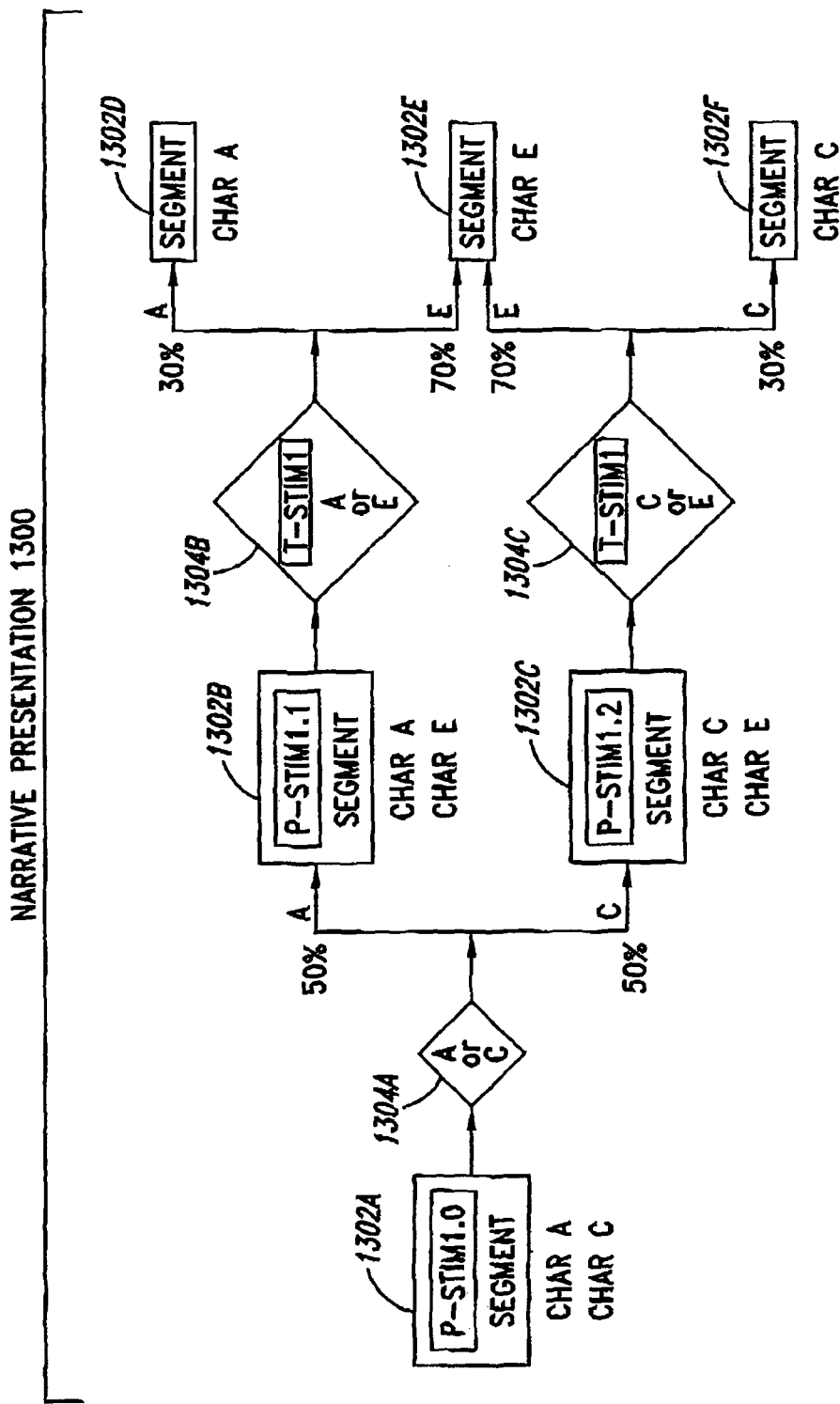
FIG. 13 is a flow diagram depicting an illustrative content delivery system narrative presentation created using a number of user inputs provided to the content delivery system, each of the user inputs indicative of a selection of a narrative segment, at least some of the user inputs biased by a priming stimulus and a target stimulus, according to one illustrated embodiment.
Figure 14:
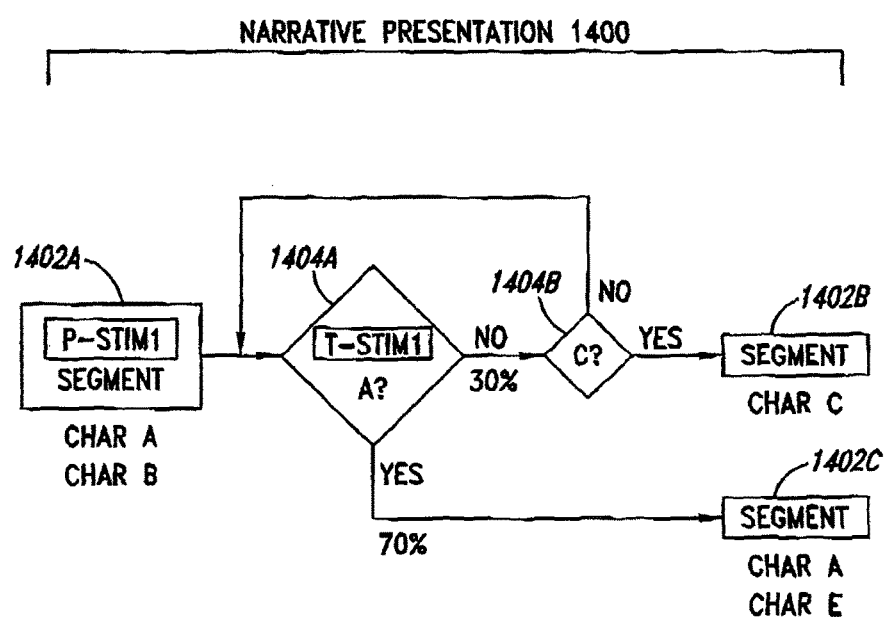
FIG. 14 is a flow diagram depicting an illustrative content delivery system narrative presentation created using a user input provided to the content delivery system, the user input indicative of a selection of a narrative segment, the user input selected in response to presentation of a serial sequence of prompts, according to one illustrated embodiment.

FIGS. 12-14 are flow diagrams depicting illustrative content delivery system narrative presentations that utilize priming to bias user selections of one or more narrative segments. Note that the narrative segment features and relationships discussed with regard to FIGS. 12-14 appear in different figures for clarity and ease of discussion. However, some or all of the narrative segment features and relationships included in FIGS. 12-14 are combinable in any way or in any manner to provide additional embodiments. Such additional embodiments generated by combining narrative segment features and relationships fall within the scope of this disclosure.

Referring now to FIG. 12, the media content consumer 130 (FIG. 1) receives a narrative 1200 as a series of narrative segments 1202A-C. Narrative segment 1202A represents the beginning or foundational narrative segment and narrative segments 1202B and 1202C represent temporally later narrative segments. By presenting the same beginning or foundational narrative segment 1202A, each media content consumer 130 may for example, be introduced to an overarching common story and plotline. Optionally, the narrative 1200 may have a single terminal or ending narrative segment (not shown), such as a finale, season finale, narrative finale. Thus, at least some of the narrative segments 1202 subsequent to the beginning or foundational narrative segment 1202A represent segments selectable by the media content consumer 130. It is the particular sequence of narrative segments 1202 selected by the media content consumer 130 that determines the details and sub-plots (within the context of the overall story and plotline of the narrative 1200) experienced or perceived by the particular media content consumer. The narrative segment 1202A may also be a narrative segment that is preceded by one or more other narrative segments of the narrative 1200.

In FIG. 12, the beginning or foundational narrative segment 1202A includes two characters, "CHAR A" and "CHAR C." At the conclusion of narrative segment 1202A, the media content consumer 130 is presented with a prompt 1204A including icons representative of a subset of available narrative segments. The subset of narrative segments associated with prompt 1204A may, for example, include the first narrative segment 1202B that is associated with CHAR A and the second narrative segment 1202C that is associated with CHAR C. The media content consumer 130 selects an icon at the prompt 1204C to continue the narrative presentation. If the media content consumer 130 selects the icon representative of the first narrative segment 1202B that is associated with CHAR A at option or prompt 1204A, the narrative segment 1202B containing characters CHAR A and CHAR E is presented to the media content consumer 130.

If instead, the media content consumer 130 selects the icon representative of the second narrative segment 1202C that is associated with CHAR C at option or prompt 1204A, the narrative segment 1202C containing characters CHAR C and CHAR D is presented to the media content consumer 130.

Not every narrative segment 1202 need include or conclude with a prompt 1204 containing a plurality of icons, each of which corresponds to a respective media content consumer-selectable narrative segment 1202. Additionally, each narrative segment 1202 need not introduce new characters.

It is also noted that dependent on the narrative segments 1202 selected by the media content consumer 130, not every media content consumer is necessarily presented the same number of narrative segments 1202 or the same narrative segments.

Advantageously, while each media content consumer 130 receives the same overall storyline in the narrative 164, because media content consumers 130 are able to select different respective narrative segment "paths" though the narrative 164B, the media content consumers 130 will have different impressions, feelings, emotions, and experiences, at the conclusion of the narrative 164B.

During the presentation of the narrative segment 1202A, a priming stimulus P-STIM1 is provided. The priming stimulus P-STIM1 may include, for example, a sound, a musical segment, a shape, image, video, color, spoken or written words, device vibrations, subliminal images or sequences, or one or more combinations thereof. The priming stimulus P-STIM1 may be achieved by subliminal priming, for example, visual, verbal and/or audio cues embedded into the narrative segment 1202A which prime the media content consumer to select a particular narrative segment for subsequent viewing.

Exposure by the media content consumer 130 to the priming stimulus P-STIM1 may be used to influence selection of a narrative segment upon presentation of the prompt 1204A by providing a target stimulus T-STIM1 associated with the priming stimulus P-STIM1 during presentation of the prompt. The target stimulus T-STIM1 may include a sound, a musical segment, a shape, image, video, color, spoken or written words, device vibrations, subliminal images or sequences, or one or more combinations thereof.

In the illustrated example, the target stimulus T-STIM1 may be provided in a manner which positively influences a media content consumer's selection of the narrative segment 1202B, such that the media content consumer is likely to select the narrative segment 1202B over the narrative segment 1202C. As another example, the target stimulus T-STIM1 may be provided in a manner which negatively influences a media content consumer's selection of the narrative segment 1202C, such that the media content consumer is again likely to select narrative segment 1202B over narrative segment 1202C. The strength of the priming or biasing effect may depend on the particular implementation of the priming stimulus P-STIM1 and the target stimulus T-STIM1, as well as the media content consumer's susceptibility to be influenced by priming. For example, the media content consumer may be influenced to select one narrative segment over another 95% of the time, 70% of the time, 51% of the time, or the like.

Priming the media content consumer to make particular selections, whilst maintaining an impression that they made the selections independently, affords numerous advantages to narrative creators and editors. For example, priming affords the content creator or editor greater control over the unfolding of a narrative at key points, whilst maintaining the media content consumer's full investment of their own apparent free choices.

As another example, moments of dramatic poignancy, such as moments arising from the manner in which one selected narrative segment follows from another, can be reliably created using priming. Media content consumers feel heavily invested in these poignant juxtapositions, believing that they themselves have caused the juxtapositions to occur entirely out of the media content consumer's free choice.

Priming may also allow media content consumers to feel clever or empowered. For example, a media content consumer may feel particularly intelligent or empowered by correctly choosing a specific narrative segment that answers a conundrum posed by a previous narrative segment. For instance, a narrative segment A may give rise to a question about who is the murderer in a crime story. A subsequently presented prompt may feature narrative segments B, C, D, and E which each correspond to a particular protagonist in the crime story. The media content consumer may be primed to correctly select the narrative segment C which corresponds to the actual murderer in the crime story. The media content consumer may post-rationalize that their own intuitions about the selected protagonist led them to their choice, while in reality the media content consumer had been heavily primed by a priming stimulus presented in narrative segment A to select the target narrative segment C.

Conversely, the media content consumer may be negatively primed to not select a particular narrative segment. For instance, the media content consumer may be negatively primed to not select a narrative segment which may re-contextualize or alter the tenor of a narrative until all other narrative segments have been consumed. For example, a first narrative segment may depict a son being questioned by his parents concerning a romantic relationship the son has at his new college. The media content consumer may select from several available narrative segments which show the son recounting emotionally engaging anecdotes of his blossoming college romance much to the delight and satisfaction of his parents. Eventually, only one narrative segment remains, which has been negatively primed to deter its selection. Once selected, this remaining narrative segment reveals that the son is in fact gay and has, unbeknownst to his parents, been recounting the details of his first homosexual experimentation. The fact that this narrative segment was always available to select by the media content consumer, but was not selected since unbeknownst to the media content consumer it was negatively primed, may cause the media content consumer to consider how their interpretation and reaction to the son's anecdotes might have been different had they selected the negatively primed narrative segment which revealed the hidden subtext of the son's sexuality at the outset.

In some instances, certain narrative segment selection icons may be negatively primed to inhibit their selection by placing them over areas of the screen previously occupied by a visually distracting stimulus. For example, in the last scene of a narrative segment before a selection screen, a character may be standing in front of traffic giving a dramatic performance that demands the media content consumer's focused attention. The media content consumer naturally focuses attention on the character whilst subconsciously ignoring the distracting background action. In the immediately subsequent narrative segment selection screen, narrative segments appearing in the area previously occupied by the background distraction are significantly less likely to be selected. Negative (inhibitory) priming can be used in combination with positive priming to optimally direct viewers' narrative segment selections.

Referring now to FIG. 13, the media content consumer 130 (FIG. 1) receives a narrative 1300 as a series of narrative segments 1302A-F. Narrative segment 1302A represents the beginning or foundational narrative segment and narrative segments 1302B-F represent temporally later narrative segments. It is the particular sequence of narrative segments 1302 selected by the media content consumer 130 that determines the details and sub-plots (within the context of the overall story and plotline of the narrative 1300) experienced or perceived by the particular media content consumer.

In FIG. 13, the beginning or foundational narrative segment 1302A includes two characters, "CHAR A" and "CHAR C." At the conclusion of narrative segment 1302A, the media content consumer 130 is presented with a prompt 1304A including icons representative of a subset of available narrative segments. The subset of narrative segments associated with prompt 1304A may, for example, include a first narrative segment 1302B that is associated with CHAR A and a second narrative segment 1302C that is associated with CHAR C. The media content consumer 130 selects an icon to continue the narrative presentation. If the media content consumer 130 selects the icon representative of the first narrative segment that is associated with CHAR A at option 1304A, the narrative segment 1302B containing characters CHAR A and CHAR E is presented to the media content consumer 130.

At the conclusion of narrative segment 1302B, the media content consumer 130 is presented with a prompt 1304B including icons representative of a subset of available narrative segments. The subset of narrative segments associated with prompt 1304B may, for example, include a first narrative segment 1302D that is associated with CHAR A and a second narrative segment 1302E that is associated with CHAR E.

If at the option 1304A the media content consumer instead selects the icon representative of the second narrative segment 1302C that is associated with CHAR C, the narrative segment 1302C containing characters CHAR C and CHAR E is presented to the media content consumer 130.

At the conclusion of narrative segment 1302C, the media content consumer 130 is presented with a prompt 1304C including icons representative of a subset of available narrative segments. The subset of narrative segments associated with prompt 1304C may, for example, include the narrative segment 1302E that is associated with CHAR E and a narrative segment 1302F that is associated with CHAR C. As shown, in this example the media content consumer 130 may be able to select narrative segment 1302E that includes CHAR E at both option 1304B and option 1304C.

During the presentation of the narrative segment 1302A, a priming stimulus P-STIM1.0 is provided. The priming stimulus P-STIM1.0 may include, for example, a sound, a musical segment, a shape, image, video, color, spoken or written words, device vibrations, subliminal images or sequences, or one or more combinations thereof. The priming stimulus P-STIM1.0 may be achieved by subliminal priming, for example, visual, verbal and/or audio cues embedded into the narrative segment 1302A which prime the media content consumer to select a particular narrative segment for subsequent viewing.

During the presentation of the narrative segments 1302B and 1302C, priming stimuli P-STIM1.1 and P-STIM1.2, respectively, are provided. The priming stimuli P-STIM1.1 and P-STIM1.2 are associated with the priming stimulus P-STIM1.0 provided during presentation of the narrative segment 1302A. For example, the priming stimuli P-STIM1.1 and P-STIM1.2 may be the same as the priming stimulus P-STIM1.0. As another example, the priming stimuli P-STIM1.1 and P-STIM1.2 may be different from each other and/or different from the priming stimulus P-STIM1.0 but may be of the same sensory modality as each other. As another example, the priming stimuli P-STIM1.1 and P-STIM1.2 may be of a different sensory modality than the priming stimulus P-STIM1.0 (e.g., verbal and audible, visual and haptic).

Exposure by the media content consumer 130 to the priming stimuli P-STIM1.0, P-STIM1.1 and P-STIM1.2 may be used to influence selection of a narrative segment upon presentation of the prompt 1304B and 1304C by providing a target stimulus T-STIM1 during presentation of each of the prompts. The target stimulus T-STIM1 may include a sound, a musical segment, a shape, image, video, color, spoken or written words, device vibrations, subliminal images or sequences, or one or more combinations thereof.

In the illustrated example, the target stimulus T-STIM1 may be provided in a manner which positively influences a media content consumer's selection of the narrative segment 1302E, such that the media content consumer is likely to select the narrative segment 1302E over the narrative segment 1302D at the prompt 1304B and over the narrative segment 1302F at the narrative prompt 1304C. As another example, the target stimulus T-STIM1 may be provided in a manner which negatively influences a media content consumer's selection of the narrative segment 1302D at the prompt 1304B, such that the media content consumer is again likely to select narrative segment 1302E over narrative segment 1302D. As noted above, the strength of the biasing effect may depend on the particular implementation of the priming stimuli P-STIM1.0, P-STIM1.1 and P-STIM1.2 and the target stimulus T-STIM1, as well as the media content consumer's susceptibility to be influenced by priming.

In the implementation illustrated in FIG. 13, multiple stimuli are used in combination to prime the selection of a narrative segment, such as narrative segment 1302E. Moreover, the media content consumer is exposed to priming stimuli over multiple narrative segments (e.g., narrative segments 1302A and 1302B, narrative segments 1302A and 1302C), which may increase the priming effect on the media content consumer during subsequent presentation of a prompt (e.g., prompt 1304B, prompt 1304C) that includes the target stimulus (e.g., T-STIM1).

Priming may be used to redirect or "steer" a media content consumer in one or more particular directions of the narrative 1300. For example, in the narrative presentation 1300, the user may be "steered" toward the narrative segment 1302E by the target stimulus T-STIM1, regardless of which narrative segment the media content consumer selected at the prompt 1304A. Thus, priming may be used to allow media content consumers to experience the narrative 1300 along two or more paths only to be redirected to a narrative segment deemed important by a content creator editor, such as a narrative segment that includes a crucial element of a plot of the narrative.

Referring now to FIG. 14, the media content consumer 130 (FIG. 1) receives a narrative 1400 as a series of narrative segments 1402A-C. Narrative segment 1402A represents the beginning or foundational narrative segment and narrative segments 1402B-C represent temporally later narrative segments. It is the particular sequence of narrative segments 1402 selected by the media content consumer 130 that determines the details and sub-plots (within the context of the overall story and plotline of the narrative 1400) experienced or perceived by the particular media content consumer.

In FIG. 14, the narrative segment 1402A includes two characters, "CHAR A" and "CHAR B." During the presentation of the narrative segment 1402A, a priming stimulus P-STIM1 is provided. The priming stimulus P-STIM1 may include, for example, a sound, a musical segment, a shape, image, video, color, spoken or written words, device vibrations, subliminal images or sequences, or one or more combinations thereof. The priming stimulus P-STIM1 may be achieved by subliminal priming, for example, visual, verbal and/or audio cues embedded into the narrative segment 1402A which prime the media content consumer to select a particular narrative segment for subsequent viewing.

At the conclusion of narrative segment 1402A, the media content consumer 130 is presented with prompts 1404A and 1404B provided repeatedly in succession. For example, the prompt 1404A may include an icon representative of the narrative segment 1402C that includes CHAR A and the prompt 1404B may include an icon representative of the narrative segment 1402B that includes CHAR C.

Exposure by the media content consumer 130 to the priming stimulus P-STIM1 during presentation of the narrative segment 1402A may be used to influence selection of a narrative segment upon presentation of the prompt 1404A by providing a target stimulus T-STIM1 during presentation of the prompt. The target stimulus T-STIM1 may include a sound, a musical segment, a shape, image, video, color, spoken or written words, device vibrations, subliminal images or sequences, or one or more combinations thereof.

As an example, the narrative segment 1402A may include the priming stimulus P-STIM1 in the form of a "musical segment" signifying intrigue that is played at an intriguing moment during the narrative segment. At the conclusion of the narrative segment 1402A, narrative segment selection icons or prompts may be presented one after another in sequence on a subsequent narrative segment selection screen while a musical score plays. The "musical segment" that signifies intrigue may be integrated into the musical score and may begin playing at the moment the icon for the target narrative segment appears. The musical score may then repeat, highlighting each of the narrative segment icons in turn with the intriguing musical segment playing only when the target narrative segment is presented. Thus, the media content consumer may be more likely to select the target narrative segment since its icon is presented with the primed intriguing musical segment.

Figure 15A:
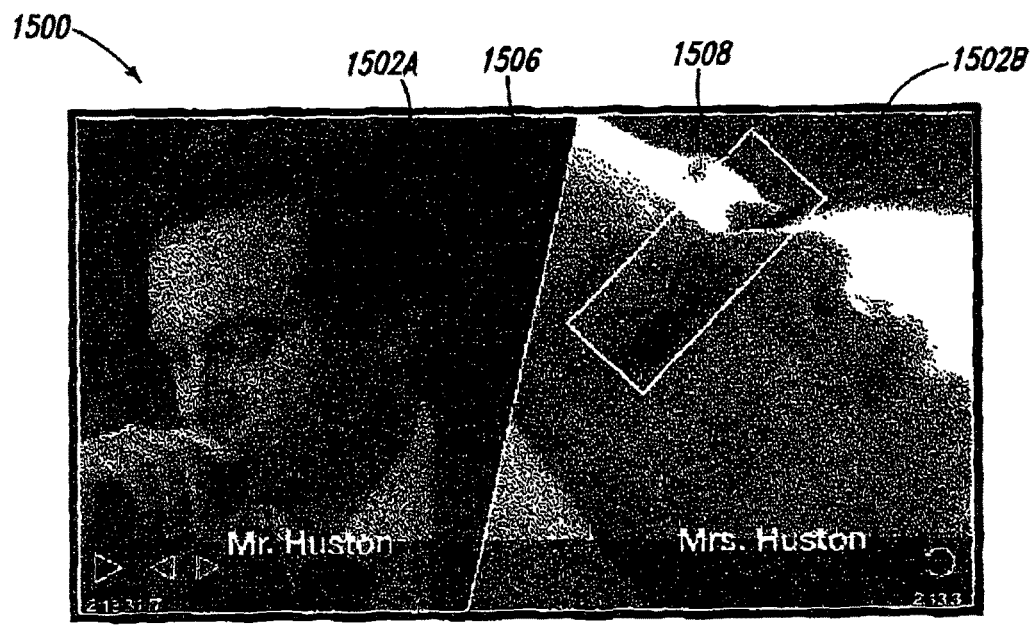
FIG. 15A is a screen capture of an illustrative prompt that includes two media content consumer selectable icons with which a media content consumer can provide an input to the content delivery system indicating a desired narrative segments, according to one illustrated embodiment.
Figure 15B:
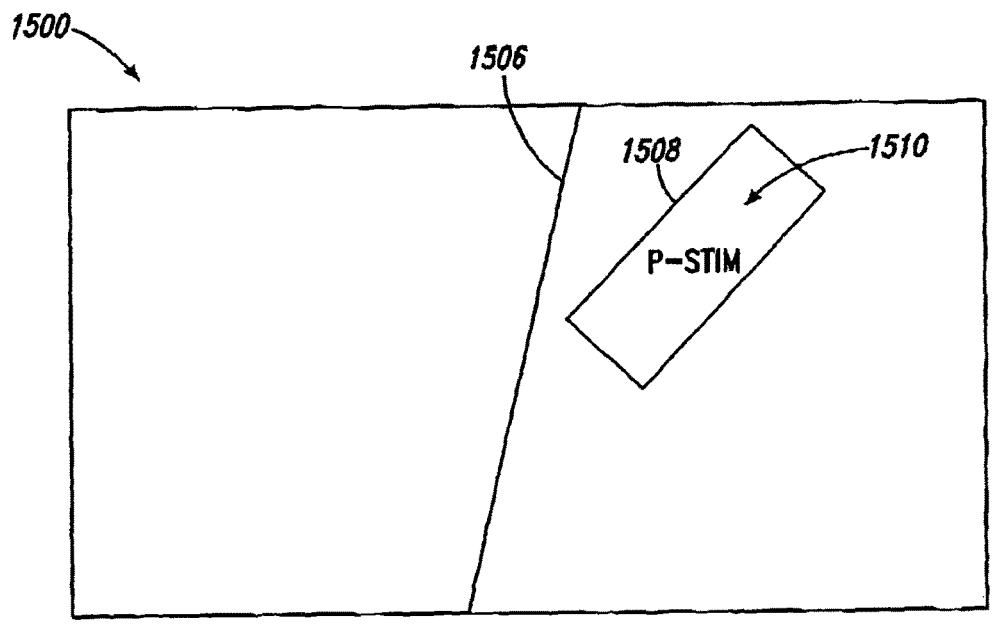
FIG. 15B is a screen capture of a priming stimulus presented to a media content consumer at a location on a display at which one of the two media content consumer selectable icons of FIG. 15A are positioned, according to one illustrated embodiment.

FIGS. 15A and 15B illustrate an implementation in which a subliminal image is used as a target stimulus to influence a media content consumer's selection of a narrative segment during presentation of a narrative. FIG. 15A shows a screen capture of an illustrative prompt screen or prompt 1500. The prompt 1500 shown in FIG. 15A includes two selectable icons 1502A, 1502B (collectively "icons 1502"). The first icon 1502A is labeled "MR. HUSTON" and the second icon 1502B is labeled "MRS. HUSTON." In FIG. 15A, a diagonal separator 1506 separates the first icon 1502A from the second icon 1502B. Although FIG. 15A shows only two icons 1502A, 1502B, any number of icons 1502 may be included in a single prompt 1500. For example, three, four, five or even more icons 1502 may be included in a single prompt 1500. The number of icons 1502 and the number, type, and style of the separator 1506 is selectable by the production team or the editing team via the content editing system processor-based device 122 (FIG. 1).

The icon 1502B depicts an image of Mrs. Huston, who is one of the characters in a narrative. An area 1508 of the icon 1502B proximate Mrs. Houston's eyes may be an area on which media content consumers are likely to focus their attention.

As shown in FIG. 15B, during presentation of the prompt screen 1500 a target stimulus 1510 may be briefly displayed in the area 1508, which is the area likely to be focused on by the media content consumer. For example, the target stimulus 1510 may be displayed for less than 500 ms, less than 200 ms, less than 50 ms, etc. The target stimulus 1510 may be associated with a priming stimulus that was previously provided to the media content consumer during one or more earlier presented narrative segments. The target stimulus 1510 may also be an independent stimulus that influences a media content consumer's selection decision. As an example, the target stimulus 1510 may be a textual clue that reads "SELECT MRS. HUSTON," or "WOMAN."

Figure 16A:
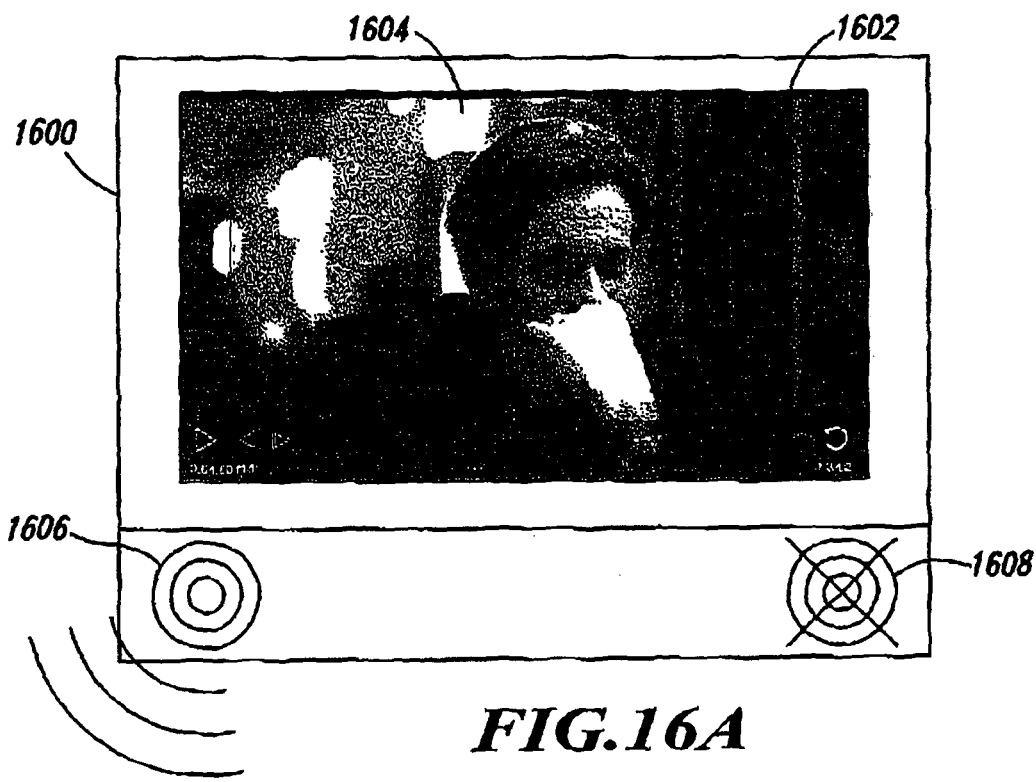
FIG. 16A is a diagram of a media content consumer processor-based device displaying an illustrative narrative segment while simultaneously producing an audible priming stimulus, according to one illustrated embodiment.
Figure 16B:
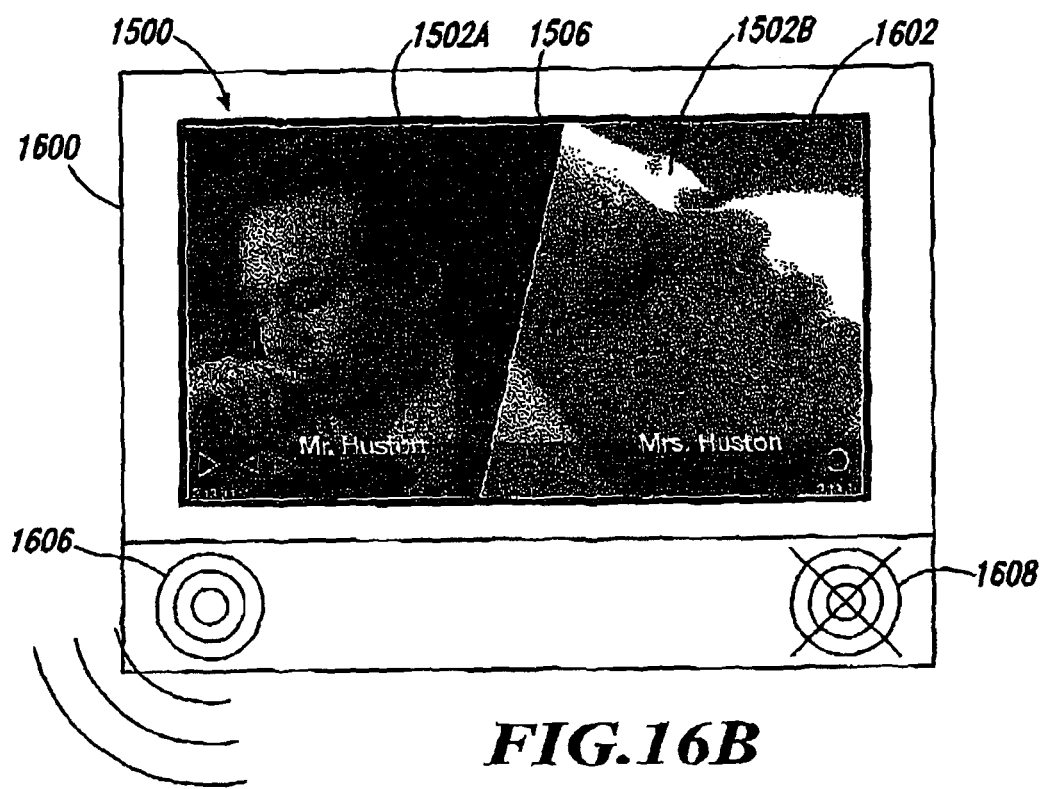
FIG. 16B is a diagram of a media content consumer processor-based device displaying an illustrative prompt that includes two media content consumer selectable icons with which a media content consumer can provide an input to the content delivery system indicating a desired narrative segment while simultaneously producing an audible target stimulus, according to one illustrated embodiment.

FIGS. 16A and 16B illustrate an implementation in which audio priming and target stimuli are used to influence a media content consumer's selection of a narrative segment during presentation of a narrative. FIG. 16A shows a media content consumer processor-based device 1600 presenting a narrative segment on a display 1602 thereof. The portion of the narrative segment depicted in FIG. 16A shows an image 1604 of the character Mr. Huston. During the presentation of the narrative segment when Mr. Huston is shown, an audio signal, such as a musical segment, may be played on a left speaker 1606 of the media content consumer processor-based device while no sound is played from a right speaker 1608.

At the conclusion of the narrative segment shown in FIG. 16A, the prompt screen 1500 (FIG. 15) may be presented, as shown in FIG. 16B. The prompt screen 1500 includes a selectable icon 1502A depicting Mr. Huston on the left side of the display 1602 and a selectable icon 1502B depicting Mrs. Huston on the right side of the display. During presentation of the prompt screen 1500, the audio signal may again be played through the left speaker 1606 as a target stimulus that primes the selection of the icon 1502A on the left side of the display while no sound is played from the right speaker 1608. Different combinations of audible priming and target stimuli may be used to prime the media content consumer to select a target narrative segment.

In some implementations, the media content consumer processor-based device 1600 may have the capability to determine where on a screen a media content consumer's gaze is focused. In these instances, priming stimuli and or target stimuli may be strategically positioned so that the media content consumer is likely to view the stimuli or more likely to be influenced by the stimuli.

Figure 17:
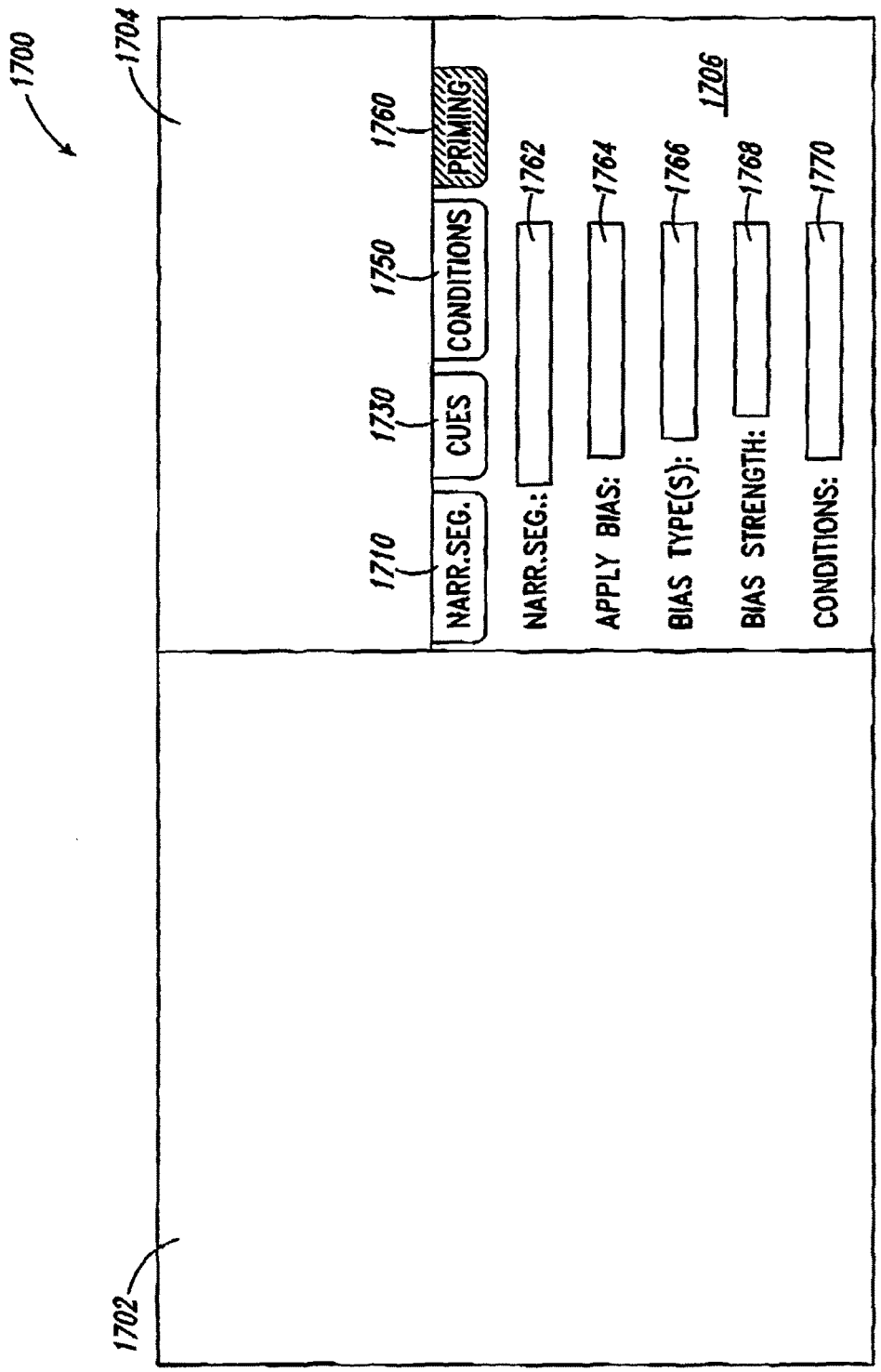
FIG. 17 is a screen capture of an illustrative content editing system editing screen and open PRIMING tab that provides a production or editing team with the ability to select and specify biasing conditions governing biasing conditions for one or more narrative segments of a narrative, according to one illustrated embodiment.

FIG. 17 is an example of an illustrative narrative creation editor user interface 1700 depicting a variety of editing options useful with narrative segments such as priming or target stimuli. The user interface 1700 is similar in some aspects to the user interface 1100 shown in FIGS. 11A-11C. Visible in the user interface 1700 is a first panel 1702 in which the narrative segments are presented to the editing user, a second panel 1704 in which the structure of the narrative is graphically displayed to the editing user via a tree-like structure, and a third panel 1706 in which various narrative segment (i.e., "video") editing options are displayed under the "NARR. SEG." (i.e., additional or bonus content) tab 1710 (see FIG. 11A), various narrative transition editing options are displayed under the "CUES" tab 1730 (see FIG. 11B), various narrative segment cue point editing options are displayed under the "CONDITIONS" tab 1750 (see FIG. 11C), and various priming options are displayed under the "PRIMING" tab 1760.

FIG. 17 shows the contents under the PRIMING tab 1760 of the third panel 1706. Under the PRIMING tab 1760, the third panel 1706 includes a NARR. SEG. field 1762 to select a narrative segment that is to be primed. The PRIMING tab 1760 also includes an APPLY BIAS field 1764 that allow the editor to select whether a bias is to be applied to a particular narrative segment. The PRIMING tab 1760 also includes a BIAS TYPE(S) field 1766, a BIAS STRENGTH field 1768, and a CONDITIONS field 1770. The PRIMING tab 1760 may include fewer or more fields or contents than those depicted in the example of FIG. 17. The fields may be in the form of text fields, buttons, drop down menus, etc. Using the various contents under the PRIMING tab 1760, a content creator or editor is able to implement the various priming functionality discussed herein.

Figure 18:
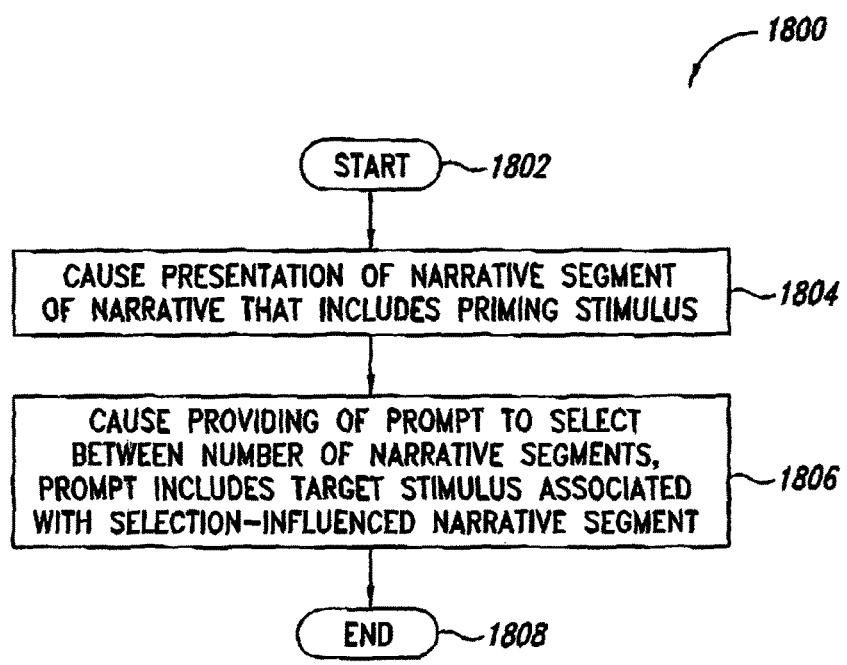
FIG. 18 is a logic flow diagram showing an illustrative method of presenting a narrative presentation to a media content consumer by a content delivery system, the narrative presentation comprising a series of user-selected narrative segments, selection of at least some of the segments are biased by at least one priming stimulus and at least one target stimulus, according to one illustrated embodiment.

FIG. 18 shows a method 1800 of presenting, via one or more content delivery platforms, a narrative that includes a number of media content consumer selectable narrative segments to a media content consumer. The content delivery system presents the media content consumer with such prompts at various defined points during the narrative selected by the production and/or editing teams. For example, such prompts may appear during the pendency of, or more typically at the conclusion of, at least some of the narrative segments. Such prompts may include a number of icons (e.g., two or more) each representative of a respective one of a plurality of narrative segments available or accessible to the particular media content consumer at that particular time or point in the narrative. Upon receipt of a selection input representative of one of the icons included in a prompt screen from the media content consumer, the selected narrative segment is provided by the content delivery system to the media content consumer.

The method 1800 of providing a narrative commences at 1802. At 1804, the content delivery system causes a presentation of a narrative segment of a narrative. For example, the content delivery system may cause a presentation of a video narrative segment of a video narrative on a screen of a media content consumer processor-based device (e.g., portable computer, smartphone, tablet computer, TV).

The content delivery system may cause a providing of one or more priming stimuli during the presentation of the narrative segment. As discussed above, the one or more priming stimuli may include one or more of an audible stimulus, a tactile stimulus (e.g., device vibration), or a visual stimulus, for example. The one or more priming stimuli may be part of the presented narrative segment.

In some implementations, the priming stimulus is a sub-threshold stimulus that is not consciously perceptible by the media content consumer. For example, the priming stimulus may be a visual image displayed for a brief duration (e.g., less than 500 ms) or an audible signal played for a short duration, played at a low volume, or played simultaneously with another audible signal (e.g., music).

Further, the one or more priming stimuli may be presented a single time during a single narrative segment, a single time during each of a plurality of narrative segments, multiple times during a single narrative segment, or multiple times during a plurality of narrative segments. The one or more priming stimuli may include stimuli of one or more sensory modalities (e.g., visual and audible).

At 1806, the content delivery system may cause a providing of a prompt to the media content consumer. The prompt may include a number of selectable icons (e.g., two or more) each representative of a respective one of a plurality of narrative segments available or accessible to the particular media content consumer at that particular time or point in the narrative.

The content delivery system may cause a providing of a target stimulus associated with a determined selection-influenced narrative segment during the providing of the prompt. The target stimulus may be the same stimulus (e.g., same word or same sound) as the priming stimulus or may be different therefrom, so long as exposure by the media content consumer to the priming stimulus influences selection of the selection-influenced narrative segment associated with the target stimulus. For example, in some implementations the target stimulus may increase or decrease a likelihood that the media content consumer will select a selection-influenced narrative segment associated with the target stimulus. As noted above, the target stimulus may be of the same sensory modality as the priming stimulus, or may be of a different sensory modality.

At 1808, the method 1800 ends until invoked again. For example, the method 1800 may be invoked each time a content creator or editor specifies that selection of a particular narrative segment should be influenced by the content delivery system by priming.

Figure 19:
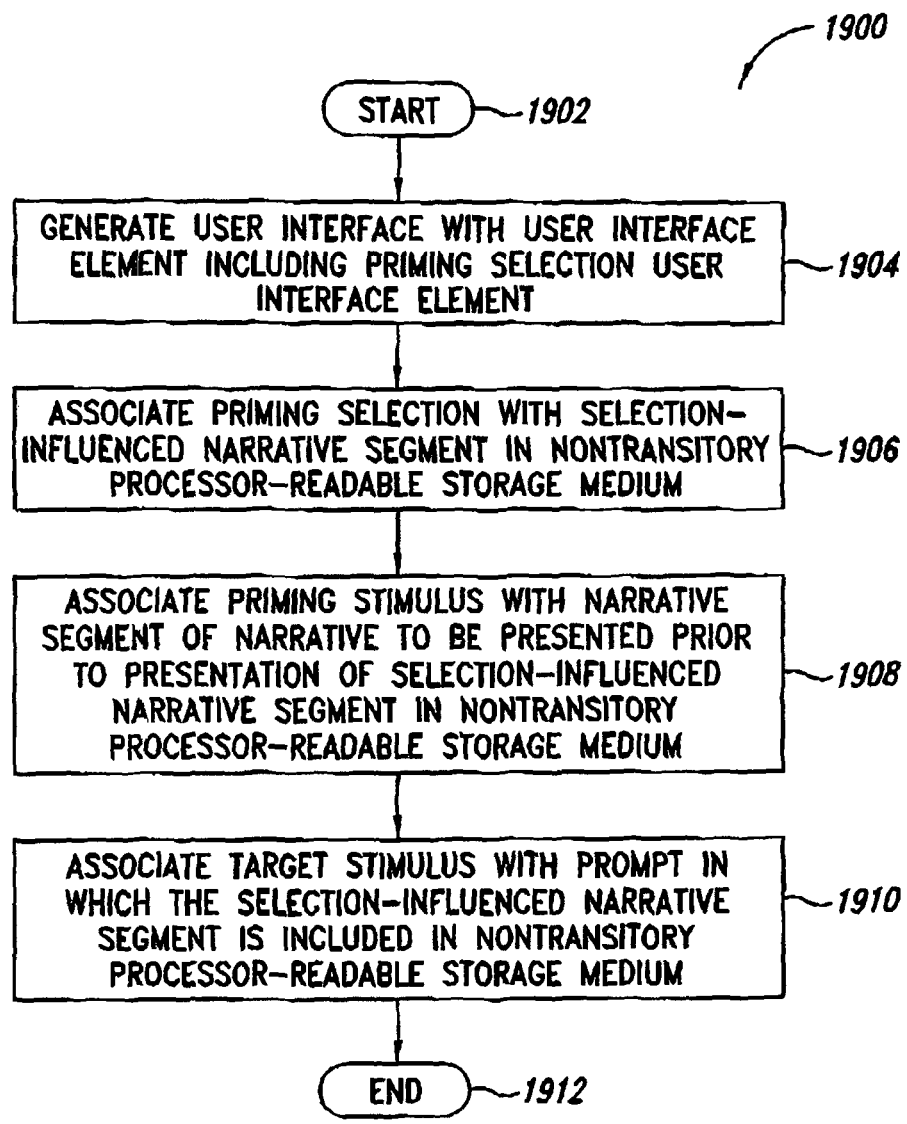
FIG. 19 is a logic flow diagram showing an illustrative method of creating or editing a narrative for presentation to a media content consumer by a content delivery system, the narrative presentation comprising a series of selection-influenced user-selected narrative segments, according to one illustrated embodiment.

FIG. 19 shows a method 1900 of operating a content editing system to create a narrative that includes a number of narrative segments and a number of prompts at which the media content consumer can select an icon corresponding to a particular narrative segment to continue the narrative 164. Raw content generated by content creators may be provided to the content editing system where the production team and/or the editing team edit and assemble the raw content into a number of narrative segments for inclusion in a narrative. The production team and/or editing team assembles the narrative segments into a narrative that includes a number of prompts, each located, placed, or positioned at a defined location in the narrative. Each prompt includes at least two icons. Each icon included in a prompt corresponds to a particular narrative segment included in the narrative.

At times, the editing team defines at least some of the icons included in some or all of the number of prompts. At other times, the content delivery system providing the narrative to the media content consumer pseudo-randomly selects at least some of the icons included in some or all of the number of prompts. In some implementations, one or more algorithms, conditional expressions, or Boolean conditions may be used to select or deselect at least a portion of the icons included in one or more prompts. At times, the content provider system pseudo-randomly selects the narrative segments included in the prompt from a larger subset of narrative segments that is smaller than the total set of narrative segments of the narrative.

The method 1900 of operating a content editing system to create a narrative that includes a number of narrative segments and a number of prompts commences at 1902.

At 1904, the content editing system generates a user interface that includes a user interface element including a bias selection user interface element with which the production team or editing team can select one or more narrative segments that are to be positively or negatively biased by priming. Such narrative segments may be referred to as selection-influenced narrative segments. At 1906, the content editing system associates a bias selection with a selection-influenced narrative segment in a nontransitory processor-readable storage medium operatively coupled to the content editing system.

At 1908, the content editing system logically associates one or more priming stimuli with one or more narrative segments that are to be presented to a media content consumer prior to presentation of the selection-influenced narrative segment in a nontransitory processor-readable storage medium operatively coupled to the content editing system. At 1910, the content editing system logically associates a target stimulus with an icon associated with the selection-influenced narrative segment that is to be displayed in a prompt that includes two or more icons associated with two or more respective narrative segments.

At 1912, the method 1900 ends until invoked again. For example, the method 1900 may be invoked each time a content creator or editor operates the content editing system to cause selection of a narrative segment to be influenced by priming using the functionality disclosed herein.

Figure 20:
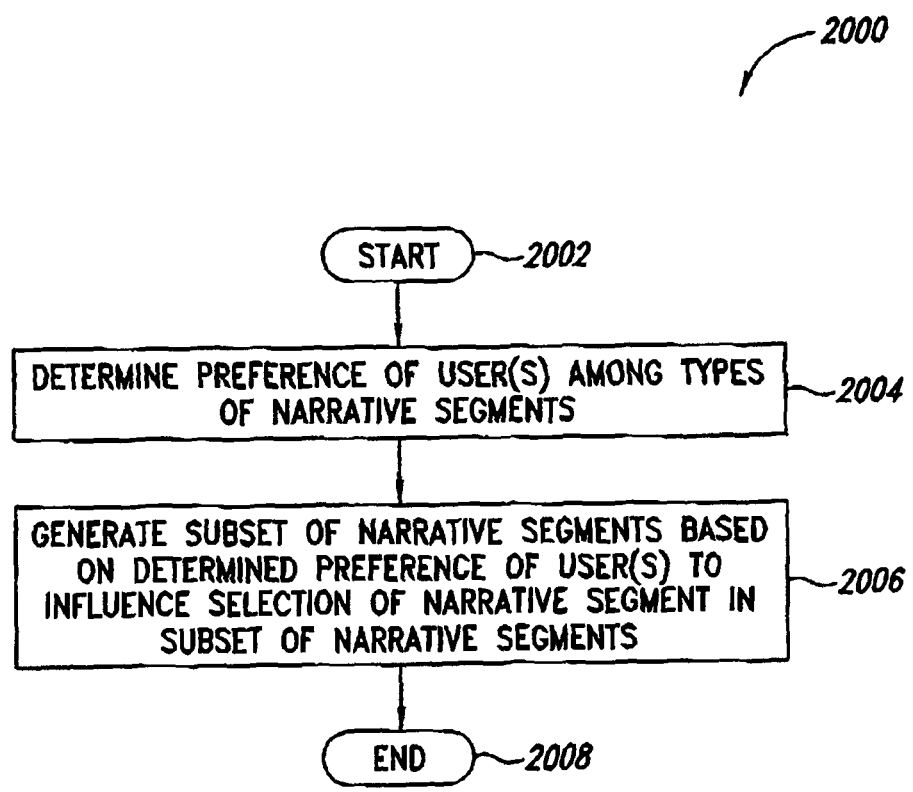
FIG. 20 is a logic flow diagram showing an illustrative method of creating or editing a narrative for presentation to a media content consumer by a content delivery system, the narrative presentation comprising a series of selection-influenced user-selected narrative segments grouped into subsets of narrative segments based at least in part on one or more determined preferences of one or more users, according to one illustrated embodiment.
Figure 21:
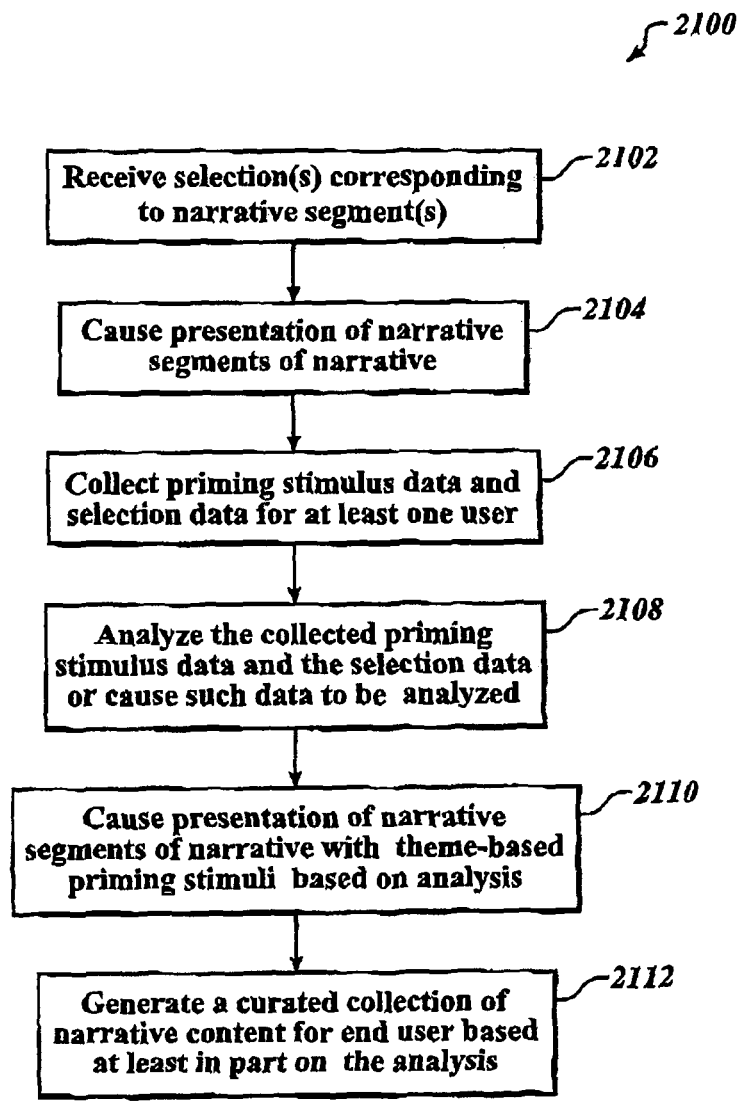
FIG. 21 is a logic flow diagram showing an illustrative method of operation in a content delivery platform, according to one illustrated embodiment, that employs priming stimulus, analysis and generation of a curated collection of narrative content.

FIG. 20 shows a method 2000 of operating a content delivery system and/or content editing system that utilizes data collection and machine learning to provide improved priming effects for influencing selection of one or more narrative segments in a narrative. The method 2000 begins at 2002.

At 2004 the content delivery system determines one or more preferences of one or more media content consumers among one or more types of narrative segments and/or one or more types of stimuli. For example, the content delivery system may determine which stimuli a particular media content consumer or group of media content consumers are most responsive to and subsequently provide such stimuli to the media content consumer or group of media content consumers to improve the effectiveness of the priming functionality. In some instances, the group of media content consumers may be demographically based, such as a demographic based on one or more of age, gender, geographical location, income, or any other information that may be useful to determine which stimuli a particular demographic may be most responsive and/or which narrative segments are most likely to be selected.

At 2006, the content delivery system may generate a subset of narrative segments in a narrative based at least in part on the determined one or more preferences of the one or more users. For example, the narrative delivery system may determine that a media content consumer is likely to select a particular narrative segment when grouped in a subset with certain other narrative segments based on the consumer's previous selections or based on other information obtained about the media content consumer or a group of media content consumers.

In some instances, the data used to determine one or more preferences of the media content consumer includes information obtained by analysis by analytical engines of one or more aspects of the media content consumer's impressions, experiences, or narrative segment sequence through the narrative. Such analytical engines may be used, for example, to analyze and establish trends based on the narrative segment sequence of the narrative. For example, analytics may determine that media content consumers following at least a portion of a particular narrative segment sequence have an overall more favorable impression of the narrative. Such data may be useful for selecting which narrative segments should be selected for priming. Such data may be also useful for establishing statistical relationships between narrative segment sequences or stimuli and one or more demographic factors associated with media content consumers (e.g., male consumers 35-49 prefer a first narrative segment sequence or respond best to a first stimulus while female consumers 20-29 prefer a second narrative segment sequence or respond best to a second stimulus).

As such, the each prompt represents a dynamic, changeable, entity, the content of which (i.e., the narrative segment icons) can be situationally altered based at least in part on conditions or logic provided by the production or editing teams as well as the prior selections made by the media content consumer (or other consumers) during the instant narrative segment (or other narrative segments). The prompts thus advantageously provide the production or editing teams with full artistic control of the narrative segments made available to the media content consumer.

The content delivery or editing system may also utilize various other biasing effects to influence a media content consumer's selection of one or more narrative segments. For example, in some implementations the content delivery system may pre-select and highlight one narrative segment option as a default on a narrative segment selection screen. Studies show that, especially in situations of ambiguity and uncertainty, most users will select what appears to be the pre-selected default option.

As another example, the content delivery system may cause "view counts" to be displayed below each narrative segment selection button showing how many viewers have watched it. Most people will automatically select the option that has the maximum number of views. Alternatively, the content delivery system may cause a display of percentages showing how many viewers chose each clip as their $1^{st}$ option, $2^{nd}$ option, $3^{rd}$ option, etc. The content delivery system may cause a display of this information in an immediately visually apparent color-coded bar chart for ease of recognition and subsequent viewer action.

The content delivery system may also influence selection by utilizing central placement and inclusion of character faces. When a new selection screen appears the media content consumer's eyes are immediately drawn to the center of the screen and then subsequently to any images featuring faces (or which have visual features congruent with faces). A centrally placed button featuring an image of a face is most readily selected.

The content delivery system may also influence selection by biasing cognitive effort. For example, the content delivery system may make some narrative segment selection option images clearer or easier to recognize or comprehend than others, or may make some narrative segment titles easier to read or comprehend than others. Users will generally recognize and thereafter select choices that require less cognitive effort.

The content delivery system may also utilize homogeneity and distinction to influence selections. For example, the content delivery system may make all the options except one similar in appearance or subject matter. Users are most likely to select the most distinct option.

The content delivery system may also utilize images of different attractiveness to influence selection. For example, images which appear to imply more sexually titillating content may be selected more often.

FIG. 2100 shows a method 2100 of operation in a content delivery platform, according to at least one illustrated embodiment. The content delivery platform may comprise at least one processor having at least one nontransitory processor-readable medium communicatively coupled to the processor and which stores at least one of processor-executable instructions or data.

The content delivery system may present or cause a presentation of a plurality of narratives for each of a plurality of end users. The narratives are comprised of a set of narrative segments. At least two of the narrative segments of each of the narratives having a distinct temporal order within a time sequence of events of the respective narrative.

For each presentation of each of a plurality of narratives for one of the end uses, the content delivery system performs the following algorithm, which includes providing priming stimuli to subtly influence the end user's successive choices or selections in establish a respective path through the narrative.

At 2102, at least one processor-based component may receive a selection that identifies one or more of a plurality of narrative segments that comprise a respective narrative for presentation to the end user. The selection may indicate a narrative segment of a subset of all of the narrative segments the comprise the narrative. The selections may be received by way of a user interface, for instance a graphical user interface. Priming stimuli be based at least in part on the collected selection data for the at least one user.

At 2104, the at least one processor causes a presentation of narrative segments of the respective narrative. The narrative segments may be presented in response to the end user selections, which define a path through the narrative. As discussed elsewhere herein, the presentation may include providing or incorporating priming stimulus to subtly affect succeeding end user selections or choices. As explained elsewhere herein, user exposure to a plurality of priming stimuli influences selection of the at least one selection-influenced narrative segment.

At 2106, the at least one processor-based component may collect priming stimulus data and selection data for at least one user. Such may include information or meta data which indicates what type of stimulus the end user is most or least affected by and/or what themes the end user finds interesting.

At 2108, the at least one processor-based component may analyze the collected priming stimulus data and the selection data or cause such data to be analyzed. For example, the at least one processor may analyze, or cause to be analyzed, the collected priming stimulus data and the selection data for a single user to determine to which priming stimuli the single user is most responsive. Also for example, the at least one processor may analyze, or cause to be analyzed, the collected priming stimulus data and the selection data for a group of users to determine to which priming stimuli the group of users are most responsive. As a further example, the at least one processor may analyze, or cause to be analyzed, the collected priming stimulus data and the selection data for a group of users in an identified demographic.

At 2110, the at least one processor-based component may cause a presentation of a selected narrative segment while providing or including a corresponding priming stimuli, for example theme-based priming stimuli (e.g., suspense, intrigue, injustice, romance, betrayal, or death). End user exposure to priming stimuli stimulates the user's interest in a determined theme. Thus, causing a providing of a priming stimulus may comprise causing a providing of a priming stimulus based at least in part on the analyzed priming stimulus data and the selection data.

At 2112, the at least one processor may further generate a curated collection of narrative content for the at least one user based at least in part on the analysis. For example, the at least one processor may determine that the end user in interested in particular type of themes, and generates a list of other narratives with the same, similar or complementary themes.

Figure 22A:
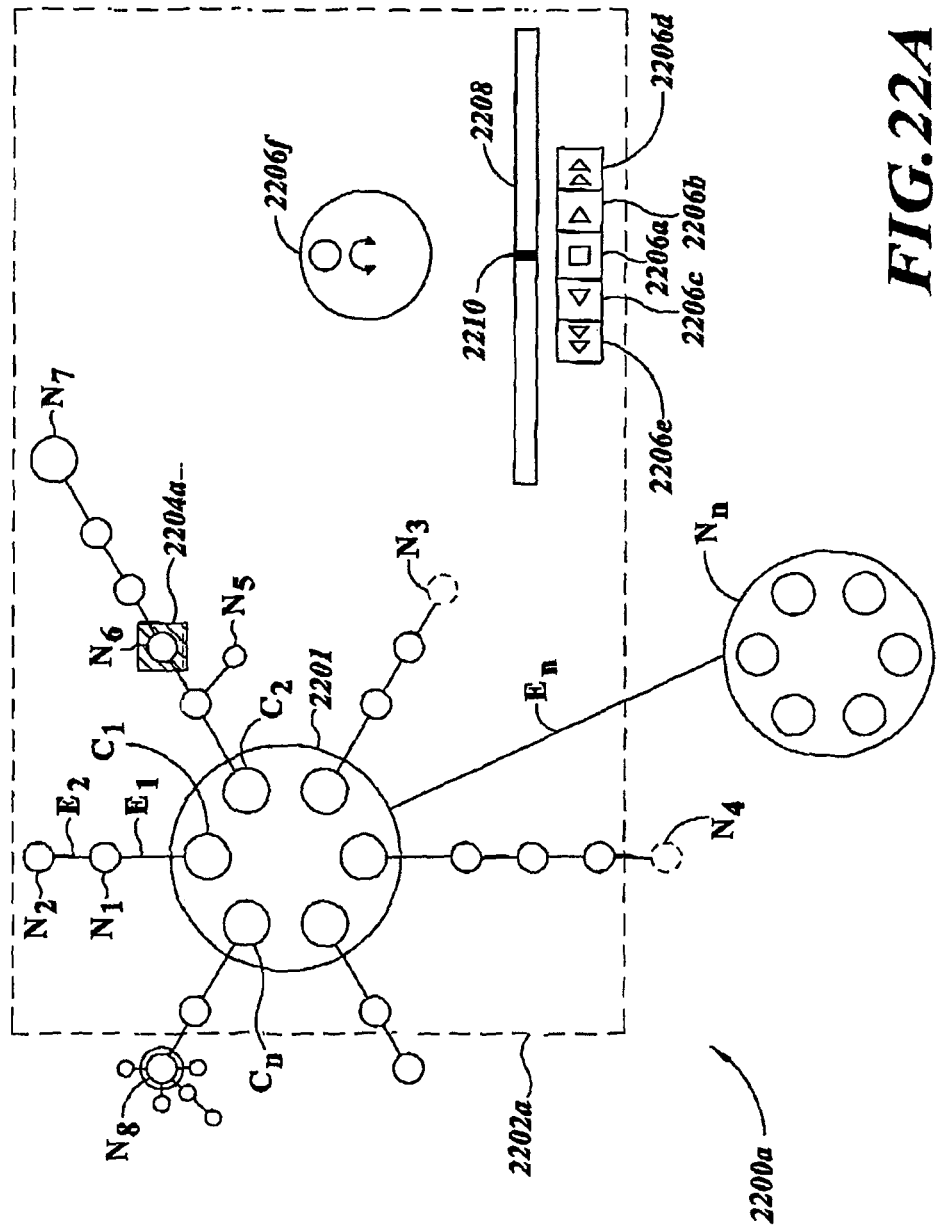
FIG. 22A is schematic diagram of a user interface at a first time, according to one illustrated embodiment.
Figure 22B:
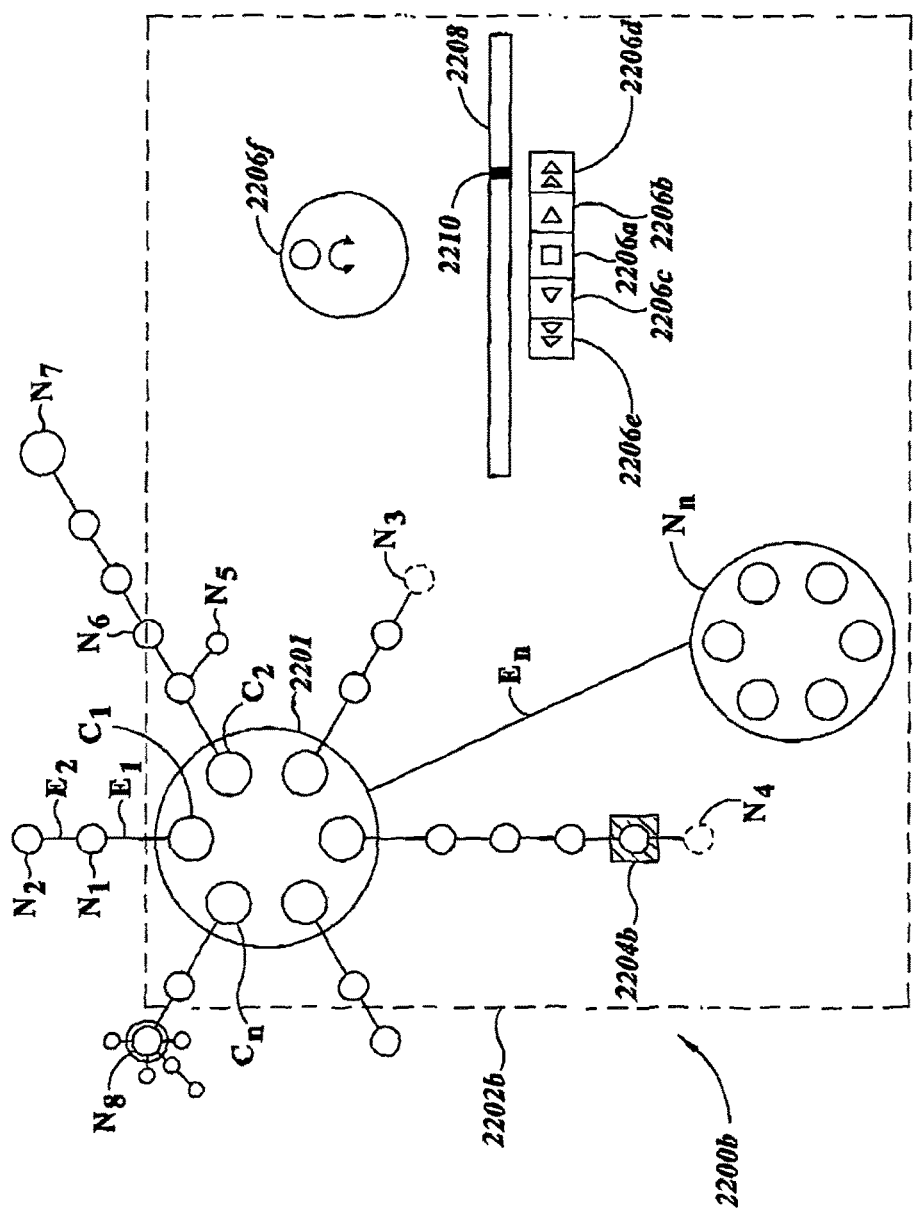
FIG. 22B is schematic diagram of a user interface at a second time, different from the first time, according to one illustrated embodiment.

FIGS. 22A and 22B show a representation of a user interface in the form of a graphical dynamic path map 2200a at a first time and an updated graphical dynamic path map 2200b at a second time, according to at least one illustrated embodiment. The graphical dynamic path map 2200a and updated graphical dynamic path map 2200b are produced by, and dynamically updated by, the content delivery platform. Identical or similar structures in the graphical dynamic path map 2200a and updated graphical dynamic path map 2200b are denominated with the same reference numbers, and discussion of such structures is not repeated in the interest of conciseness.

As previously described, a narrative, for instance a first narrative may be comprised by a plurality of narrative segments. Each of a plurality of end users may traverse at least part of the narrative in an end user selected or defined order. Thus, a first end user may take a first path through a first narrative, while a second end user may take a second path through the first narrative, the second path differing from the first path. The second path may, for instance, include the same narrative segments as the first path, but may traverse those narrative segments in a different sequence than the sequence of the first path. Alternatively, second path may, for instance, include one or more narrative segments not included in the first path and/or may omit one or more narrative segments included in the first path. An end user's perception of a story or narrative may depend on the particular path the end user takes through the narrative, revealing certain back stories or facts that might otherwise not be revealed, or simply experiencing the story presentation in a different order than experienced by another end user.

The graphical dynamic path map $2200a$ and updated graphical dynamic path map $2200b$ may be represented visually and/or logically (i.e., in processor logic or in nontransitory storage medium or database) as a graph of a plurality of nodes $N_1$-$N_n$ (only $N_1$, $N_2$, $N_3$, $N_4$, $N_5$, $N_6$, $N_7$, $N_8$, $N_n$ called out) a plurality of edges $E_1$-$E_n$ (only $E_1$, $E_2$, $E_n$, called out). Each edge $E_1$-$E_n$ is associated with a respective pair of the nodes $N_1$-$N_n$. The nodes $N_1$-$N_n$ represent respective ones of the narrative segments that comprise the first narrative. The edges $E_1$-$E_n$ represent a path segment that corresponds to a sequential presentation or viewing of a second one of the narrative segments in the respective pair following a presentation or viewing of a first one of the narrative segments in the respective pair. Some or all of the edges $E_1$-$E_n$ may represent an actual path or actual path segment between narrative segments, perhaps an actual end user selected path that the end user has taken through the narrative or portion thereof. Some or all of the edges $E_1$-$E_n$ may represent an available path or available path segment between narrative segments, perhaps an path that is available for selection by the end user has taken through the narrative or portion thereof. These available paths may, for instance, be in addition to at least a portion of the actual path taken by the first end user through the plurality of narrative segments that comprise the first narrative. Visual effects (e.g., color, highlighting, dash versus solid, flashing) may be used to distinguish between actual path segments and available, but previously untraversed path segments.

One, more of all of the nodes $N_1$-$N_n$ can be presented as user selectable icons. Selection of a node $N_1$-$N_n$ can cause the narrative segment corresponding to the respective node to be presented, or alternatively queued for presentation. Subsequent selections of nodes $N_1$-$N_n$ may cause the graphical dynamic path map $2200a$ and/or updated graphical dynamic path map $2200b$ to be updated to add or spawn new edges $E_1$-$E_n$ representing the selections or sequences of transition between the narrative segments corresponding to the respective nodes $N_1$-$N_n$. Selection of one or more nodes $N_1$-$N_n$ may cause the graphical dynamic path map $2200a$ and/or updated graphical dynamic path map $2200b$ to be updated to add or spawn new nodes $N_3$, $N_4$. Additionally or alternatively, completion of a narrative or a portion of a narrative (e.g., one character's story or point of view) may cause the graphical dynamic path map $2200a$ and/or updated graphical dynamic path map $2200b$ to be updated to add or spawn one or more new nodes $N_4$. The new node $N_4$ may for, example, provide a takeoff for an entirely new narrative, for example a narrative that spin off based on the future or past experiences of one of the characters. In such implementations, the new node $N_4$ may, for example, constitute a core structure, with a set of character nodes (represented by smaller circles or nodes in larger circle or node $N_4$) corresponding to characters of the new narrative or spin off. Those characters may include one or more characters of the previous narrative and/or new characters that did not appear in the previous narrative.

One or more of the new nodes $N_4$, $N_n$ may correspond to nodes $N_1$-$N_n$ that extended out on the graph beyond a current view or frame $2202a$ of the graphical dynamic path map $2200a$ and/or current view or frame $2202b$ of updated graphical dynamic path map $2200b$ being presented to the end user. In this respect, it is noted that for any particular narrative, the graphical dynamic path map $2200a$ and/or updated graphical dynamic path map $2200b$ of all available narrative segments and corresponding nodes $N_1$-$N_n$, and all available segment paths and corresponding edges $E_1$-$E_n$ may be quite extensive. In such situations, all a portion, even only a relatively small portion, may be presented to the end user at any given time, in order to the information contained in the graphical dynamic path map $2200a$ and/or updated graphical dynamic path map $2200b$ to be legible or understandable by the end user.

Alternatively, one or more new nodes $N_8$ may be nested or represented in a starburst pattern, for example, representing lower levels of details or "drill down" into a particular portion of a story line, back story or character. Again, limitations of available screen size and resolution may cause only a portion of the graphical dynamic path map $2200a$ and/or updated graphical dynamic path map $2200b$ to be presented at any given time.

One, more of all of the edges $E_1$-$E_n$ can be presented as user selectable icons. Selection of an edge $E_1$-$E_n$ can cause the corresponding path associated with the edge $E_1$-$E_n$ to be executed or queued for execution. In some implementations, edges $E_1$-$E_n$ may be dragged, for example one end of an edge $E_1$-$E_n$ dragged between two different nodes $B_1$-$N_n$ to change an order of presentation of the corresponding narrative segments.

The graphical dynamic path map $2200a$ and/or updated graphical dynamic path map $2200b$ may include a core element $2201$, which itself includes a character node $C_1$, $C_2$, . . . $C_n$ (only three called out), which correspond or represent respective characters in the narrative. Each character node $C_1$,-$C_n$ may include a label or indication of the character that the respective character node $C_1$,-$C_n$ represents. For example, each character node $C_1$,-$C_n$ may include a name of the corresponding character and/or a picture or illustration of the corresponding character. Edges $E_1$ that extend from the character node $C_1$,-$C_n$ may represent narrative segments in which the respective character appears, for example outlining a backstory or character development related narrative segment.

While not illustrated as such, the graphical dynamic path map $2200a$ and/or updated graphical dynamic path map $2200b$ may be represented as a virtual three-dimensional object, for example a vortex or hyperbola that extends into the screen or display.

A scan head icon $2204$, $2204b$ may be present and responsive to as a scrubber tool or portion thereof $2206$. The scan head icon $2204a$, $2204b$ may, for example, represent a current position in a path through a narrative. In some implementations, the scan head icon 2204a, 2204b may take the form of an end user selectable scan head icon, selectable and/or manipulable by an end user. Alternatively, the scan head icon 2204a, 2204b is response to selection or manipulation of a scrubber tool 2206b. The scrubber tool 2206 may, for example take the form of one or more user selectable icons, for instance a stop icon 2206a, a forward icon 2206b, a reverse or rewind icon 2206c, a fast forward icon 2206d and/or a fast rewind icon 2206e. Additionally or alternatively, the scrubber tool may take the form of an wheel or knob icons 2206f, that can be dragged clockwise to move forward or counterclockwise to move in reverse (e.g., rewind) through the narrative. Selection or manipulation may, for example, causes at least one processor to scroll or scrub at least part way through the narrative in one of the reverse direction or a forward direction, for instance along the actual path defined by the first end user through the first narrative. Selection or manipulation the end user selectable scan head icon 2204, 2204b may set or adjust a speed to scroll or scrub through the first narrative in the one of the forward or reverse directions. In some implementations, a physical wheel, knob or slider may be employed as a scrubber tool. A progress bar 2208 may include a cursor 2210, the position of which in the progress bar 2208 represents a relative current position in the narrative.

Figure 23:
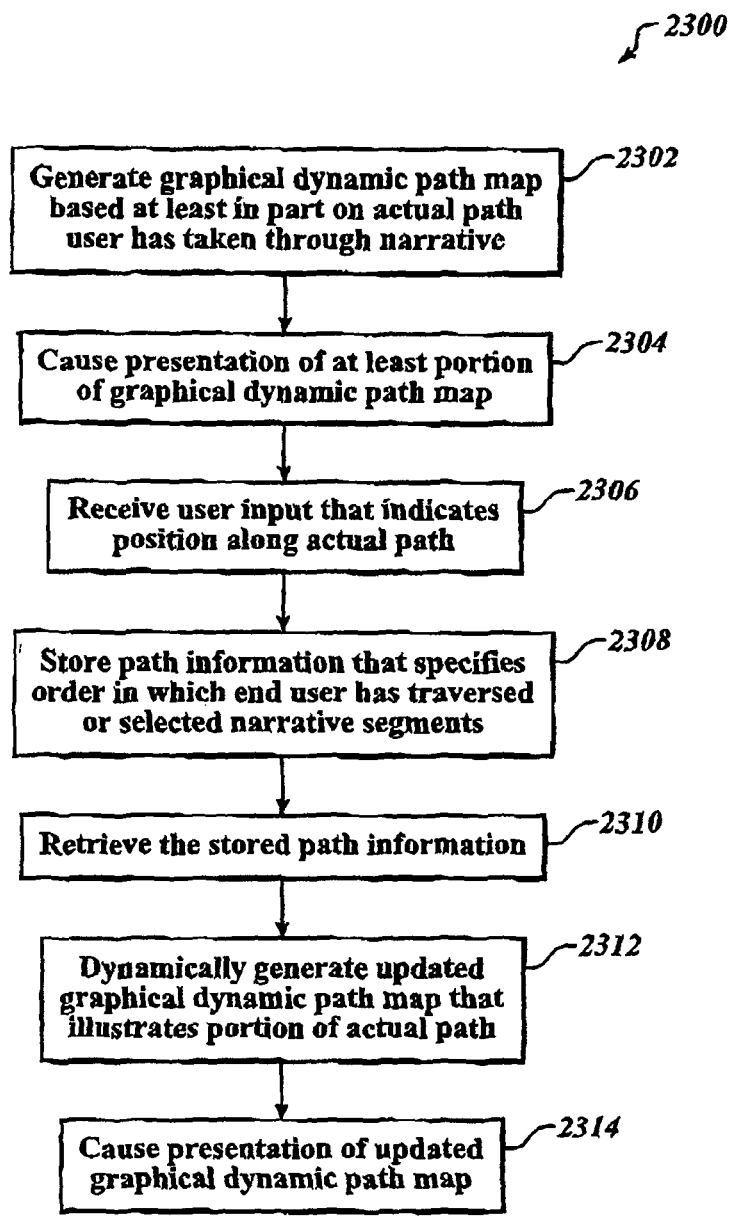
FIG. 23 is a logic flow diagram showing an illustrative method of operation in a content delivery platform, according to one illustrated embodiment, in which a graphical dynamic path map is updated.
Figure 24:
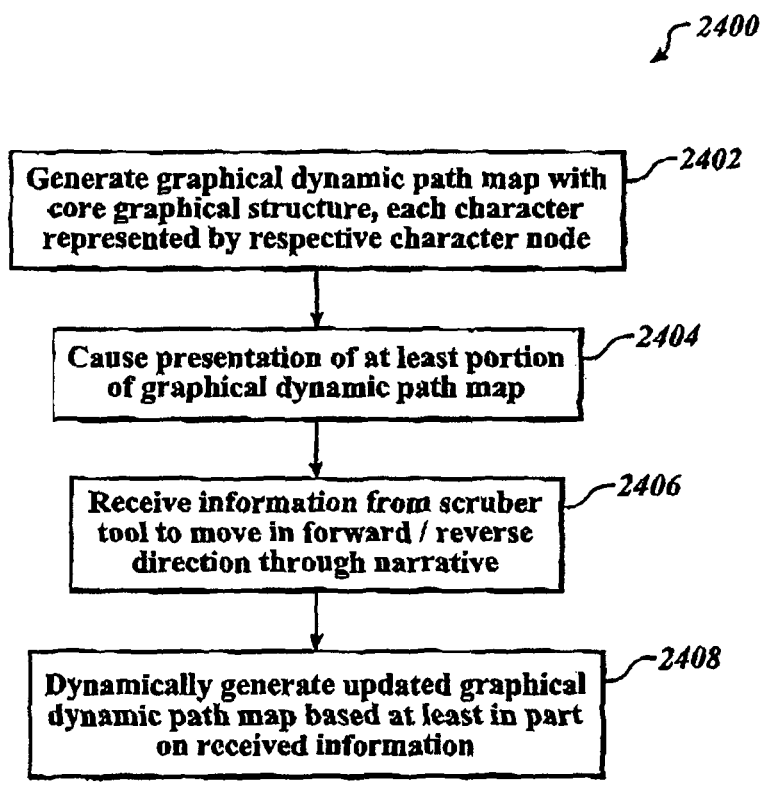
FIG. 24 is a logic flow diagram showing an illustrative method of operation in a content delivery platform, according to one illustrated embodiment, in which a graphical dynamic path map is scrolled or scrubbed through via a scrubber tool.

FIG. 23 shows a method 2300 of operation in a content delivery platform, according to at least one illustrated embodiment. The content delivery platform may comprise at least one processor-based component having at least one nontransitory processor-readable medium communicatively coupled to the processor and which stores at least one of processor-executable instructions or data.

At 2302, based at least in part on an actual path that a first end user has taken at least partially through a plurality of narrative segments that comprise a first narrative, at least one processor generates a graphical dynamic path map 2200a (FIG. 22A) that illustrates at least a portion of the actual path taken by the first end user through the plurality of narrative segments that comprise the first narrative. The graphical dynamic path map may, for example, be similar to that illustrated in FIG. 22.

At 2304, the at least one processor presents or causes a presentation of at least a portion of the graphical dynamic path map to the end user. The graphical dynamic path map 2200a comprises indicia corresponding to respective ones of at least two of the plurality of narrative segments.

At 2306, the method 2300 may further comprise the at least one processor receiving information representative of a user input by the first end user that indicates a position along the actual path that the end user has taken. Thus, generating the graphical dynamic path map 2200a may be based at least in part on the actual path that the first end user has taken at least partially through the plurality of narrative segments that comprise the first narrative and at least based at least in part on the received user input that indicates a position along the actual path that the end user has taken.

At 2308, the at least one processor may store path information that specifies an order in which the respective end user has traversed or selected to traverse though each of a number of narrative segments that comprise the respective narrative. For example, the at least one processor may store the path information for each of a plurality of narrative segments at least partially viewed by the end user. The at least one processor may store the path information for each end user of a plurality of end users in a form accessible by the at least one processor.

At 2310, the at least one processor may further retrieve the stored path information before generating the graphical dynamic path map 2200a or updated graphical dynamic path map 2200b.

The user input that indicates a position along the actual path that the end user has taken may include information from a scrubber tool operated by the first end user to move in a forward or reverse direction through the first narrative. The received information may indicate one of the forward or the reverse directions through the first narrative. Of course, the received information may vary over time, for instance as a user scrubs forward and backward through a narrative.

Additionally or alternatively, the received end user input may include information indicative of a speed to scroll through the first narrative in the one of the forward or reverse directions. Of course, the received information may vary over time, for instance as a user scrubs forward and backward through a narrative at different speeds or rates.

At 2312, the method 2300 may further comprise dynamically generating an updated graphical dynamic path map 2200b that illustrates at least a portion of the actual path taken by the first end user through the plurality of narrative segments that comprise the first narrative. For example, the at least one processor may generate an updated graphical dynamic path map 2200b as the first end user scrolls or scrubs at least part way through the first narrative in a reverse direction, backward along the actual path through the first narrative. Such may occur in real-time or almost real-time with the user inputs to provide a smooth and responsive user interface.

At 2314, the method 2300 may further comprise the at least one processor causing a presentation of the updated graphical dynamic path map 2200b to the end user. For example, the content delivery platform may be remote to the end user and one or more end user operated content consumption devices (e.g., television, smart or Internet connected television, desk top computer, tablet computer, smart or Internet connected phone or mobile communications device) that the end user employs to consume the content, e.g., narrative. Thus, the at least processor may send information to the cause at least one of the end user operated content consumption devices to present the updated graphical dynamic path map 2200b, for instance via a display or touch panel display of the end user operated content consumption device(s).

The at least one processor may, for example, dynamically generate an updated graphical dynamic path map 2200b distributed about a current location on the actual path as the first end user scrolls at least part way through the first narrative.

The at least one processor may, for example, dynamically generate an updated graphical dynamic path map 2200b that includes a user selectable scan head icon as a scrubber tool. In response to an election or manipulation of the user selectable scan head icon or a scrubber tool, the at least one processor may cause a scrolling or scrubbing at least part way through the first narrative or narrative segment thereof, in one of the reverse direction or a forward direction, for instance along the actual path taken by the particular end user through the first narrative. Alternatively, the scrubber tool may be implemented as a piece of hardware, for instance a rotatable dial, rotatable knob, joystick or trackball or other input device which generates signals indicative of a direction and/or a speed.

The at least one processor may, for example, dynamically generates an updated graphical dynamic path map 2200b that includes one or more additional nodes, in addition to the nodes representing the actual path taken by the first end user through the plurality of narrative segments that comprise the first narrative. Thus, the at least one processor may spawn additional nodes. The at least one processor may, for example, spawn at least one additional node based on the actual path taken by the first end user through the plurality of narrative segments that comprise the first narrative.

Causing a presentation of the graphical dynamic path map 2200a and/or updated graphical dynamic path map 2200b to the end user may, for example, include causing the graphical dynamic path 2200a and/or updated graphical dynamic path map 2200b map to display in a visual overlay with a visual representation of a current one of the narrative segments that the first end user is viewing. For instance, the graphical dynamic path map 2200a and/or updated graphical dynamic path map 2200b may be visually rendered in a partially transparent representation such that the presentation of one or more narrative segments may be visually perceived through the partially transparent representation of the graphical dynamic path map 2200a and/or updated graphical dynamic path map 2200b. Alternatively, the presentation of one or more narrative segments may be visually rendered in a partially transparent representation such that the presentation of the graphical dynamic path map 2200a and/or updated graphical dynamic path map 2200b may be visually perceived through the partially transparent representation of the narrative segments. Alternatively, the narrative segments may be presented in tandem (e.g., side-by-side left and right one the display; over-under vertically on the display) with the graphical dynamic path map 2200a and/or updated graphical dynamic path map 2200b.

Generating a graphical dynamic path map 2200a and/or updated graphical dynamic path map 2200b may, for example, include generating the graphical dynamic path map 2200a and/or updated graphical dynamic path map 2200b that illustrates, in addition to the actual path taken by the first end user through the plurality of narrative segments that comprise the first narrative, at least one alternative path segment of an alternative path not actually taken by the first end user through the plurality of narrative segments that comprise the first narrative.

Generating a graphical dynamic path map 2200a and/or updated graphical dynamic path map 2200b may, for example, include generating a graph of a plurality of nodes and a plurality of edges. Each edge is associated with a respective pair of the nodes. The nodes represent respective ones of the narrative segments that comprise the first narrative. The edges represent a path segment that corresponds to a sequential presentation or viewing of a second one of the narrative segments in the respective pair following a presentation or viewing of a first one of the narrative segments in the respective pair.

A number of the nodes can be presented as user selectable icons. In response to a user selection of one of the nodes, at least one processor may generate an updated dynamic path map 2200b that shows available paths from the corresponding node to other nodes that represent other narrative segments that comprise the first narrative These available paths may, for instance, be in addition to at least a portion of the actual path taken by the first end user through the plurality of narrative segments that comprise the first narrative.

FIG. 2400 shows a method of operation 2400 in a content delivery platform. The content delivery platform may comprise at least one processor-based component having at least one nontransitory processor-readable medium communicatively coupled to the processor and which stores at least one of processor-executable instructions or data.

At 2402, for a first narrative comprised of a plurality of narrative segments and having a plurality of characters, the at least one processor generate a graphical dynamic path map 2200a or updated graphical dynamic path map 2200b that has a core graphical structure that identifies each of the characters in the first narrative, each of the characters represented by respective character nodes in the core graphical structure. The graphical dynamic path map 2200a or updated graphical dynamic path map 2200b illustrates a plurality of paths through the first narrative as a number of segment nodes and segment edges. The segment nodes represent respective narrative segments, and the segment edges represent respective segment paths between narrative segments.

At 2404, the at least one processor presents or causes a presentation of at least a portion of the graphical dynamic path map 2200a to the end user. For example, the at least one processor may present or cause a presentation of at least a portion of the graphical dynamic path map 2200a in which the segment nodes are user selectable icons. Selection of user selectable icons that represent segment nodes causes that at least one processor to present or cause a presentation of a corresponding narrative segment represented by the selected one of the segment nodes.

For example, the at least one processor may generate a graphical dynamic path map 2200a and/or updated graphical dynamic path map 2200b based at least in part on an actual path that a first end user has taken at least partially through first narrative. Also for example, the at least one processor may generate a graphical dynamic path map 2200a and/or updated graphical dynamic path map 2200b that illustrates, in addition to the actual path taken by the first end user through the plurality of narrative segments that comprise the first narrative, at least one alternative path segment of an alternative path not actually taken by the first end user through the plurality of narrative segments that comprise the first narrative.

Optionally at 2406, the at least one processor may further receive information from a scrubber tool operated by the first end user to move in a forward or reverse direction through the first narrative. The information may be indicative of one of the forward or the reverse directions through the first narrative and/or a speed or rate of scrolling or scrubbing in the forward or reverse directions.

At 2408, based at least in part on the received information, the at least one processor may further dynamically generate an updated graphical dynamic path map 2200b that illustrates at least a portion of the actual path taken by the first end user through the plurality of narrative segments that comprise the first narrative. At 2410, the at least one processor may further cause a presentation of the updated graphical dynamic path map 2200b to the end user.

For example, the at least one processor may dynamically generate an updated graphical dynamic path map 2200b distributed about a current location on the actual path as the first end user scrolls at least part way through the first narrative.

For example, the at least one processor may dynamically generate an updated graphical dynamic path map 2200b by adjusting a total number of nodes represented in the updated graphical dynamic path map between a first instance and a second instance.

Alternatively or additionally, the at least one processor can generate a graphical dynamic path map in the form of a branching tree path map.

Figure 25:
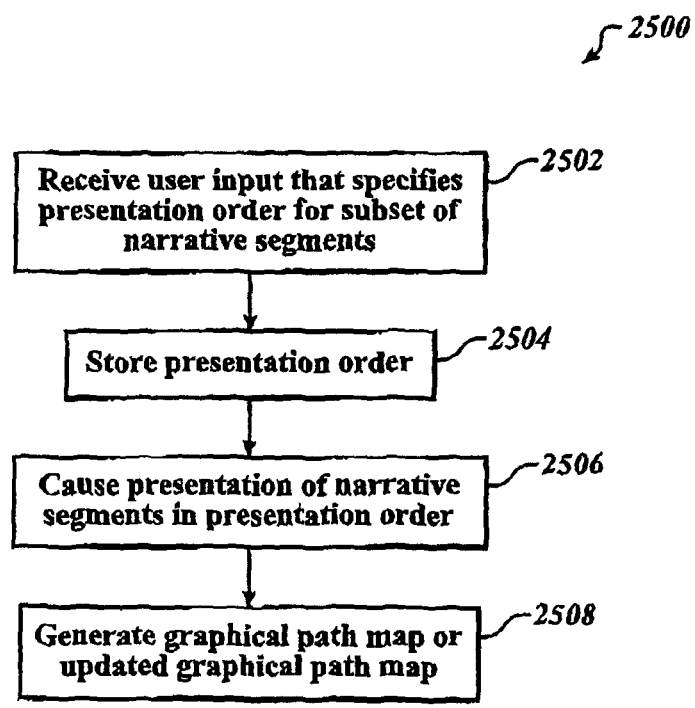
FIG. 25 is a logic flow diagram showing an illustrative method of, according to one illustrated embodiment, including storing an order or creating a queue of narrative segments to present.

FIG. 25 shows a method 2500 of operation in a content delivery platform. The content delivery platform comprises at least one processor-based component having at least one nontransitory processor-readable medium communicatively coupled to the processor and which stores at least one of processor-executable instructions or data. The method 2500 may be particular useful where narrative content will be consumed via a smart television or some other device where the end user is not positioned sufficiently close to easily make selections. Alternatively, the user interface can be presented via a tablet device which also presents the narrative content, or which controls a smart television which presents the narrative content.

At 2502, for a first narrative comprised of a plurality of narrative segments and having a plurality of characters, the at least one processor receives user input for a first end user that specifies a presentation order for presentation of a subset of the plurality of narrative segments. For example, the at least one processor receives a plurality of selections that correspond to respective ones of the narrative segments. User input can come in any of a variety of forms, for example via a graphical dynamic path map 2200*a* and/or updated graphical dynamic path map 2200*b*.

At 2504, the at least one processor stores the presentation order for the first user for the first narrative to one or more nontransitory processor-readable media.

At 2506, the at least one processor presents or causes a presentation of at least two of the subset of the plurality of narrative segments in the presentation order specified by the first user for the first narrative.

At 2508, at least one processor generates a graphical path map 2200*a* or updated graphical path map 2200*b* that comprises a graph of a plurality of nodes and a plurality of edges. Each edge connects two nodes of a respective pair of nodes. A number of the nodes represent respective ones of the narrative segments. A number of the edges represent a transition from one of the narrative segments to another one of the narrative segments.

The received user input may, for example, specify a plurality of selections indicative of respective ones of the edges in the graphical path map. The at least one processor may, for example, generate the updated graphical path map 2200*b* with the edges dynamically updated in response to the received selections indicative of respective ones of the edges in the graphical path map. The at least one processor may, for example, generate the updated graphical path map 2200*b* with the nodes dynamically updated in response to the received. The at least one processor may, for example, generate the updated graphical path map 2200*b* with spawned new nodes in the graphical path map, in response to the received selections indicative of respective ones of the edges in the graphical dynamic path map 2200*a* and/or updated graphical dynamic path map 2200*b*.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Pat. No. 6,554,040; U.S. provisional patent application Ser. No. 61/782,261; U.S. provisional patent application Ser. No. 62/031,605; U.S. provisional patent application Ser. No. 62/103,480; U.S. provisional patent application Ser. No. 62/199,760; and U.S. nonprovisional patent application Ser. No. 14/209,582, with the present disclosure are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a content delivery platform including at least one processor-based component having at least one nontransitory processor-readable medium communicatively coupled to the processor and which stores at least one of processor-executable instructions or data, the method comprising:

based at least in part on an actual path that a first end user has taken at least partially through a plurality of narrative segments that comprise a first narrative, generating a graphical dynamic path map that illustrates at least a portion of the actual path taken by the first end user through the plurality of narrative segments that comprise the first narrative; and causing a presentation of at least a portion of the graphical dynamic path map to the end user, the graphical dynamic path map comprising indicia corresponding to respective ones of at least two of the plurality of narrative segments.

2. The method of claim 1, further comprising:
receiving information representative of a user input by the first end user that indicates a position along the actual path that the end user has taken, and wherein generating a graphical dynamic path map includes generating the graphical dynamic path map based at least in part on the actual path that the first end user has taken at least partially through the plurality of narrative segments that comprise the first narrative and at least based at least in part on the received user input that indicates a position along the actual path that the end user has taken.

3. The method of claim 2 wherein receiving information representative of a user input by the first end user that indicates a position along the actual path that the end user has taken includes receiving information from a scrubber tool operated by the first end user to move in a forward or reverse direction through the first narrative, the information that indicative of one of the forward or the reverse directions through the first narrative.

4. The method of claim 3 wherein receiving information representative of a user input by the first end user that indicates a position along the actual path that the end user has taken includes receiving information from the scrubber tool operated by the first end user, the information further indicative of a speed to scroll through the first narrative in the one of the forward or reverse directions.

5. The method of claim 1, further comprising:
as the first end user scrolls or scrubs at least part way through the first narrative in a reverse direction, backward along the actual path through the first narrative, dynamically generating an updated graphical dynamic path map that illustrates at least a portion of the actual path taken by the first end user through the plurality of narrative segments that comprise the first narrative; and
causing a presentation of the updated graphical dynamic path map to the end user.

6. The method of claim 5 wherein dynamically generating an updated graphical dynamic path map that illustrates the actual path taken by the first end user through the plurality of narrative segments that comprise the first narrative includes dynamically generating an updated graphical dynamic path map distributed about a current location on the actual path as the first end user scrolls at least part way through the first narrative.

7. The method of claim 5, further comprising:
causing a user selectable scan head icon to the first end user as a scrubber tool, selection of which causes a scrolling or scrubbing at least part way through the first narrative in one of the reverse direction or a forward direction along the actual path through the first narrative.

8. The method of claim 5 wherein dynamically generating an updated graphical dynamic path map that illustrates includes spawning at least one additional node, in addition to the nodes representing the actual path taken by the first end user through the plurality of narrative segments that comprise the first narrative.

9. The method of claim 8 wherein spawning at least one additional node includes spawning at least one additional node based on the actual path taken by the first end user through the plurality of narrative segments that comprise the first narrative.

10. The method of claim 1, further comprising:
for each end user of a plurality of end users,
for each of a plurality of narrative segments at least partially viewed by the end user:
storing path information that specifies an order in which the respective end user viewed each of a number of narrative segments that comprise the respective narrative; and
retrieving the stored path information before generating the graphical dynamic path map.

11. The method of claim 1 wherein causing a presentation of the graphical dynamic path map to the end user includes causing the graphical dynamic path map to display in a visual overlay with a visual representation of a current one of the narrative segments that the first end user is viewing.

12. The method of claim 1 wherein generating a graphical dynamic path map that illustrates the actual path taken by the first end user through the plurality of narrative segments that comprise the first narrative includes generating the graphical dynamic path map that illustrates, in addition to the actual path taken by the first end user through the plurality of narrative segments that comprise the first narrative, at least one alternative path segment of an alternative path not actually taken by the first end user through the plurality of narrative segments that comprise the first narrative.

13. The method of claim 1 wherein generating a graphical dynamic path map that illustrates the actual path taken by the first end user through the plurality of narrative segments that comprise the first narrative includes generating a graph of a plurality of nodes and a plurality of edges, each edge associated with a respective pair of the nodes, the nodes representative of respective ones of the narrative segments that comprise the first narrative, the edges representative of a path segment that corresponds to a sequential viewing of a second one of the narrative segments in the respective pair following a viewing of a first one of the narrative segments in the respective pair.

14. The method of claim 13 wherein a number of the nodes are presented as user selectable icons, and in response to a user selection of one of the nodes, generating an updated dynamic path map that shows available paths from the corresponding node to other nodes that represent other narrative segments that comprise the first narrative, in addition to at least a portion of the actual path taken by the first end user through the plurality of narrative segments that comprise the first narrative.

15. A method of operation in a content delivery platform including at least one processor-based component having at least one nontransitory processor-readable medium communicatively coupled to the processor and which stores at least one of processor-executable instructions or data, the method comprising:
for a first narrative comprised of a plurality of narrative segments and having a plurality of characters, generating a graphical dynamic path map that has a core graphical structure that identifies each of the characters in the first narrative comprised, each of the characters represented by respective character nodes in the core graphical structure, and that illustrates a plurality of paths through the first narrative as a number of segment nodes and segment edges, the segment nodes representative of narrative segments and the segment edges representative of segment paths between narrative segments; and causing a presentation of at least a portion of the graphical dynamic path map to an end user.

16. The method of claim 15 wherein causing a presentation of at least a portion of the graphical dynamic path map to the end user includes causing a presentation in which the segment nodes are user selectable icons, selection of which causes presentation of a corresponding narrative segment represented by the selected one of the segment nodes.

17. The method of claim 15 wherein generating a graphical dynamic path map includes, based at least in part on an actual path that a first end user has taken at least partially through first narrative, generating a graphical dynamic path map that illustrates at least a portion of the actual path taken by the first end user through the plurality of narrative segments that comprise the first narrative.

18. The method of claim 17 wherein generating a graphical dynamic path map includes generating the graphical dynamic path map that illustrates, in addition to the actual path taken by the first end user through the plurality of narrative segments that comprise the first narrative, at least one alternative path segment of an alternative path not actually taken by the first end user through the plurality of narrative segments that comprise the first narrative.

19. The method of claim 18, further comprising:
receiving information from a scrubber tool operated by the first end user to move in a forward or reverse direction through the first narrative, the information that indicative of one of the forward or the reverse directions through the first narrative;
based at least in part in the received information, dynamically generating an updated graphical dynamic path map that illustrates at least a portion of the actual path taken by the first end user through the plurality of narrative segments that comprise the first narrative; and
causing a presentation of the updated graphical dynamic path map to the end user.

20. The method of claim 19 wherein dynamically generating an updated graphical dynamic path map includes dynamically generating an updated graphical dynamic path map distributed about a current location on the actual path as the first end user scrolls at least part way through the first narrative.

21. The method of claim 18 wherein dynamically generating an updated graphical dynamic path map based at least in part on the received information includes adjusting a total number of nodes represented in the updated graphical dynamic path map between a first instance and a second instance.

22. The method of claim 15 wherein generating a graphical dynamic path map includes generating a branching tree path map.

23. A method of operation in a content delivery platform including at least one processor-based component having at least one nontransitory processor-readable medium communicatively coupled to the processor and which stores at least one of processor-executable instructions or data, the method comprising:
for a first narrative comprised of a plurality of narrative segments and having a plurality of characters:
receiving user input for a first user that specifies a presentation order for presentation of a subset of the plurality of narrative segments;
storing the presentation order for the first user for the first narrative; and
causing a presentation of at least two of the subset of the plurality of narrative segments in the presentation order specified by the first user for the first narrative.

24. The method of claim 23 wherein receiving user input for a first user that specifies a presentation order for presentation of a subset of the plurality of narrative segments includes receiving a plurality of selections that correspond to respective ones of the narrative segments.

25. The method of claim 23, further comprising:
generating a graphical path map that comprises a graph of a plurality of nodes and a plurality of edges, each edge connecting two nodes of a respective pair of nodes, a number of the nodes representative of respective ones of the narrative segments, and a number of the edges representative of a transition from one of the narrative segments to another one of the narrative segments.

26. The method of claim 25 wherein receiving user input for a first user that specifies a presentation order for presentation of a subset of the plurality of narrative segments includes receiving a plurality of selections indicative of respective ones of the edges in the graphical path map.

27. The method of claim 26, further comprising;
dynamically updating the edges in response to the received selections indicative of respective ones of the edges in the graphical path map.

28. The method of claim 27, further comprising;
dynamically updating the nodes in response to the received selections indicative of respective ones of the edges in the graphical path map.

29. The method of claim 28 wherein dynamically updating the nodes in response to the received selections indicative of respective ones of the edges in the graphical path map includes spawning new nodes in the graphical path map in response to the received selections indicative of respective ones of the edges in the graphical path map.

* * * * *